(12) United States Patent
Nomura et al.

(10) Patent No.: US 6,621,191 B1
(45) Date of Patent: Sep. 16, 2003

(54) STRUCTURE CONTAINING ORGANIC MOLECULAR LAYER AND USE THEREOF

(75) Inventors: Noboru Nomura, Kyoto (JP); Ichiro Yamashita, Nara (JP); Norihisa Mino, Nara (JP); Tohru Nakagawa, Kusatsu (JP)

(73) Assignee: Matsushita Electric Industrial Co., Inc., Osaka (JP)

( * ) Notice: Subject to any disclaimer, the term of this patent is extended or adjusted under 35 U.S.C. 154(b) by 0 days.

(21) Appl. No.: 09/569,757

(22) Filed: May 12, 2000

(30) Foreign Application Priority Data

May 13, 1999 (JP) ............................................ 11-132220

(51) Int. Cl.[7] .............................................. H02N 1/00
(52) U.S. Cl. .................... 310/309; 29/886; 417/410.01; 251/129.01
(58) Field of Search .............. 310/309, 90; 417/410.01; 251/129.01; 29/886; 381/191

(56) References Cited

U.S. PATENT DOCUMENTS

| | | | | |
|---|---|---|---|---|
| 5,239,222 A | * | 8/1993 | Higuchi et al. | 310/309 |
| 5,436,033 A | * | 7/1995 | Mino et al. | 427/498 |
| 5,541,465 A | * | 7/1996 | Higuchi et al. | 310/309 |
| 5,585,683 A | * | 12/1996 | Higuchi et al. | 310/309 |
| 5,726,509 A | * | 3/1998 | Benecke et al. | 310/40 MM |
| 5,986,381 A | * | 11/1999 | Hoen et al. | 310/309 |
| 6,013,331 A | | 1/2000 | Ogawa | 427/515 |

FOREIGN PATENT DOCUMENTS

| | | | | |
|---|---|---|---|---|
| JP | 03-065083 | * | 3/1991 | 310/309 |
| JP | 05191982 | | 7/1993 | |
| JP | 06264870 | | 9/1994 | |
| JP | 06288355 | | 10/1994 | |
| JP | 07-147785 | * | 5/1995 | 310/309 |
| JP | 07147785 | | 6/1995 | |
| JP | 08-033360 | * | 2/1996 | 310/309 |
| JP | 09-121564 | * | 5/1997 | 310/309 |

* cited by examiner

Primary Examiner—Karl Tamai
(74) Attorney, Agent, or Firm—Heslin Rothenberg Farley & Mesiti P.C.; Mary Louise Gioeni

(57) ABSTRACT

A novel structure comprising two substrates disposed closely each other, in which an organic molecular layer is formed on the surface of at least one substrate wherein the gap between the surface of the organic molecular layer on one substrate and the surface of the other substrate or the surface of the organic molecular layer on the other substrate is maintained to be usually less than 1000 μm, preferably less than 1 μm is provided. A motor, actuator, and vibration-absorbing table comprising such structure are also provided.

31 Claims, 21 Drawing Sheets

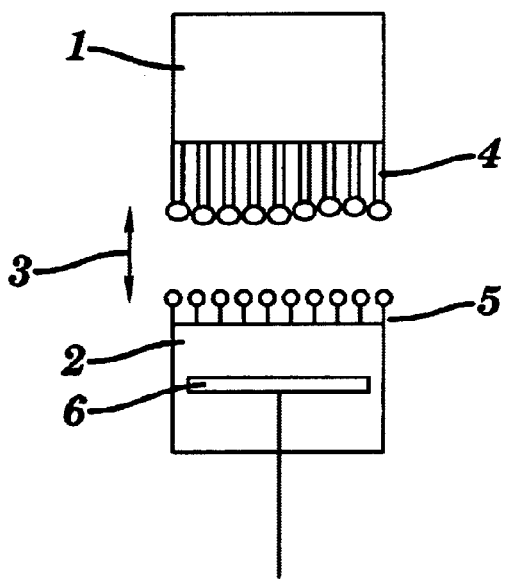
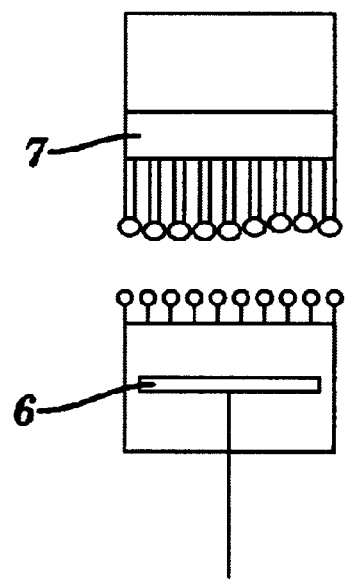
FIG. 1A  FIG. 1B
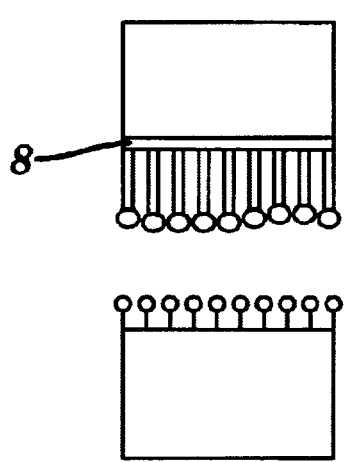
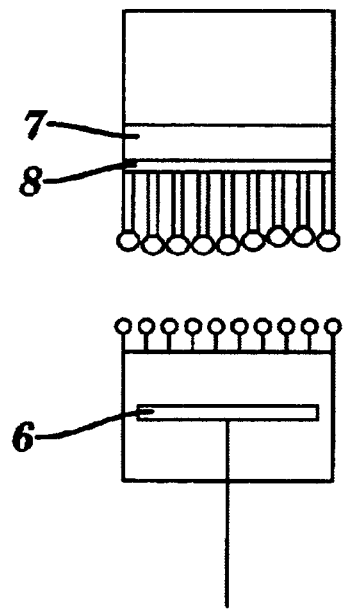
FIG. 1C  FIG. 1D

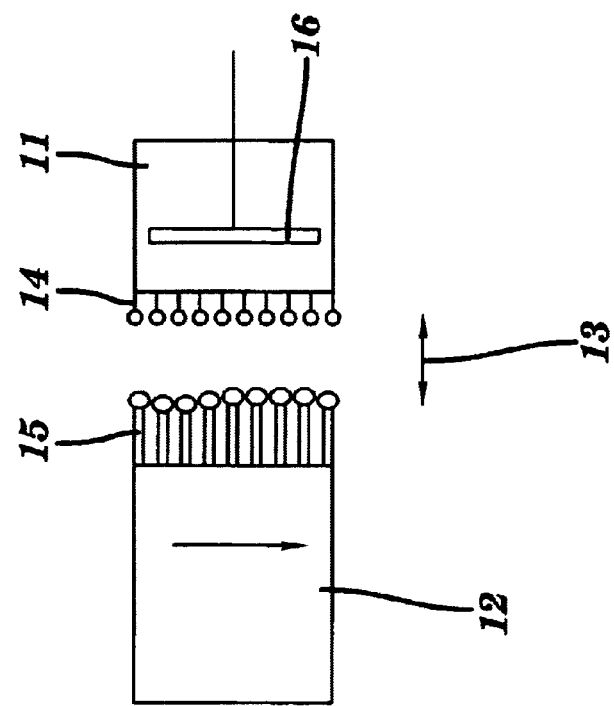
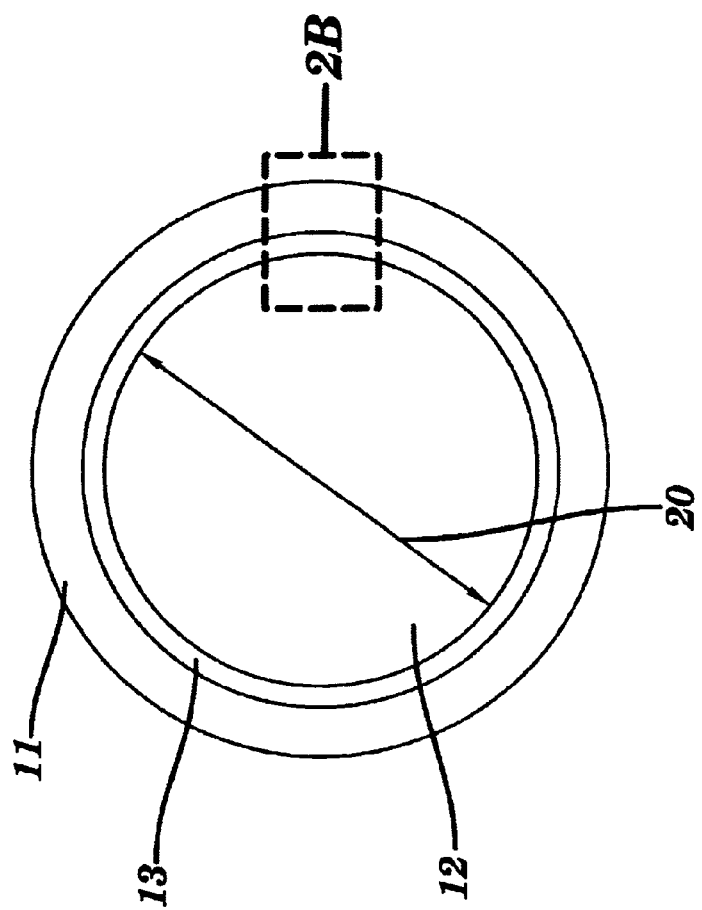
FIG. 2B
FIG. 2A

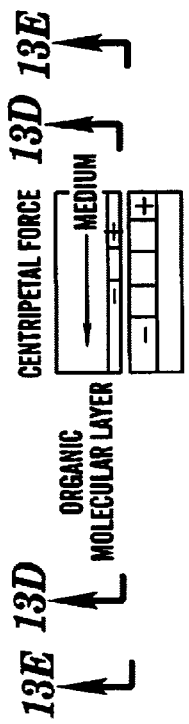
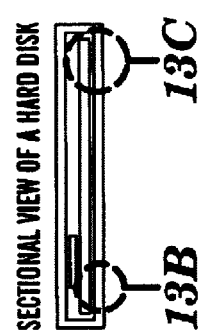
FIG. 13A
FIG. 13C
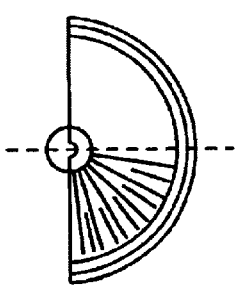
FIG. 13D
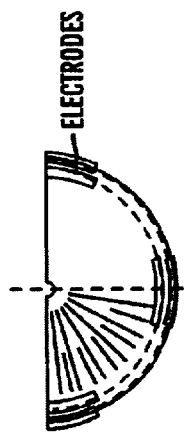
FIG. 13E
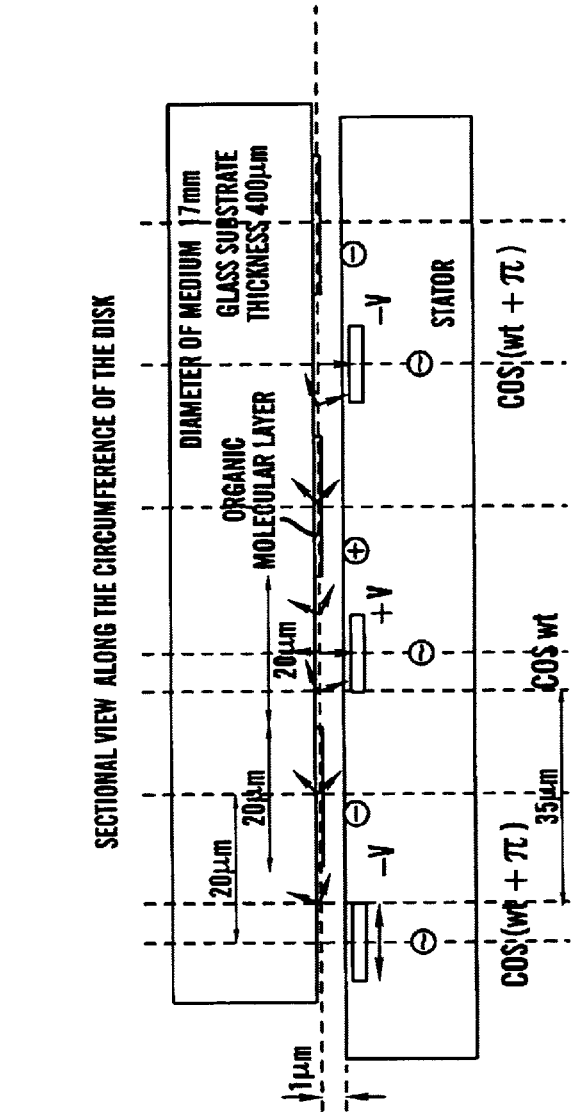
FIG. 13B

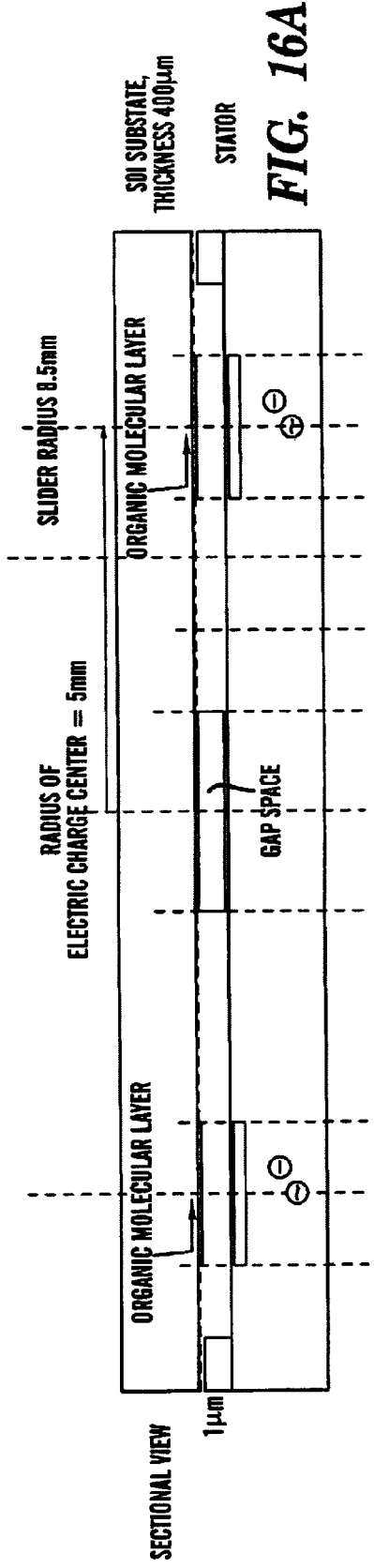
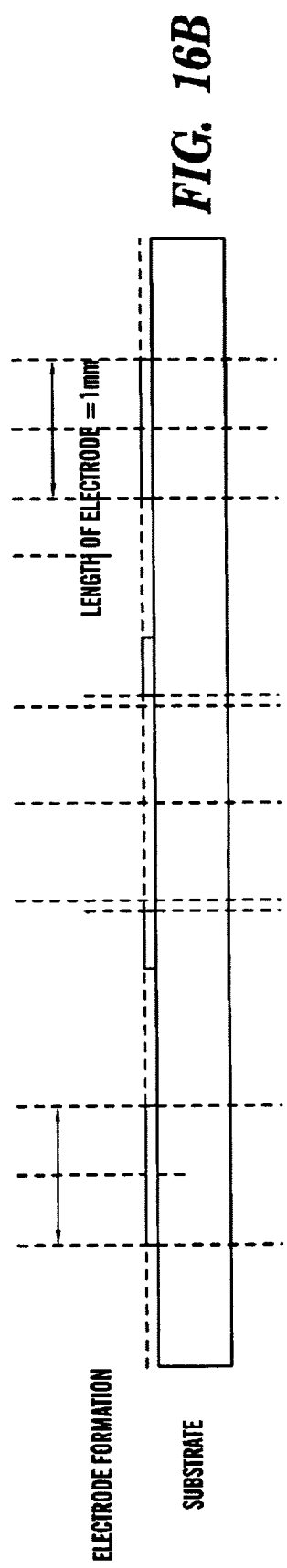
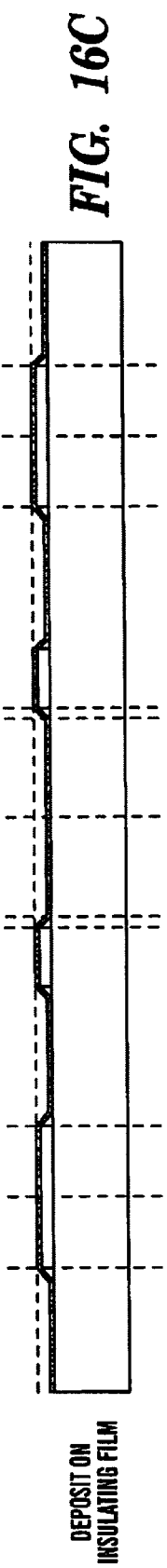
FIG. 16A
FIG. 16B
FIG. 16C

FIG. 17A
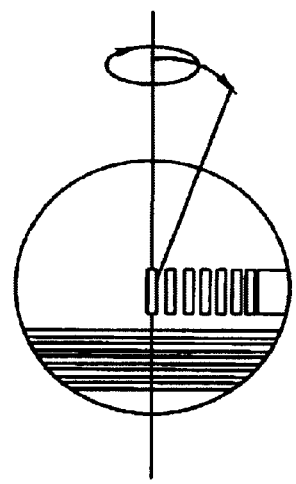
FIG. 17B
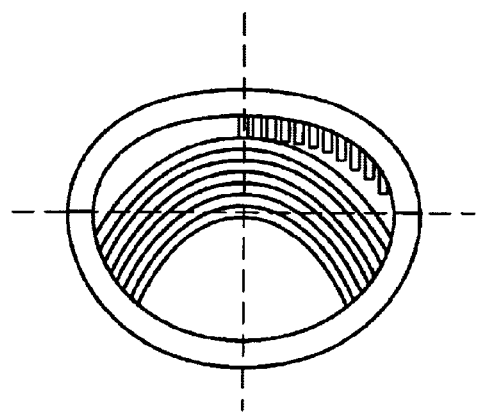
ELECTRIC CHARGE PATTERN OF ORGANIC MOLECULAR LAYER
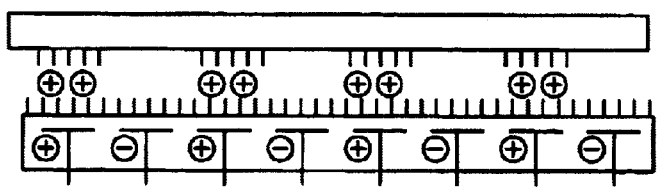
ELECTRODE PATTERN
FIG. 17C

STRUCTURE CONTAINING ORGANIC MOLECULAR LAYER AND USE THEREOF

TECHNICAL FIELD OF THE INVENTION

The present invention relates to a structure containing an organic molecular layer and its use. More particularly, this invention relates to a structure in which an organic molecular layer is formed on at least one of two closely mutually facing substrate surfaces, wherein the gap between the organic molecular layer surface, and the facing substrate surface or the organic molecular layer surface on the substrate surface is extremely small, usually less than 100 μm, preferably less than 1 μm, and to its use. The invention further relates to an intermolecular repulsive force motor and the like using such structures.

PRIOR ART

So far, there has been almost no study about a structure maintaining a tiny gap of usually less than 100 μm, preferably less than 1 μm by making a positive use of repulsive force which may occur n the case of approaching of two mutually facing surfaces, and in fact devices containing such structures have not been developed at all.

PROBLEMS TO BE SOLVED BY THE INVENTION

It is hence the first object of the invention to present a structure in which an organic molecular layer is formed by covalent bonds on at least one surface of two closely mutually facing substrate surfaces, wherein the gap between the organic molecular layer surface, and the facing other substrate surface or the other organic molecular layer surface formed by covalent bonds on the other substrate surface is extremely small, usually less than 100 μm, preferably less than 1 μm. Furthermore, it is the second object of the invention to present a motor, a vibration absorbing table, an artificial muscle, an actuator, and the like containing such structures.

MEANS OF SOLVING THE PROBLEMS

The present inventors have intensively studied on a method of maintaining a gap between two mutually facing surfaces having a tiny gap of usually less than 100 μm, preferably less than 1 μm, and preventing the two surfaces from contacting with each other, and discovered that the object can be achieved by effectively utilizing various repulsive forces acting between the organic molecular layer surface, and the other substrate surface or the other organic molecular layer surface formed on the other substrate surface, by forming the organic molecular layer(s) on the surface of at least one of the two surfaces. Further promoting the studies on the basis of such a discovery has completed the invention.

When one of the two surfaces facing each other across a tiny gap of usually less than 100 μm, preferably less than 1 μm is an organic uni-molecular layer formed on one substrate surface, while the other is a substrate surface or an organic uni-molecular layer surface formed on the other substrate surface, as the two surfaces further approach each other, various repulsive forces act to prevent further approaching of the two surfaces. However, no attempt has been made to maintain such tiny gaps by making positive use of various repulsive forces occurring between the two surfaces, to keep the lubrication between the two surfaces and decrease the friction caused by sliding between the two surfaces. Actually, such structures have a high potential of various applications.

For example, in one embodiment of the present invention, in the case of two mutually facing substrates across a tiny gap, if an organic molecular layer is formed at least on one surface, the tiny gap locally varies depending on the vibration of the structure, but a vibration absorbing table keeping the gap as an average value constant is presented.

In another embodiment of the invention, a precision small motor including the structure of the invention is provided. In this field, the annual production scale exceeds 2,000 million units, and, in particular, small finger-size motors may be expected to have future applications in audio and office information appliances. Above all, the fluid bearings are widely required in uses for various motors such as VTR motors, polygon mirror motors, MPU cooling fan motors, optical disk spindle motors, and drive motors for magneto-optical recording and hard disk drive. In these markets, further reduction of motor size is demanded, and, in 2010, the motor diameter will be reduced to about 2 millimeters, and the gap between the stator and slider will be extremely small. In the case of a motor having such a tiny gap, it is thought that the benefit of using the structure of the present invention in which an organic molecular layer is formed at least one of the two mutually facing surfaces wherein the gap between the organic molecular layer surface and the facing substrate surface or the organic molecular layer surface on the substrate surface is extremely small, usually less than 100 μm, preferably less than 1 μm is extremely high.

Furthermore, in another embodiment of the present invention, a cylindrical actuator (drive device) applied in artificial muscle and the like is provided. For example, a lightweight actuator expanding and contracting smoothly in a driving range of millimeter to meter like a living muscle is provided by using the structure of the present invention. To obtain an actuator like a muscle, an expanding and contracting actuator is essential. Manufacture of an actuator making expanding and contracting motions by using an electromagnetic motor requires converting gears and others for converting the circular motion of a motor into a flexible linear motion. As a result, the actuator using the electromagnetic motor is complicated in structure, and the weight is much heavier as compared with the muscle having similar dynamic characteristics. An actuator using a piezoelectric element has been also proposed, and it is suited to making slight motions, but it cannot make large motions. There are also many problems in uses of the actuator using conductive polymer or gel, or the actuator using a shape memory alloy. In this respect, the artificial muscle using an electrostatic motor on the basis of the structure of the present invention is wide in dynamic range and light in weight. In the artificial muscle of the present invention, multiple fine pores penetrate through a thick cylinder in which disk electrodes are buried at a constant intervals, and narrow tubes having electrically charged organic molecular layers disposed alternately in a band form on the surface are inserted in the fine pores, wherein the gap between the inner wall of fine pores and the organic molecular layers of narrow tubes is kept at extremely small, usually less than 100 μm, preferably less than 1 μm according to the structure of the invention, and by applying an alternating current to the disc electrodes of the cylinder, the narrow tubes in the fine pores are moved to make expanding and contracting motions.

A still another embodiment of the present invention provide for an actuator in a laminate layer form. In this structure, two kinds of films making mutually relative motions by applying a voltage are laminated. One set of comb electrodes are formed on one side of one layer, and rectangular regions of organic molecular layer having positive or negative charge are alternately arranged on one side of other layer, and the two layers are laminated so that the comb electrode surface and the charged patterned surface may face each other, and the gap of the two layers is filled with liquid, so that the spacing of one layer surface and the organic molecular layer surface of the other is maintained at usually less than 100 μm, preferably less than 1 μm, thereby composing an actuator.

In Summary, the Invention Relates to the Following:

(1) A structure in which organic molecular layers are formed entirely or partly on both mutually facing surfaces of two closely mutually facing substrates by covalent bonds wherein the distance between the organic molecular layers is maintained at less than 100 μm;

(2) A structure in which organic molecular layers are formed entirely or partly on both mutually facing surfaces of two closely mutually facing substrates by covalent bonds wherein the distance between the organic molecular layers is maintained at less than 1 μm;

(3) The structure of (1) or (2), in which the surfaces of the two substrates are facing each other either entirely or at least partly;

(4) The structure of (1) or (2), in which the tiny gap between the two surfaces is maintained by the steric repulsive force acting between both surfaces of the organic molecular layers;

(5) The structure of (1) or (2), in which lubrication between the both substrate surfaces is held by the elasticity of the organic molecular layers;

(6) The structure of (1) or (2), in which the substrates are in a cylindrical, discoidal or spherical form;

(7) The structure of (1) or (2), in which a dielectric layer is provided on the surface of the substrate, and an organic molecular layer is formed thereon;

(8) The structure of (1) or (2), in which a wear resisting layer is provided on the surface of the substrate wherein an organic molecular layer is formed on the surface of the substrate;

(9) The structure of (1) or (2), in which a wear resisting dielectric layers are provided on the surface of the substrate wherein an organic molecular layer is formed on the surface of the substrate;

(10) The structure of (1) or (2) wherein diamond-like carbon layer, ion implantation layer, or nitride layer is provided on the surface of the substrate as a wear-resistant layer wherein barium titanate (BaTiO3) or barium strontium tantalate (BST) is provided on the surface of the substrate as a dielectric layer;

(11) The structure of (1) or (2), in which the substrate is any one selected from the group consisting of ceramic, quartz, glass, plastic, metal, metal oxide, silicone, nitride, and semiconductor;

(12) The structure of (1) or (2), in which the periphery of the organic molecular layer is filled with water;

(13) The structure of (1) or (2), in which the periphery of the organic molecular layer is filled with aqueous solution;

(14) The structure of (1) or (2), in which the periphery of the organic molecular layer is filled with lower alcohol with 1 to 6 carbon atoms;

(15) The structure of (1) or (2), in which the periphery of the organic molecular layer is filled with fluoropolymer compound;

(16) The structure of (1) or (2), in which the periphery of the organic molecular layer is filled with oil-based material;

(17) The structure of (1) or (2), in which a solid electrolyte contacts with the surface of the organic molecular layer;

(18) The structure of (1) or (2), in which an electrode is disposed on one substrate, and an electric field is applied to it, so that an electrostatic repulsive force is generated between mutually facing surfaces;

(19) The structure of (1) or (2), in which an electrode is disposed on one substrate wherein a direct current and/or an alternating current is applied to the electrode;

(20) The structure of (19), in which the electric field further includes a high frequency more than about 5 times of the alternating current;

(21) A structure in which organic molecular layers are formed entirely or partly on both mutually facing surfaces of two closely mutually facing substrates by covalent bonds wherein the distance between the organic molecular layers is maintained at less than 100 μm wherein the organic molecular layers are composed of an anchor portion, a middle portion and a surface portion;

(22) A structure in which organic molecular layers are formed entirely or partly on both mutually facing surfaces of two closely mutually facing substrates by covalent bonds wherein the distance between the organic molecular layers is maintained at less than 1 μm wherein the organic molecular layers are composed of an anchor portion, a middle portion and a surface portion;

(23) The structure of (21) or (22), in which the organic molecular layer is bound to the substrate surface by covalent bond through the anchor portion;

(24) The structure of (21) or (22), in which the surface portion of the organic molecular layer has an electric charge;

(25) The structure of (21) or (22), in which the surface portion of the organic molecular layer does not have electric charge;

(26) The structure of (21) or (22), in which the surface portion of the organic molecular layer consists of a part having an electric charge, and other part not having electric charge;

(27) The structure of (21) or (22), in which at least one a part of the surface portion of the organic molecular layer has an electric charge(s) and is composed of polylysine, polyglutamine, polyasparagine or polyarginine having a positive electric charge and/or polyglutamic acid or polyaspartic acid having a negative electric charge;

(28) The structure of (21) or (22), in which at least a part of the surface portion of the organic molecular layer has an electric charge(s) and is composed of a polymer containing at least one group selected from the group consisting of quaternary ammonium group or diazonium salt having a positive electric charge, and sulfonic acid group, sulfinic acid group, sulfenic acid group, carboxylic acid group, phosphoric acid group, and phosphorous acid group having a negative electric charge;

(29) The structure of (28), in which the polymer is composed of at least one selected from the group consisting of polystyrene, polyacetylene, polyvinyl ester, poly(vinyl alcohol), polyvinyl ether, poly(ethylene terephthalate), polyethylene glycol, poly-p-phenylene ether, polyacetal, polycarbonate, polyethylene imine, polyamide, polyurethane, polyurea, polyimide, polyimidazole, polyoxazole, polypyrrole, polyaniline, polysulfide, polysulfone, polyphosphoric acid, polyester phosphate, polyphosphazene, polysiloxane, and polysilane;

(30) The structure of (21) or (22), in which at least one a part of the surface portion of the organic molecular layer has not an y electric charge and is composed of at least one polymer selected from the group consisting of vinyl chloride-vinyl acetate copolymer, vinyl chloride-vinylidene chloride copolymer, ethylene-propylene copolymer, ethylene-vinyl acetate copolymer, acrylonitrile-styrene copolymer, styrene-butadiene copolymer, tetrafluoroethylene-hexafluoroethylene copolymer, acrylonitrile-butadiene-styrene copolymer, styrene-maleic anhydride copolymer, and ethylene-vinyl alcohol copolymer;

(31) The structure of (21) or (22), in which at least a part of the surface portion is composed of at least one polypeptide selected from the group consisting of polyglycine, polyphenylalanine, polyalanine, polyleucine, polyisoleucine, polyvaline, polyproline, polyserine, polythreonine, and polytyrosine;

(32) A motor comprising a structure of (1) or (2);

(33) A motor comprising a slider and a stator closely facing each other, in which an organic molecular layer is formed entirely or partly on one or both of the mutually facing surfaces by covalent bond wherein the gap between the one organic molecular layer and other surface or other organic molecular layer is less than 100 $\mu$m;

(34) A motor comprising a slider and a stator closely facing each other, in which an organic molecular layer is formed entirely or partly on one or both of the mutually facing surfaces by covalent bond, wherein the gap between the one organic molecular layer and other surface or other organic molecular layer is less than 1 $\mu$m;

(35) The motor of (33) or (34), in which the motor is a DC motor, induction motor, synchronous motor, or AC commutator motor;

(36) The motor of (33) or (34), in which the motor is driven by an electrostatic force;

(37) The motor of (33) or (34), in which an organic molecular layer having an electric charge is formed by a repeated pattern on at least one of the surfaces of the slider and stator of the motor wherein an electrode is formed by repeated pattern on the other substrate wherein an AC voltage is applied to the electrode of the repeated pattern to generate a propulsive force between the slider and stator;

(38) The motor of (33) or (34), in which an organic molecular layer having an electric charge is formed on at least one of the surfaces of the slider and stator of the motor wherein the organic molecular layer is formed in a pattern of repeating positive charge and negative charge alternately wherein an electrode is formed by repeated pattern on the other wherein an AC voltage of different phases is applied to the electrode of the repeated pattern to generate a propulsive force between the slider and stator;

(39) The motor of (33) or (34), in which the slider and stator of the motor are cylindrical;

(40) The motor of (33) or (34), in which one of the two closely facing substrates is a disk wherein an organic molecular layer having an electric charge is formed repeatedly in a radial pattern of a specified line width on the disk surface wherein an electrode is formed on the other base plate repeatedly in a radial pattern of the specified line width wherein an AC voltage is applied to the electrode of the repeated pattern to generate a propulsive force on the disk;

(41) The motor of (33) or (34), in which a magnetic recording medium is formed on the other surface of the disk;

(42) The motor of (33) or (34), in which one of the two closely facing substrates is a disk wherein an organic molecular layer having an electric charge is formed on the disk surface in an arc pattern of a specified line width and radius wherein an electrode is formed on the other substrate in an arc pattern of the specified line width and radius wherein a DC voltage is applied to the electrode to generate a centripetal force on the center of the disk;

(43) The motor of (33) or (34), in which the surfaces of the two closely facing substrates are spherical wherein an organic molecular layer having an electric charge is formed repeatedly along the spherical surface in a specified line width on the inside spherical surface wherein an electrode is formed on the other spherical surface repeatedly along the spherical surface in the specified line width wherein an AC voltage is applied to the electrode of the repeated pattern to generate a propulsive force on the disk;

(44) The motor of (33) or (34), in which the surfaces of the two closely facing substrates are spherical wherein an organic molecular layer having an electric charge is formed in the latitude direction repeatedly along the spherical surface in a specified line width on the inside spherical surface wherein an electrode is formed in the latitude direction on the other spherical surface repeatedly along the spherical surface in the specified line width wherein an AC voltage is applied to the electrode of the repeated pattern to generate a propulsive force on the disk;

(45) The motor of (33) or (34), in which the surfaces of the two closely facing substrates are spherical wherein an organic molecular layer having an electric charge is formed in the latitude direction repeatedly along the spherical surface in a specified line width on the inside spherical surface wherein an electrode is formed in the latitude direction on the other spherical surface repeatedly along the spherical surface in the specified line width, being divided in the longitude direction wherein an AC voltage is applied to the electrode of the repeated pattern to generate a propulsive force on the disk;

(46) The motor of (33) or (34), in which the surfaces of the two closely facing substrates are spherical wherein an organic molecular layer having an electric charge is formed in the longitude direction repeatedly along the spherical surface in a specified line width on the inside spherical surface wherein an electrode is formed in the longitude direction on the other spherical surface repeatedly along the spherical surface in the specified line width wherein AC voltage is applied to the electrode of the repeated pattern to generate a propulsive force on the disk;

(47) The motor of (33) or (34), in which the surface of the two close base plates is spherical wherein an organic molecular layer having an electric charge is formed in the longitude direction on the equator repeatedly along the spherical surface in a specified line width on the inside spherical surface wherein an electrode is formed in the longitude direction on the equator on the other spherical surface repeatedly along the spherical surface in the specified line width, or an organic molecular layer having an electric charge is formed repeatedly in the latitude direction wherein an electrode is formed on the other spherical surface repeatedly in the latitude direction along the spherical surface in the specified line width, being divided in the longitude direction, and an AC voltage is applied to the electrode of the repeated pattern to generate a propulsive force in three axial directions on the spherical surface; (48) The motor of (33) or (34), in which the pattern of the organic molecular layer formed on the substrate is formed on the substrate surface by combination of organic ultra thin layer manufacturing method and printing system, ink jet system, electron beam drawing system, or photolithography;

(49) The motor of (33) or (34), in which lubrication between the slider and stator is assured by elasticity of the organic molecular layers formed on the surface of both slider and stator;

(50) The motor of (33) or (34), in which lubrication between the slider and stator is assured by elasticity of the organic molecular layers formed on the surfaces of both slider and stator, and a repulsive force acting between the organic molecular layers;

(51) A bearing without mechanical axis, in which a rotatable discoidal substrate (the first substrate) and a fixed substrate (the second substrate) are disposed closely to each other with a tiny gap wherein a circular convex supporter having a specified radius in a specified line width is disposed on the facing surface of the first substrate wherein an organic molecular layer having an electric charge is formed on the supporter surface wherein a convex supporter is disposed on the facing surface of the second substrate at a specified radius position in a specified line width wherein an organic molecular layer having the same type of electric charge as the electric charge of the organic molecular layer on the first substrate is formed on the supporter surface wherein a liquid electrolyte is applied on the surface of the first substrate wherein the convex supporter of the second substrate is immersed in the liquid electrolyte, thereby maintaining a tiny gap between the two surfaces by a balance between the electric double layer repulsive force acting between the organic molecular layer surfaces and the gravity by the first substrate;

(52) A bearing without mechanical axis, in which a rotatable discoidal substrate (the first substrate) and a fixed substrate (the second substrate) are disposed closely to each other with a tiny gap wherein a circular convex supporter having a specified radius in a specified line width is disposed on the facing surface of the first substrate wherein an organic molecular layer having an electric charge is formed on the supporter surface wherein a convex supporter is disposed on the facing surface of the second substrate at a specified radius position in a specified line width wherein an organic molecular layer having the same type of electric charge as the electric charge of the organic molecular layer on the first substrate is formed on the supporter surface wherein a liquid electrolyte is applied on the surface of the first substrate wherein the convex supporter of the second substrate is immersed in the liquid electrolyte, thereby maintaining a tiny gap between the two surfaces by a balance between the electric double layer repulsive force acting between the organic molecular layer surfaces and the meniscus attractive force formed between the both surfaces;

(53) A bearing without mechanical axis, in which a rotatable discoidal substrate (the first substrate) and a fixed substrate (the second substrate) are disposed closely to each other with a tiny gap wherein a circular convex supporter having a specified radius in a specified line width is disposed on the facing surface of the first substrate, wherein an organic molecular layer having an electric charge is formed on the supporter surface wherein a convex supporter is disposed on the facing surface of the second substrate at a specified radius position in a specified line width wherein an organic molecular layer having the same type of electric charge as the electric charge of the organic molecular layer on the first substrate is formed on the supporter surface wherein a liquid electrolyte is applied on the surface of the first substrate wherein the convex supporter of the second substrate is immersed in the liquid electrolyte, thereby maintaining a tiny gap between the two surfaces by the electric double layer repulsive force acting between the organic molecular layer surfaces wherein an organic molecular layer having a circular charge pattern is further formed on the surface of the first substrate in a specified line width at a position of specified radius, wherein an electrode is formed on the surface of the second substrate so as to apply a same charge at the outside and a different charge at the inside, sandwiching the charge pattern on the first substrate wherein a DC voltage is applied between the two electrodes so as to generate a centripetal force on the center of the disk;

(54) The bearing of any one of (51) to (53) wherein the tiny gap between the two surfaces is less than 100 $\mu$m;

(55) The bearing of any one of (51) to (53) wherein the tiny gap between the two surfaces is less than 1 $\mu$m;

(56) The bearing of any one of (51) to (53), in which the pattern of the organic molecular layer formed on the substrate is formed on the substrate surface by combination of the organic ultra thin layer manufacturing method and the printing system, the ink jet system, the electron beam drawing system, or the photolithography;

(57) A guide, in which two substrates (the first substrate and the second substrate) are disposed closely to each other to give a tiny gap, wherein a linear convex supporter having a specified line width is provided on the surface of the first substrate wherein an organic molecular layer having an electric charge is linearly formed on the surface of the supporter wherein an electrode having a specified line width and interval is formed linearly on the surface of the second substrate wherein a liquid electrolyte is applied on the surface of the first substrate wherein a DC voltage is applied to the electrode so as to make it movable along the line by external forces;

(58) A guide, in which two substrates (the first substrate and the second substrate) are disposed closely to each other to give a tiny gap wherein two linear convex supporters (the first and the second supporters) having a specified line width are provided on the surface of the first substrate wherein organic molecular layers having an electric charge are formed on the surfaces of the first and the second supporters wherein two linear convex supporters (the third and the fourth supporters) having a specified line width are provided on the surface of the second substrate wherein an organic molecular layer having an electric charge is formed on the surface of the third supporter wherein a liquid electrolyte is applied on the surface of the first substrate wherein the tiny gap between the surfaces of the organic molecular layers is maintained by the electric double layer repulsive force acting between the two surfaces wherein a linear electrode having a specified line width and interval is formed on the fourth convex supporter wherein an DC voltage is applied to the electrodes so as to make it movable along said line by external forces;

(59) The guide of (57) or (58), wherein the tiny gap between the surface of the organic molecular layer on the one substrate and the surface of the organic molecular layer on the other substrate or the surface of the other substrate is less than 100 $\mu$m;

(60) The guide of (57) or (58), wherein the tiny gap between the surface of the organic molecular layer on the one substrate and the surface of the organic molecular layer on the other substrate or the surface of the other substrate is less than 1 µm;

(61) The guide of (57) or (58), in which the pattern of the organic molecular layer formed on the substrate is formed on the substrate surface by combination of organic ultra thin layer manufacturing method and printing system, ink jet system, electron beam drawing system, or photolithography;

(62) An actuator having a cylindrical structure, in which discoidal electrodes are buried in the cylindrical structure in parallel at a specified interval to the bottom of the cylinder wherein narrow tubes penetrate through multiple fine pores penetrating vertically through the structure wherein liquid is present between the fine pores and narrow tubes, wherein a band pattern of organic molecular layer having a positive charge and a band pattern of organic molecular layer having a negative charge are alternately arranged on the surface of narrow tubes wherein the interval of the bands is same as the interval of the discoidal electrodes wherein an AC voltage is applied to the discoidal electrodes wherein the gap between the surface of the organic molecular layer of the narrow tube inserting into each fine pore and the inner wall of the fine pore is maintained at extremely small;

(63) The actuator of (62) wherein the gap between the surface of the organic molecular layer of the narrow tube inserting into each fine pore and the inner wall of the fine pore is less than 100 µm;

(64) The actuator of (62), wherein the gap between the surface of the organic molecular layer of the narrow tube inserting into each fine pore and the inner wall of the fine pore is less than 1 µm;

(65) The actuator of (62), in which the diameter of penetration holes is 1 mm to 100 mm;

(66) An actuator composed by alternately laminating two kinds of substrate layers making mutually relative motions by application of voltage wherein a set of two comb electrodes are formed on one side of a first layer wherein a rectangular region of organic molecular layer having a positive charge and a rectangular region of organic molecular layer having a negative charge are alternately arranged on one side of a second layer wherein the width of the adjacent rectangular regions coincides with the width of the comb electrodes wherein the layers are laminated in multiple layers so that the surface of the comb electrodes and the surface of the organic molecular layers may face each other while keeping a tiny gap wherein the space between the layers is filled with liquid, wherein AC voltages are applied to the set of two comb electrodes;

(67) The actuator of (66) wherein the tiny gap is less than 100 µm;

(68) The actuator of (66) wherein the tiny gap is less than 1 µm;

(69) A magnetic recording and reproducing device comprising a rotatable discoidal substrate (the first substrate) and a fixed substrate (the second substrate) which are disposed closely with a tiny gap wherein a magnetic recording medium is formed on the surface of the first substrate and an organic molecular layer is formed on the surface thereof wherein a recording-reproducing element is formed on the surface of the second substrate and a convex supporter of nearly same height as the element surface is further disposed on the surface of the second substrate wherein an organic molecular layer is formed on the surface of the supporter on the second substrate;

(70) A magnetic recording and reproducing device comprising a rotatable discoidal substrate (the first substrate) and a fixed substrate (the second substrate) which are disposed closely with a tiny gap wherein a magnetic recording medium is formed on the surface of the first substrate and an organic molecular layer is formed on the surface thereof wherein a recording-reproducing element is formed on the second fixed substrate and a convex supporter of nearly same height as the element surface is further disposed on the surface of the second substrate wherein an organic molecular layer is formed on the surface of the supporter on the second substrate wherein a liquid electrolyte is applied on the surface of the first substrate wherein the convex supporter of the second substrate is immersed in the liquid electrolyte;

(71) The magnetic recording and reproducing device of (69) or (70) wherein the tiny gap between the organic molecular surfaces on the first and the second substrates is less than 100 µm;

(72) The magnetic recording and reproducing device of (69) or (70) wherein the tiny gap between the organic molecular surfaces on the first and the second substrates is less than 1 µm;

(73) A micro-pump comprising a structure of (1) or (2);

(74) A micro-pump comprising of an inside cylinder and an outside cylinder wherein organic molecular layers are formed on at least a part of the surfaces of the cylinders wherein a liquid exists between the cylinders, wherein a pump operating portion is contained in part of the outside cylinder;

(75) The micro-pump, in which the pump structure is cylindrical wherein an organic molecular layer is formed in part of the cylinder, and the pump operation is realized by the squirming motion of the organic molecular layer;

(76) A vibration absorbing table comprising a structure of (1) or (2);

(77) A vibration control table, in which organic molecular layers having a same type of electric charge are formed on both surfaces of two flat plates closely facing mutually, and when vibration is propagated to one flat plate, the organic molecular layer on its disk vibrates, thereby provoking expanding and contracting motions of the organic molecular layer on the other flat plate, and the vibration is converted into the vibration energy of the organic molecular layer, so that the vibration is eliminated;

(78) The vibration control table of (77) wherein the gap between the two flat tables is less than 100 µm;

(79) The vibration control table of (77) wherein the gap between the two flat tables is less than 1 µm;

(80) A micro-nozzle comprising a structure of (1) or (2);

(81) A micro-nozzle comprising two conical surfaces, one being the surface of a nozzle core portion and the other the surface of a nozzle outlet portion wherein- organic molecular layers are formed on the surfaces facing each other wherein the organic molecular layer has an anchor portion covalently bound to each conical surface, a middle portion working as a dynamic elastic element, and a surface portion having an electric charge wherein the nozzle outlet conical surface is disposed oppositely to the nozzle core conical surface wherein the gap between them is filled with an injection fluid as medium;

(82) A structure comprising two closely mutually facing substrates, in which an organic molecular layer is formed on one of mutually facing surfaces wherein a charge generating means is provided in other substrate, and the gap between the surface of the organic molecular layer and the surface of the other substrate is less than 100 µm;

(83) A structure comprising two closely mutually facing substrates, in which an organic molecular layer is formed on one of mutually facing surfaces wherein a charge generating means is provided in other substrate, and the gap between the surface of the organic molecular layer and the surface of the other substrate is less than 1 μm;

(84) The structure of (82) or (83), in which the charge generating means is realized by application of an electric field to a dielectric substrate;

(85) The structure of (82) or (83), in which the charge generating means is realized by an electrode; and

(86) The structure of (82) or (83), in which the charge generating means is realized by thermal polarization by laser irradiation.

Embodiments of the Invention

The present invention is described in detail below. The material for composing the substrate used in the structure of the present invention is not particularly limited as far as it is a solid material on the surface of which an organic molecular layer can be formed. It includes, for example, a metal such as iron, copper, nickel and aluminum, a metal oxide such as ceramic, plastic, glass, in particular, quartz, sapphire and MgO, a semiconductor such as silicone, and a nitride such as $Si_3N_4$ and BN. Since the gap is extremely narrow, a material of small coefficient of thermal expansion such as quartz and Zerodure are preferably used for achieving high precision, high rotating speed, long life and the like.

In the structure of the present invention, the organic molecular layer formed on the substrate refers to a layer composed of an uni-molecular organic polymer compound, each covalently bonded directly or indirectly to the surface of the substrate, including, for example, an organic film-film and organic uni-molecular layer.

Generally, the organic film layer can be prepared in various methods as disclosed for example, in "Introduction of Organic Film" by Akira Yabe (published by Baifukan, 123 pages, 1988). The methods include, for example, the Langmuir-Blodgett method of scooping the monomolecular layer formed on the water surface onto the substrate; the rotary application method of mounting the base plate on a rotating table, dropping a layer forming solution on the substrate, and rotating the table to dry the solution and to form a thin layer; the casting method of applying the solution on the entire substrate, and drying the solution in air to form into a thin layer; the on-water developing method of drying the solution on the water surface to form into a thin layer, the electrolytic polymerization method of forming a polymerization layer on the conductive substrate surface by the electrolytic method; the anodic oxidation method of depositing an oxide layer by the electrolytic method; the vacuum deposition method of heating and evaporating the layer component in vacuum and building up on the substrate; the MBE method of forming a layer by molecular beam in ultrahigh vacuum; the cluster ion beam method of forming a layer by ionized molecular cluster; the ion beam deposition method combining the inert gas ion irradiation with vapor deposition; the high-frequency ion plating method of forming a layer by accelerated ions; the sputtering method of striking out particles for forming a layer by ionized atoms and building up on the substrate; the chemical vapor deposition (CVD) method of reacting chemically in vapor phase and forming a layer; the thermal CVD method or optical CVD method of reacting chemically by heat or light, and the plasma polymerization method of forming a layer by making use of the reaction of ions and radicals generated by high frequency. Among them, the CVD method and plasma polymerization method are called the chemical layer manufacturing methods.

The organic molecular layer used in the structure of the present invention is formed on the substrate surface by covalent bond, and therefore, among other methods, the CVD method, plasma polymerization method and plasma CVD method as manufacturing methods for the chemical film are preferable for manufacture of the structure of the present invention.

Aside from these methods, the chemical adsorption method (K. Ogawa et al., Langmuir, 6, 851, 1990) is also known. This method is preferred for forming monomolecular layers, but it can be used only in part for forming the organic molecular layers used in the present invention which is not limited to the monomolecular layers alone. The most preferred method for forming the organic molecular layer used in the structure of the present invention is the organic film layer manufacturing method disclosed in Japanese Laid-open Patent No. 10-175267.

According to Japanese Laid-open Patent No. 10-175267, methods for manufacturing organic film layers are roughly classified into three methods. In a first method, a polymer having any one of functional groups expressed in formula (1) or formula (2),

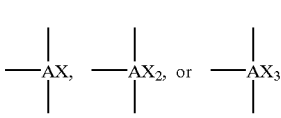

(1)

(where A is Si, Ge, Ti, Sn or Zr; X is halogen atom, alkoxy group or isocyanate group),

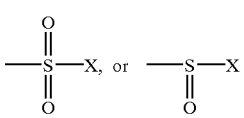

(2)

(where X is halogen atom), and a functional group, which can be coordinated into metal, is caused to contact with the substrate, and an organic film layer is formed in the process of fixing the polymer on the substrate surface. In a second method, a polymer having two or more of the functional groups expressed in formula (1) or formula (2) or a functional group, which can be coordinated into a metal atom, is caused to contact with the substrate, and an organic film layer is formed in the process of fixing the polymer on the substrate surface. Furthermore, in a third method, a molecule having at least one of the functional groups expressed in formula (1) or formula (2) or a functional group which can be coordinated into a metal ion in its molecule and also having a polymerizable functional group is caused to contact with the substrate, and an organic film layer is formed in the first process of fixing the molecule on the substrate surface and the second process of growing the polymer on the substrate by polymerizing other monomer on the polymerizable functional group. As a modified method of the third method, conveniently used is the method in which a molecule having at least one of the functional groups expressed in formula (1) or formula (2) or a functional group which can be coordinated into a metal atom in its molecule and also having a polymerizable reaction group at its end is caused to contact with the substrate, and an organic film layer is formed in the first process of fixing the molecule on the substrate surface and the second process of bonding a proper polymer to the polymerizable reaction group.

The polymerizable functional group includes, for example, C=C (including vinyl group, cyclic olefin group), intercarbon triple bond, C≡C—C≡C (including cyclic diolefin), P≡N, phenyl group, 2,4-two-displacement benzene skeleton group, 1,3-two-displacement benzene skeleton group, epoxy group, four-member ring ether group, five-member ring ether group, 2,6-two-displacement phenol skeleton group, 2,4,6-three-displacement phenol skeleton group, five-member ring acetal skeleton group, six-member ring acetal skeleton group, seven-member ring acetal skeleton group, eight-member ring acetal skeleton group, four-member ring lactone skeleton group, five-member ring lactone skeleton group, six-member ring lactone skeleton group, hydroxyl group, thiol group, carboxyl group, halogenated acyl group, acid anhydride group, halogen, carboxylate group, primary amino group, secondary amino group (including three-member ring, four-member ring, five-member ring, six-member ring amino group, twin-ring six-member ring amino group), six-member ring imino ether skeleton group, isocyanate group, pyrrole skeleton group, thiophene skeleton group, sulfide group, and cyclic sulfide group.

By binding a monomer to the polymerizable reaction group and then polymerizing this monomer, a polymer can be grown. The polymerization reaction for growing the polymer preferably includes radical polymerization, anionic polymerization, cationic polymerization, and coordination polymerization. As the method of polymerization, a method of using light, heat, catalyst, and the like is preferred. A solvent may be also used.

The polymerization process in the second process may be omitted by bonding a polymer to the polymerizable reaction group, including, for example, protein, polypeptide, vinyl chloride-vinyl acetate copolymer, vinyl chloride-vinylidene chloride copolymer, ethylene-propylene copolymer, ethylene-vinyl acetate copolymer, acrylonitrile-styrene copolymer, styrene-butadiene copolymer, tetrafluoroethylene-hexafluoroethylene copolymer, acrylonitrile-butadiene-styrene copolymer, styrene-maleic anhydride copolymer, and ethylene-vinyl alcohol copolymer.

A positive or negative charge may be generated by introducing a group of —COO—, —SO$_3$—, —SO$_2$—, —SO—, —NH$_3^+$, NR$_3^+$, or the like to the end of the polymer for forming the second blocks.

It is also possible to crosslink the molecular chains mutually by irradiating with light, by distributing properly unsaturated linkage in the molecular chains of the polymer having formula (1) or formula (2) or functional group, which can be coordinated into metal. In the third method, moreover, by polymerizing by using the block molecules having unsaturated linkage at a proper ratio in the second process, it is also possible to crosslink the molecular chains mutually by irradiating with energy.

Further, to control the mutual gap of the molecules to be bonded to the substrate, the purpose is achieved by controlling the mixing ratio of the polymer responsible for formation of organic molecular layer, and the spacer molecule reacting with the substrate but not responsible for formation of organic molecular layer. Or, in the modified method of the third method, the molecular gap of the organic molecular layer can be controlled by decreasing the polymer concentration used in the second process so as to be lower than the polymer concentration used in the first process at an arbitrary rate.

In the third method, the control of the molecular gap can be achieved by using an unsaturated linkage group in the terminal end of the molecular layer of the first layer and forming a polymerizable group at a proper interval by direct drawing or energy irradiation through a mask.

In the first to third forming methods (including modified method of the third method) of organic film layer, the usable functional group, which can be coordinated into metal, is preferred to be a functional group generally expressed in formula (3) or in formula (4) having a chelating function.

(where S is sulfur, and M$_1$ is hydrogen atom or metal atom)

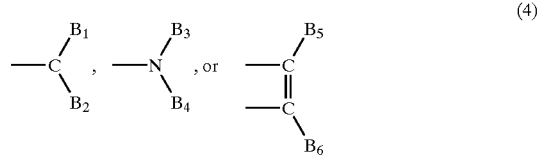

(where B$_1$ to B$_6$ are (CH$_2$)$_n$COOM, n being 0 to 3, M being hydrogen atom or metal atom, or (CH$_2$)$_m$NXY, m being 0 to 2, X and Y being independently hydrogen atom, alkyl group with 1 to 8 carbon atoms, phenyl group, or hydrocarbon group with 8 or less carbon atoms; double bond in the formula (4) is either benzene ring or part of other aromatic ring).

When the polymer to be bonded to the substrate contains the functional group expressed in formula (1) or formula (2), this polymer is fixed to the substrate by the bond shown in formula (5). If the polymer to be bonded to the substrate contains the functional group expressed in formula (3) or formula (4), this polymer is fixed to the substrate by the bond shown in formula (6). The bonds in formula (5) or formula (6) are both strong bonds.

(where A is atom in the polymer, being iSi, Ge, Ti, Sn or Zr, and M$_2$ is atom in the substrate)

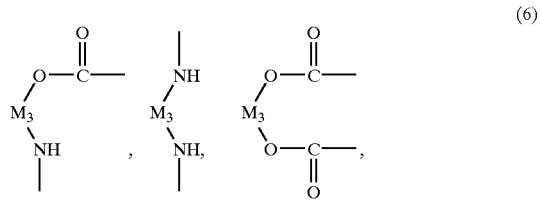

or M$_3$—S—

(where M$_3$ is transition metal of the substrate, and S is sulfur contained in the polymer).

Furthermore, when the polymer to be bonded to the substrate contains any one of the functional groups expressed in formulas (1) to (4), it is convenient in the case of bonding polymers mutually. In any method, after fixing the polymer to the substrate, a step of removing the unreacted functional group may be required.

The substrate for fixing the polymer having the functional group expressed in formula (1) or formula (2) is preferred to have a functional group containing an active hydrogen on its surface. The functional group containing the active hydrogen preferably includes, for example, a functional group such as hydroxyl group, carboxylic group, sulfinic acid group, sulfonic acid group, phosphoric acid group, phosphorous acid group, thiol group, and amino group, or a functional group active hydrogen of which is replaced by an alkaline metal or alkaline earth metal. These functional groups are preferred to be present on the surface of the substrate, or the surface of a chemical adsorption layer preliminarily fixed on the substrate having the functional group. If the functional group is not present or hardly present on the substrate surface, it is preferred to reform the substrate surface and produce or increase the functional group by UV/ozone treatment, oxygen plasma treatment, or compound oxidizing agent treatment by potassium permanganate or the like.

The substrate for fixing the polymer having the functional group, which can be coordinates into metal, is required to have the transition metal exposed on its surface, that is, a metal oxide layer must be not present. The substrate usable in formation of organic molecular layer includes the examples of the substrate presented already, such as glass, ceramic, metal and resin.

The organic molecular layer to be formed on the substrate is particularly preferred to be an organic film layer composed of a first layer of monomolecular polymer fixed to the substrate by either bonding of formula (5) or formula (6) and a second layer of a polymer bonded to this monomolecule. In the first layer, the monomolecular polymer is bonded to the substrate by coordinate bond or bond expressed in formula (7).

$$A_1\text{—}O\text{—}A_1'\text{—} \tag{7}$$

(where $A_1$, $A_1'$ are Si, Ge, Ti, Sn, Zr, or sulfur).

The second layer is a polymer layer bonded to the first layer composed of monomolecule fixed to the substrate by either bond of formula (5) or formula (6). To form this second layer, in one method, the monomolecular layer firmly bonded to the substrate is formed, and then this monomolecular layer and polymer are bonded by condensation-polymerization, or as the other method, a polymerizable functional group is contained in the monomolecule, and then this functional group and monomer are bonded by addition-polymerization, and further this monomer is polymerized to grow the polymer. In either method, by varying the length of the polymer to be polymerized with the monomolecule, the layer thickness of the obtained organic molecular layer can be controlled. When the layer thickness is within a range of 5 to 100 nm, the organic molecular layer can be efficiently formed by either method.

The protein or polypeptide used in the second process is important in its physical properties, and physiological activity is not particularly required, and therefore it can be prepared by the following common method (for example, the method disclosed by Sambrook, Flich, and Maniatis, "Molecular Cloning, A laboratory manual" 2nd edition, Cold Spring Harbor Press, 1989).

A gene or a DNA chain encoding the protein or polypeptide to be prepared may be obtained as follows. When a known gene of a known protein has already been cloned, the gene may be purchased and used. Alternatively, a DNA chain corresponding to a desired polypeptide may be synthesized according to an ordinary, method, for example, the phosphoramidite method using a DNA synthesizing system, and a double strand DNA can be obtained by using a DNA polymerase. In order to obtain a larger molecular weight of double strand DNA, a plurality of double strand DNAs synthesized by a conventional procedure can be linked to each other by using a ligase, thereby a double strand DNA of a desired length being obtained.

According to a common method, the obtained gene or DNA chain is integrated into an expression vector having a proper promoter and a replication origin, preferably a proper marker. As the usable expression vector, a most suited one can be selected depending on the host to be used. When using, *Eschericha coli* as the host, for example, λgt, pSC101, pBR322, or cosmid may be conveniently used, or when using Bacillus subtilis as the host, for example, pUB110 may be used, or when using actinomycete as the host, for example, pIJ101 may be used. In addition, the yeast may be also used as the host, and suitable vectors has been developed, but in the case of the present invention, since the physiological activity is not important, it is most preferred to use *E. coli* from the viewpoint of molecular weight, its uniformity, type and quantity of electric charge, and ease of preparation and manufacturing cost.

The method of integrating a gene or DNA chain into an expression vector has already been established, such as mix-and-match method by using linker (Sambrook et al., supra), and its commercial kit can be used.

The prepared recombinant vector is then introduced into a proper host cell such as *E. coli*, and transformation and transduction can be carried out. The procedures are also established, and can be performed by referring to the method disclosed in the publication of Sambrook et al., supra.

From the obtained transformants, the host expressing the desired protein is selected, and cultured by a conventional procedure, and the introduced gene may be expressed, so that the desired protein or polypeptide can be prepared.

Thus obtained protein or polypeptide is extremely uniform as polymer, and it can be advantageously used in formation of organic molecular layer of the present invention.

The following method may be employed for preparing the protein or polypeptide having an electric charge to be used in the present invention.

First, to prepare a protein or polypeptide having a positive charge, a DNA chain having a large number of repeats of AAA, CAA or AAT, or CGT respectively corresponding to polylysine (e-amino group of lysine residue can have a positive charge), polyglutamine or polyasparagine (acid amide group of residual end may have a positive charge), or polyarginine (guanidino group may have a positive charge) can be synthesized by a DNA synthesizer, and a double strand DNA can be obtained by using DNA polymerase, and, if necessary, the double strand DNA can be linked by using a ligase, and the protein or peptide preparation method can be executed by using the obtained double strand DNA, so that polylysine, polyglutamine, polyasparagin, or polyarginine may be prepared. There are other gene codes for coding the amino acid, and the DNA chain corresponding to any one may be used. The molecular weight of polyamino acid, that is, the length of peptide chain can be accurately controlled by controlling the number of base pairs of the DNA chain having a large number of repeats of AAA, CAA or AAT, or CGT. As the synthesis of DNA chain becomes difficult as the number of base pairs increases, and it is the most preferable to use polylysine which is easy to synthesize.

On the other hand, when preparing a protein or polypeptide having a negative charge, first, a DNA chain having a large number of repeats of GAA or GAT which is the DNA chain corresponding to polyglutamic acid or polyaspartic acid can be synthesized by a DNA synthesizer. The obtained DNA chain can be made into a double strand DNA by using DNA polymerase. As required, the double strand DNA can be linked by a ligase, and using the obtained double strand DNA, polyglutamic acid or polyaspartic acid may be prepared according to the peptide preparation method. Other gene codes of amino acid are known, and the DNA chain corresponding to any one may be used. The length of the peptide chain can be controlled by controlling the length of the chain of the corresponding DNA chain.

To prepare a polypeptide not having electric charge, it is first necessary to decide to use what kind of polypeptide.

This is because the range of usable polypeptides is wider than polypeptides having electric charge. Usually, it is convenient to select from the following, depending on the purpose: polyglycine, polyphenylalanine, polyalanine, polyleucine, polyisoleucine, polyvaline, polyproline, polyserine, polythreonine, and polytyrosine. This is because these polypeptides have known DNA sequence and it is extremely easy to synthesize the DNA chain having the gene information of these polypeptides as compared with other polypeptides. Moreover, these polypeptides are versatile, ranging from one having a small side chain (for example, the side chain of polyglycine is a hydrogen atom) to one having a bulky side chain (for example, the side chain of polyphenylalanine is a benzyl group), or from one having a hydrophobic residue (for example, polyphenylalanine, polyleucine, polyisoleucine) to one having a hydrophilic residue (for example, polyserine, polythreonine), so that a proper one may be selected from them depending on the required physical properties of the organic molecular layer of the present invention.

Gene codes encoding glycine, phenylalanine, alanine, leucine, isoleucine, valine, proline, serine, threonine, and tyrosine are known in a plurality each. One example for each is, GGG, UUU, GCC, CUU, AUU, GUU, CCC, UCC, ACC, or UAU, respectively.

Accordingly, the DNA chains corresponding to these polymers, poly-GGG, poly-TTT, poly-GCC, poly-CTT, poly-ATT, poly-GTT, poly-CCC, poly-TCC, poly-ACC, or poly-TAT can be synthesized by a DNA synthesizer to obtain double strand DNAS, and by linking the obtained double strand DNAs by ligase as required to increase the number of polymerizations, the peptide preparation method is executed by using the obtained double strand DNAs, so that polyglycine, polyphenylalanine, polyalanine, polyleucine, polyisoleucine, polyvaline, polyproline, polyserine, polythreonine, or polytyrosine can be prepared. The same results may be obtained by synthesizing the polypeptides by synthesizing the DNA chains corresponding to other gene codes of these amino acids. As mentioned above, the length of these peptide chains can be controlled easily by regulating the length of the DNA chain to be used.

When forming an organic molecular layer composed of polypeptide on the surface of a substrate, for example, there is a method in which aminosilane having an amino group at the end is bound to the surface of the substrate, and then the polypeptide is bound to this amino group by a conventional procedure. In the case of a polypeptide not having reactive functional group in the side chain, the end amino group of the polypeptide and the amino group of aminosilane are directly coupled by using a crosslinking agent such as glutaraldehyde, or the carboxyl group of the polypeptide and the amino group of aminosilane can be coupled by activating the carboxyl group by using, for example, 1-ethyl-3-(3-dimethylaminopropyl) carbodiimide (EDC).

However, in the case of a polypeptide having a functional group in the side chain, it is generally required to protect it, and it must be protected before binding with aminosilane, and freed after bonding. This complicated process may be avoided by selecting a proper polypeptide. For example, in the case of polylysine of which functional group of the side chain is only amino group, by using, for example, 1-ethyl-3-(3-dimethylaminopropyl) carbodiimide (EDC), the carboxyl group of polylysine can be activated without protecting the amino group of the side chain, and can be bound to the end amino group of aminosilane. Protecting and deprotecting the e-amino group of lysine before and after reaction notably enhance its efficiency. On the other hand, when polyglutamic acid is bound to the substrate, first aminosilane may be bound to the substrate as mentioned above, then by using, for example, glutaraldehyde, the amino group of amino silane and the amino group of polyglutamic acid can be bound without protecting the carboxyl group of the side chain.

Known methods of adjusting the effective charge density include a method of mixing a polypeptide having an electric charge with a polypeptide not having charge and adjusting the mixing rate, followed by bonding to the substrate, thereby controlling the effective charge, and a method of using a polypeptide having a group producing a positive charge and a group producing a negative charge after being dissociated, such as ordinary protein, and controlling the effective charge by adjusting the pH. A normally acidic protein such as pepsin has a strong negative charge near the neutral point, and a normally basic protein such as protamine and histone has a strong positive charge near the neutral point.

Method of Forming an Organic Molecular Layer Having a Patterned Charge Distribution on the Surface of a Substrate in a Structure of the Present Invention Several methods are known for forming a fine structural pattern of an organic molecular layer having a charge distribution on the surface of a substrate of a structure of the invention. First, there is a method by a printing system. For example, a flat plate or cylinder having an undulated surface is prepared (hereinafter called master plate) so that the convex portions may form a desired pattern, a material of organic supermolecular layer is put on the flat plate, and the master plate is placed tightly, so that the organic supermolecular layer material is put on the convex portions. The master plate is then placed tightly on the flat plate for forming the desired patterned organic molecular layer, so that the desired patterned monomolecular layer material is arranged. It can be then fixed by conventional procedure. Further, when forming a monomolecular layer having other characteristic in the non-processed portion, the material is placed correctly to avoid printing deviation, and the same process is repeated. As the master plate for the printing system, by using a rubber-like soft material, a smaller pattern may be formed by deformation by compressing. For example, by using a porous material, it can be deformed to about ½, and marks of remaining holes may be covered by the wettability of the material of the organic supermolecular layer.

As the printing system, alternatively, the ink jet system can be also used. In this method, a material for organic molecular layer is placed through ultra fine pores on the flat plate on which a desired patterned organic molecular layer is to be formed. By using the existing micro liquid drops, a pattern of about tens of microns can be formed by this method. According to this method, materials for organic molecular layers having various characteristics can be applied to the pattern at once by increasing the number of nozzles.

A method of forming the organic molecular layer on the entire surface of the flat plate preliminarily and then processing it may be also applied in patterning. An example is drawing by electron beams in the case very fine patterns are needed. A substrate with a molecular layer preliminarily formed on the entire surface thereof is put into an electron beam drawing system, and electron beams are emitted to the area in which the molecular layer is not necessary. By this electron beam energy, the chemical bonds for forming the organic molecular layer are broken, and the monomolecular layer is removed in vacuum. By this method, an extremely fine pattern can be drawn.

It is also possible to pattern by photolithography generally employed in semiconductor process. An organic molecular layer is preliminarily formed on the entire surface of the flat plate, and the resist pattern is formed on the organic molecular layer by photolithography. The organic molecular layer without resist layer is then removed by oxygen plasma device or ashing device used in semiconductor process, and the resist is removed, so that the desired pattern can be obtained.

In other method, a resist pattern is formed on the substrate, and an organic molecular layer is formed, then the resist pattern is removed, so that a desired pattern of organic molecular layer can be obtained.

These patterning methods are representative examples, and the present invention is not limited to them alone.

In these methods, it is easy to form a positive charge or a negative charge on the surface of the monomolecular layer to be first formed on the substrate. On the monomolecular layer having a positive charge on the surface thus formed, for example, an acidic protein having a negative charge at neutral pH is easily adsorbed, or on the monomolecular layer having a negative charge, for example, a basic protein having a positive charge at neutral pH is easily adsorbed. After adsorption, the protein can be bound to the substrate by using a crosslinking agent such as glutaraldehyde, between a functional group possessed by each molecule of the monomolecular layer, such as amino group or hydroxyl group, and functional groups possessed by the protein.

A method of forming a positive charge and a negative charge on the monomolecular layer is explained below.

As the material for forming the monomolecular layer, for example, 10-(carbomethoxy)ethyltrichlorosilane can be used, and a monomolecular layer can be formed on a specified substrate using the compound. After then, by hydrolytic process of this monomolecular layer, the ester group of the monomolecular layer can be converted into a carboxyl group, and by pH adjustment, the carboxyl group of the monomolecular layer can be converted into anion. Thus, the surface of the monomolecular layer is made anionic.

In another example, using N-trimethoxysilylpropyl-N,N,N-trimethyl ammonium chloride as the material for forming the monomolecular layer, a monomolecular layer can be formed on a specified substrate. The layer material is in a form of ammonium chloride, and has an ammonium group of cation. Therefore, the surface of the monomolecular layer is cationic.

As other material, using 3-aminopropyltrimethoxysilane, a monomolecular layer can be formed, and the surface of the completed monomolecular layer may be brought into contact with aqueous solution of hydrogen chloride, so that the surface of the monomolecular layer can be converted into ammonium chloride same as above.

Aside from the presented examples of acetic acid ion and ammonium ion, moreover, nitric acid ion and sulfuric acid ion can be also formed.

These methods are only a very small part of the applicable methods, and the technique to be employed differs depending on the material to be used, and in any case it is realized by the ordinary chemical techniques.

Structure of the Invention

Several examples of the structure of the present invention are shown in sectional view in FIG. 1, and it is the structure satisfying the conditions that it is composed of surfaces of closely mutually facing two substrates 1 and 2, and that the gap 3 between the surface of one organic molecular layer 4 and the surface of other substrate (when organic molecular layer is not formed) or other organic molecular layer 5 is extremely small, usually less than 100 $\mu$m, preferably less than 1 $\mu$m.

In an embodiment of the structure of the present invention, an electrode 6 is placed on one substrate, and an electric field is applied, so that an electrostatic repulsive force may be generated between it and the surface of the other substrate.

On the surface of the substrate of the structure of the present invention, a dielectric layer 7 and/or wear-resistant layer 8 may be provided, and an organic molecular layer may be formed thereon. Such wear-resistant layer can be composed of, for example, diamond-like carbon layer, ion implantation layer, or nitride layer, and the dielectric layer is composed of barium titanate ($BaTiO_3$), barium strontium tantalate (BST), etc.

The organic molecular layer, which is an important component of the structure of the present invention can be formed on the substrate surface, for example, by the method described above.

The periphery of the organic molecular layer may be filled with, for example, water, aqueous solution, lower alcohol with 1 to 6 carbon atoms, fluoropolymer compounds such as hydroperfluoropolyethylene or perfluoropolyethylene, oil-based material such as lubricating oil, surface active agent, or the like.

A solid electrolyte may be placed or laminated on the surface of the organic molecular layer. The solid electrolyte is a solid matter allowing ions to move freely. When the organic molecular layer is dissociated in the liquid, ions dissociated from the organic molecular layer diffuse toward the surface of the solid electrolyte. If the ions originally existing in the solid electrolyte are hardly mobile, the charge distribution in the solid electrolyte is determined by the concentration distribution of the ions dissociated from the organic molecular layer. As a result, an electric charge appears on the surface of the solid electrolyte by the ions dissociated from the organic molecular layer.

Usable examples of solid electrolyte include inorganic solid electrolyte such as silver iodide, Nab-alumina, lithium nitride and zirconium dioxide (JME Material Science, Ion conduction of solid, 1999, Uchida Rokakuho Publishing), poly(ethylene oxide), poly(propylene oxide), and their derivatives, for example, polymer solid electrolyte represented by 2-(2-methoxyethoxy)ethyl glycidyl ether (DENKI KAGAKU, No. 4, 1994, p. 304). Among them, the solid electrolyte capable of contacting tightly with the organic molecular layer is suited to the present invention.

In these structures, a tiny gap between the two surfaces is maintained by various repulsive forces acting between the organic molecular layer surface and the facing substrate surface or the organic molecular layer surface on the substrate surface. The lubricity between the two substrate surfaces of the structure of the invention is maintained by the elasticity of the organic molecular layer.

The shape of the structure of the invention is not particularly limited. The structure may have any shape as far as satisfying the conditions that the surfaces of the two substrates of the structure are close to each other, that an organic molecular layer is formed by covalent bond at least on one surface thereof, and that the gap between this organic molecular layer and the other substrate surface or the organic molecular layer covalently bonded on the other substrate surface is extremely small, usually less than 100 μm, preferably less than 1 μm. For example, the both substrates may be flat surfaces, the both substrates may be cylinders, the both substrates may be disks, the both substrates may be spheres, or the both substrates may have other shapes. The surfaces of the two substrates may face each other either entirely or partly.

Motor Comprising the Structure of the Present Invention

The motor comprising the structure of the present invention is, as shown in a sectional view in FIG. 2, a motor comprising a slider 11 and a stator 12, which are two substrates of the structure of the present invention, wherein an organic molecular layer 14 is formed on the surface of at least one of the slider and stator (for example, slider) wherein the gap 13 between the surface of this organic molecular layer and the surface of the other one (for example, stator) or the organic molecular layer 15 formed on this surface is usually less than 100 μm, preferably less than 1 μm. In the case of such motor, when the distance between the organic molecular layer surfaces of the slider and stator becomes in the order of 100 nm, a steric repulsive force acts between the surfaces (J. N. Israelachivilli, "Intermolecular force and surface force", 2nd edition, pp. 277–287, 1996), thereby bringing about an effect of significant decrease of the friction due to sliding of the two surfaces.

As the drive device for such motor, any existing device may be used. However, as the motor diameter is smaller, for example, when the inside diameter 19 of the slider is less than 2 mm, and the drive device using coil cannot be used due to torque shortage, it is preferred to use the drive device on the basis of the electrostatic mutual action explained below.

Electrostatic Drive Motor Comprising the Structure of the Invention

The electrode of the electrostatic motor comprising the structure of the present invention can be shaped, for example, like a comb, and a pattern can be formed along a cylindrical slider. An alternating-current power source can be applied to the electrode.

An insulating layer may be provided on the stator surface, and an organic molecular layer can be formed thereon. The pattern of the organic molecular layer can be formed so that the polarity should be inverted at a specific small interval. A direct-current bias voltage may be applied between the slider and stator so as to form a repulsive force between the slider and stator.

On the slider surface, an electrode can be formed by using ITO or similar material. An insulating layer may be formed on the electrode, and the surface may be polished to keep the surface smoothness. The electrode can be formed intermittently at an interval of one pitch of positive and negative pattern of the organic molecular layer. When the phase of the voltage applied to the electrode is changed, the attractive force or repulsive force of the organic molecular layer varies depending on the change, and a rotating force can be applied to the organic molecular layer in the tangential direction.

The operation of the electrostatic motor of the invention is, for example, as follows. Suppose, at a certain moment, that the electric charge of the organic molecular layer at the stator side of the portion facing the electrode installed in the slider is negative, and that the voltage applied to the electrode is negative. At this time, a repulsive force is generated between the organic molecular layer and the electrode, and the slider begins to rotate. At the next moment, the electrode faces the second organic molecular layer at the stator side. At this time, a positive voltage is applied to the electrode, and if the electric charge of the second organic molecular layer at the stator side facing the electrode is positive, a repulsive force is generated as a driving force between the organic molecular layer and the electrode, and the slider rotates further. In this way, the rotating force in the same direction is generated continuously between the slider and the stator, and the slider rotates.

A second example of the electrostatic drive motor comprising the structure of the present invention is a motor having two electrodes connected to two AC power sources deviated in phase by 180° from each other. Herein, the electrode 1 and electrode 2 are mutually interlaced like a comb and formed in a pattern.

An organic molecular layer can be directly and covalently bound to the stator. The pattern of the organic molecular layer can be formed so that the polarity may be inverted alternately at a specified narrow interval in the rotating direction of the slider. Between the slider and the stator, by applying an AC bias voltage, a repulsive force may be generated between the slider and the stator. The AC bias is a sufficiently high frequency more than five times of the frequency of the driving voltage, so as not to have effects on the driving. The vibration of this high frequency is mainly used for vibrating the organic molecular layer from outside. The friction of the organic molecular layer vibrating by this vibration is a dynamic friction, and a much lower lubrication than static friction may be obtained.

More specifically, the electrode 1 can be formed on the slider surface by using ITO or other material. A wear-resistant layer may be formed on the electrode, and the surface may be polished to keep the surface smoothness. The electrode can be formed intermittently at an interval of one pitch of positive and negative pattern of the organic molecular layer, at a specific small interval, and connected to one AC power source. The electrode 2 can be similarly formed intermittently at an interval of one pitch of positive and negative pattern of the organic molecular layer 1, and connected to the AC power source deviated in phase by 180° from the phase of the power source of the electrode 1. When the phase of the voltage applied to the electrode changes, the attractive force or repulsive force applied to the organic molecular layer varies depending on the change, and a rotating force can be applied to the organic molecular layer in the tangential direction, so that the slider rotates about the stator.

For explaining this operation, suppose, at a certain moment, that the electric charge of the organic molecular layer of the portion at the stator side facing the electrode 1 installed in the slider is negative, that the electric charge of the organic molecular layer of the portion at the stator side facing the electrode 2 is positive, and that the voltage applied to the electrode 1 is positive. At this time, a repulsive force is generated between the organic molecular layer and the electrode 1, and the slider moves in the direction of arrow. A next moment, the electrode 1 is charged with a positive voltage, and the electrode 2 with a negative voltage. The slider rotates, and when the electric charge of the organic molecular layer facing the electrode 1 of the slider is positive, and the electric charge of the organic molecular layer facing the electrode 2 is negative, a repulsive force acts again between the organic molecular layer and electrode, and the slider moves in the direction of arrow. Thus, a driving force is generated continuously in the same direction between the slider and the stator, and the slider rotates. As compared with the structure of one electrode, a double driving force may be obtained.

A third example of the electrostatic motor of the present invention relates to a discoidal electrostatic motor comprising the structure of the invention. The motor can be composed of two substrates (slider and stator) disposed closely to each other with a tiny gap, usually less than 100 $\mu$m, preferably less than 1 $\mu$m wherein one of the two substrates (slider) is a disk wherein an organic molecular layer having an electric charge can be formed repeatedly in a radial pattern in a specified line width on the surface of the disk wherein an electrode can be formed on the other substrate repeatedly in a radial pattern in the specified line width wherein an alternating current can be applied to the electrode of the repeated pattern, thereby a propulsive force being generated in the disk. In such discoidal electrostatic motor, a magnetic recording medium may be formed on the surface of the rotating disk, and a magnetic recording and reproducing element on the stator.

A fourth example of the electrostatic motor of the present invention relates to a spherical electrostatic motor comprising the structure of the invention. The motor can be composed of the mutually facing surfaces of two substrates (slider and stator) at a extremely small gap of usually less than 100 $\mu$m, preferably less than 1 $\mu$m wherein the mutually facing surfaces are spherical wherein an organic molecular layer having an electric charge can be formed repeatedly in a specified line width on the surface of the inside sphere (slider) wherein an electrode can be formed on the outside hemispherical inside repeatedly along the spherical surface in the specified line width wherein an AC voltage can be applied to the electrode of the repeated pattern, thereby a propulsive force being generated in the inside sphere.

The repeated pattern of the organic molecular layer and electrode may be either latitudinal direction or longitudinal direction, and as for the electrode, the repeated pattern in the latitudinal direction may be divided in the longitudinal direction.

In another embodiment, the present invention provides for a bearing without a mechanical axis used in combination with an electrostatic motor. The bearing without mechanical axis can comprising a rotatable discoidal substrate (the first substrate) and a fixed substrate (the second substrate) which are disposed closely to each other, wherein a circular convex supporter having a specified radius in a specified line width is disposed on the closely facing surface of the first substrate wherein an organic molecular layer having an electric charge is formed on the supporter surface wherein a convex supporter is disposed on the facing surface of the second substrate at a specified radius position in a specified line width wherein an organic molecular layer having a same type of electric charge as the electric charge of the organic molecular layer of the first substrate can be formed on the supporter surface wherein a liquid electrolyte can be applied on the surface of the first substrate wherein the convex supporter of the second substrate can be immersed in the liquid electrolyte to maintain the tiny gap between the two surfaces of usually less than 100 $\mu$m, preferably less than 1 $\mu$m by a balance between the electric double layer repulsive force acting between the organic molecular layer surfaces and the meniscus attractive force of the liquid surface formed between the two surfaces.

The bearing without a mechanical axis mentioned above can be modified so as to generate a centripetal force on the center of the disk by further forming an organic molecular layer having a circular charge pattern on the surface of the first substrate in a fine line width, forming an electrode on the surface of the second substrate so as to apply the same charge at the outside and the different charge at the inside, enclosing the charge pattern on the first substrate, and applying a DC voltage between the two electrodes. Such a bearing is also included in the present invention.

Guide Comprising the Structure of the Invention

In a further embodiment, the present invention provides for a guide. A guide, described here, refers to, for example, a guide comprising two substrates (the first and the second substrates) disposed closely with a tiny gap, wherein a linear organic molecular layer having an electric charge can be formed on the surface of the first substrate wherein an electrode having a specified line width and interval can be formed linearly on the surface of the second substrate wherein a liquid electrolyte can be applied on the surface of the first substrate wherein a DC voltage can be applied to the electrode so as to make it movable along the line by external forces.

In another embodiment, the present invention provide for a guide comprising two substrates (the first and the second substrates) disposed closely to each other to give a tiny gap wherein two linear convex supporters (the first and the second supporters) having a specified line width can be provided on the surface of the first substrate wherein organic molecular layers having an electric charges can be formed on the surfaces of the first and second supporters wherein two linear convex supporters (the third and the fourth supporters) having a specified line width can be provided on the surface of the second substrate wherein an organic molecular layer having an electric charge can be formed on the surface of the third supporter wherein a liquid electrolyte can be applied on the surface of the first substrate wherein the tiny gap between the surfaces of the organic molecular layers can be maintained by the electric double layer repulsive force acting between the two surfaces wherein a linear electrode having a specified line width and interval can be formed on the fourth convex supporter wherein an DC voltage can be applied to the electrodes so as to make it movable along said line by external forces;

The tiny gap between the surface of the organic molecular layer on the one substrate and the surface of the electrode or the surface of the organic molecular layer on the other substrate is usually less than 100 $\mu$m, preferably less than 1 $\mu$m.

Actuator Comprising the Structure of the Invention
(1) Cylindrical Actuator

As another embodiment of the present invention, an actuator functioning as an artificial muscle is presented. Specifically, it is, for example, an actuator comprising a cylindrical structure. In the cylindrical structure, discoidal electrodes are buried at specific intervals parallel to the cylindrical bottom, and multiple fine pores penetrating vertically through the cylinder are provided. Narrow tubes can penetrate through these fine pores. On the surface of the narrow tubes, a band pattern of organic molecular layer having a positive charge, and a band pattern of organic molecular layer having a negative charge can be arranged alternately, and the band interval is same as the interval of the discoidal electrodes, and an AC voltage can be applied in the discoidal electrodes. Liquid may be present between the fine pores and narrow tubes, and the gap between the surface of the organic molecular layer of narrow tubes in the fine pores and the inner wall of fine pores is maintained to be usually less than 100 μm, preferably less than 1 μm.

The material of the cylindrical actuator is not particularly specified as far as it is insulating and it can be processed into a cylindrical form, and thermoplastic resin, thermosetting resin, silicone rubber, other resin, glass and ceramic may be preferably used. In particular, by using an elastic resin or silicone rubber, an artificial muscle having a flexible structure may be formed. The material of the discoidal electrode is not particularly specified as far as it is conductive, and aluminum, iron, copper, platinum, gold and chromium may be used. In particular, the inexpensive aluminum or chemically stable platinum is preferred. To form the cylindrical structure, for example, multiple columnar resin pieces and discoidal electrodes are prepared, they are laminated alternately, and heated, and the resin pieces and electrodes are integrated by thermal adhesion. Penetration holes in the cylindrical structure are opened in the integrated circular columns by discharge processing, etching, punching, etc. Alternatively, a large number of circular columns and electrodes are previously prepared and then these may be laminated alternately and integrated a unity by, for example, thermo-compression bonding.

For the narrow tubes, an insulating material is preferred, and fine wires of glass or resin used in optical fibers can be used. For electric charge pattering of the fine wires, for example, the organic molecular layer having an electric charge at the molecular end may be fixed in a pattern by photolithography.

The shape of the actuator is not particularly limited, and may include cylindrical, film, elliptical, square column and other shapes.

(2) Film Type Actuator

In other embodiment of the present invention, a film type actuator is provided. Specifically, it is an actuator comprising alternately laminating two kinds of films making mutually relative motions by application of voltage wherein a set of comb electrodes can be formed on one side of the first film wherein a rectangular region of an organic molecular layer having a positive charge and a rectangular region of an organic molecular layer having a negative charge can be alternately arranged on the surfaces of one side of the second film wherein the width of said adjacent rectangular regions may coincide with the width of the comb electrode wherein multiple films can be laminated so that the surface of the comb electrode and the surface of the organic molecular layer can face with each other at a gap of usually less than 100 μm, preferably less than 1 μm wherein AC voltages deviated, for example, in phase by 180° from each other can be designed to apply to said set of comb electrodes.

By forming an organic molecular layer on the surface of the film having the electrodes installed therein the repulsion by intermolecular forces between the films may be further increased, and the mutual move may be smoother. In this case, since an organic molecular layer can be easily formed on a tin oxide layer, it is preferred to use the tin oxide electrodes as an electrode.

The film used in the present invention is not particularly limited as far as it is insulating, and may be composed of resins such as thermoplastic resin, thermosetting resin and silicone rubber, glass and ceramics. The material of the comb electrode is not limited as far as it is conductive, and aluminum, iron, copper, platinum, gold, chromium and others may be used.

Above all, the inexpensive aluminum and chemically stable platinum are preferred. The electrode may be formed on the film by various methods, including the electron beam deposition, sputter deposition, thermal deposition, and other vacuum deposition method, and also electrolytic method, and printing method. Patterning of comb is also possible by fitting the mask of comb pattern to the film when forming the electrode on the film in each method. Alternatively, after forming the electrode on the entire film surface, the comb electrode pattern can be formed by photolithography. Charge pattern on a film can be realized, for example, by fixing the organic molecular layer having an electric charge at the molecular end in a specified pattern on the film.

Micro-pump Comprising the Structure of the Present Invention

The micro-pump of the present invention comprises a diaphragm of silicone film, an organic molecular layer and an electrode formed thereon. That is, the inside cylinder can be surrounded by the outside cylinder with liquid existing between them.

A chamber including a pump operating space may be provided in part of the outside cylinder. The diaphragm can be disposed between this chamber and the inside cylinder. The liquid to be transported can be conveyed, for example, through the gap between the diaphragm of silicone film and the surface of the inside cylinder. The electrode is disposed oppositely to the diaphragm, and a voltage is applied between the diaphragm and electrode. The width of electrode may be a specific interval, and the chamber may be formed by anisotropic etching using, for example, KOH, and the diaphragm may be formed by, for example, etching the p-type semiconductor as the base plate, and leaving the n-type portion of about 1 μm in thickness. The organic molecular layer can be formed on the surface of the diaphragm, and an electric charge can be applied on the surface of the organic molecular layer. For example, corresponding to the electrode on the circumference of about 2 mm in diameter, the organic molecular layer having positive or negative charge alternately may be disposed. The diaphragm and the anisotropically etched chamber can be filled with medium, such as water, alcohol, HPE or other liquid.

When a negative or positive charge is applied to the electrode, an attractive force or repulsive force is generated between it and the organic molecular layer having a corresponding positive charge, and the portion of the silicone diaphragm can be moved in the outer circumferential direction or inner circumferential direction, and a pump region can be formed with the adjacent electrode region. That is, when a negative voltage is applied to the electrode, the diaphragm portion of the organic molecular layer having a negative charge is pushed to the inside cylinder by the electrostatic repulsive force, and the diaphragm portion of the organic molecular layer having a positive charge is attracted in the outer circumferential direction by the electrostatic attractive force. When the voltage is changed and a positive voltage is applied to the electrode, the diaphragm portion of the organic molecular layer being pushed to the inside cylinder is then attracted in the outer circumferential direction, and receives the liquid. On the other hand, the diaphragm portion of the organic molecular layer being attracted in the outer circumferential direction is pushed to the inside cylinder, thereby forcing out the liquid. In this way, the diaphragm moves depending on the voltage change, so that the liquid can be conveyed in a specific direction.

Vibration-absorbing Table Comprising the Structure of the Present Invention

The vibration-absorbing table comprising the structure of the present invention comprises two flat plates, and two organic molecular layers formed thereon. These organic molecular layers consist of the anchor portion for bonding to the flat plates, the middle portion working as a dynamic elastic element, and a surface portion having an electric charge. The electric charge of the organic molecular layers of the two flat plates is of same polarity, and the space of the two is filled with medium. The two flat plates are disposed closely to each other, and an electrostatic repulsive force works. The distance of the two flat plates is usually less than 100 µm, preferably less than 1 µm. The thickness of the organic molecular layer formed on each flat plate is about 0.15 mm. The upper flat plate is floating by the intermolecular repulsive force between the two organic molecular layers in the medium.

When a vibration is applied to the surface of the lower flat plate of the vibration-absorbing table of the present invention, the surface of the lower flat plate 2 vibrates in a microscopic view, and by this wavy motion, the electric charge of the organic molecular layer 2 of the lower flat plate produces a portion approaching the electric charge of the organic molecular layer 1 of the upper flat plate and a portion departing from the charge. By the motion of the organic molecular layer 2 of the lower flat plate, a portion approaching the electric charge of the organic molecular layer 1 and a portion departing therefrom are produced in the organic molecular layer 2 of the lower flat plate. And in the approaching portion, in order to hold the weight of the upper flat plate, the elastic element portion of the organic molecular layer 2 of the lower flat plate contracts and the energy is accumulated. In the departing portion, to the contrary, the elastic element portion of the organic molecular layer 2 expands and the energy decreases. In average, the sum of the energy accumulated in the elastic element of the organic molecular layer 2 is zero. Since the vibration of the lower flat plate propagates, the energy of the propagating wave is converted into energy of vibration of the organic molecular layers formed on the upper flat plate and lower flat plate depending on the propagation. Thus, the vibration transmitted to the lower flat plate is absorbed, and the vibration of the upper flat plate is damped.

Micro-nozzle Comprising the Structure of the Present Invention

The micro-nozzle comprising the structure of the present invention consists of two conical surfaces and an organic molecular layer formed thereon.

An organic molecular layer is formed on the surface of a nozzle core, and a similar organic molecular layer is formed on the surface of a nozzle outlet. The both organic molecular layers consist of the anchor portion for binding covalently to the surface of the nozzle core or nozzle outlet, a middle portion acting as a dynamic elastic element, and a surface portion having an electric charge. The second conical surface is formed opposite to the first conical surface and the spacing between the first conical surface and second conical surface is filled with injection liquid as a medium. The injection liquid is usually water, alcohol, or organic solvent.

To stop injection, the nozzle core advances to the nozzle outlet, and the nozzle decreases the flow rate of the injection liquid by mutual intermolecular repulsive force, so that injection is arrested. By the organic molecular layers formed on the surfaces of the first nozzle core and second nozzle outlet, when two flat plates confront each other, an electrostatic repulsive force acts. The two flat plates approach each other until the organic molecular layers 1 and 2 contact with each other, and stops injection liquid. If the organic molecular layers 1 and 2 are not formed on the contact surface, the leading end portion of the nozzle will be worn out shortly and the nozzle life should be short. According to the invention, it is effective to decrease the damage due to contact of the wear resisting layer.

The invention will be described, hereafter, by means of the following examples, reference examples and figures, which should not any way be construed as limiting.

BRIEF DESCRIPTION OF THE DRAWINGS

FIG. 1 is a schematic diagram showing a structure of the invention.

FIG. 2 is a sectional view showing a configuration of slider and stator of an ultra small motor of the invention.

FIG. 3-a is a schematic diagram of covalent bond of one polymer on the substrate surface. FIG. 3-b is a diagram showing distribution of length of coil of one polymer molecule in liquid that is covalently bound to the substrate surface. FIG. 3-c is a schematic diagram of an organic molecular layer obtained by covalent bond of multiple polymermolecules on the substrate surface. FIG. 3-d is a diagram plotting the distance between the substrates against repulsive force generated between the organic molecular layers. The shorter the distance between substrates, the higher elevates the repulsive force dramatically.

FIG. 4B shows the configuration in which organic molecular layers are formed on the surfaces of the slider and stator, and electrodes are buried in the slider. FIG. 4C shows an organic molecular layer and a dielectric layer formed on the surface of the stator. FIG. 4D shows formation of an organic molecular layer and a wear-resistant layer formed on the surface of the stator. FIG. 4E shows formation of an organic molecular layer, a dielectric layer and a wear-resistant layer on the surface of the stator.

FIGS. 9-1 and 9-2 are diagram illustrating the operation of the electrode configuration shown in FIG. 8.

FIGS. 12-1 and 12-2 are diagrams illustrating an operation of the motor of the electrode configuration having two electrodes shown in FIG. 11.

FIG. 13 shows a sectional view of a hard disk having a configuration of the discoidal electrostatic motor of the present invention, a sectional view along the circumference of the disk, a plan view of the disk, a plan view of stator of the motor and a mechanism that generates a centripetal force.

FIG. 16 shows a process for forming an electrode of a discoidal electrostatic motor of the present invention.

FIG. 17 shows a side view after formation of a pattern of electric charge on a spherical surface, a sectional view showing a relative position of the electric charge pattern against the electrode pattern, and a perspective view of the electrode pattern.

Figure 3A:
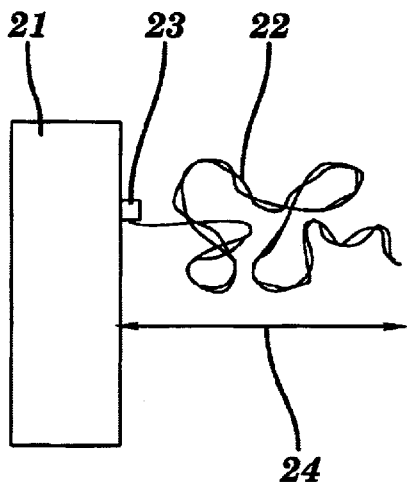
FIGS. 3a–3d are diagrams showing repulsive force acting between organic molecular layers.

EXPLANATION OF THE SYMBOLS 1 substrate 1
2: substrate 2
3: gap
4: organic molecular layer formed on the substrate 1
5: organic molecular layer formed on the substrate 2
6 electrode
7: dielectric layer
8: wear-resistant layer
11: slider of a motor
12: stator of a motor
13: gap between the slider and the stator of a motor
14: organic molecular layer formed on the slider surface
15: organic molecular layer formed on the stator surface
16: electrodes buried in the slider of a motor.
17: dielectric layer
18: wear-resistant layer
19: insulating layer
20: diameter of a stator
21: substrate
22: coil of a polymer molecule
23: anchor part of a polymer coil
24: length of a polymer coil
25: electric charge of organic molecular layer
26: electrodes which are applied AC voltages deviated in phase by 180° from each other
27: propulsive force
28: insulator medium
31: inner circular cylinder of the present invention
32: outer circular cylinder of the present invention
33: chamber containing an operation mechanism of the pump
34: diaphragm of silicone film
35: electrode
36: voltage
37: organic molecular layer
38: electric charge
41: plane plate
42: plane plate
43: organic molecular layer
44: organic molecular layer
45: electric charge of organic molecular layer
46: medium
51: nozzle core
52: outlet of a nozzle
53: organic molecular layer
54: organic molecular layer
55: fluid for jet

EXAMPLES

Reference Example 1

Formation of Organic Molecular Layer on the Surface of a Metal Substrate

A solution A was prepared by mixing 18 ml of isopropanol and 0.2 ml of 4-vinyl anthranilic acid. A copper substrate was immersed in this solution A, and let stand for 1 hour. This substrate was rinsed in about 100 ml benzene, and was dried in air, and a thin film was formed. Formation of thin film was confirmed by checking a characteristic signal by Fourier transform infrared spectroscopy.

In 50 ml of distilled and refined toluene, 20 ml of styrene monomer and 40 mg of azobisisobutyronitrile were added, and the substrate forming the thin film was immersed. After removing the dissolved oxygen by nitrogen bubbling for about 30 minutes, it was heated for 1 hour at 100° C. This substrate was rinsed in toluene, and dried in air, and a thin film was formed.

The obtained thin film was analyzed by Fourier transform infrared spectroscopy and ultraviolet visible spectral analysis, and coordinate bond of nitrogen atom derived from amino group and oxygen atom derived from carboxyl group was observed on the copper atom of the substrate, and a monomolecular layer derived from 4-vinyl anthranilic acid was formed on the substrate, and it was confirmed that polystyrene was bound to the monomolecular layer.

Reference Example 2

Formation of Organic Molecular Layer on the Surface of a Glass Substrate

A solution B was prepared by mixing 14 ml of distilled and refined hexadecane, 2 ml of distilled and refined tetrahydrofuran, 2 ml of 10-(thienyl)decyl trichlorosilane, and 10.8 mg of dry FeCl3 and stirring for 30 minutes. A glass substrate was immersed in the solution B for 1 hour. The substrate was rinsed in about 100 ml of tetrahydrofuran, and dried in air, and a thin film was formed. The thin film was analyzed by Fourier transform infrared spectroscopy and ultraviolet visible spectral analysis. The results indicate that a layer of 3-decylthiophene was fixed on the glass substrate by siloxane bond, that a polymerized layer of 10-(thienyl) decyl trichlorosilane was fixed on the 3-decylthiophene layer, that the layers of 10-(thienyl)decyl trichlorosilane were mutually bound to each other and polymerized at the position 2 in the thiophene ring, that the layer of 3-decyl thiophene were similarly bound to each other at position of 2 of the thiophene ring, and that the trichlorosilane group of 10-(thienyl) decyl trichlorosilane formed a siloxane bond with the adjacent trichlorosilane group in the atmosphere containing moisture, and that the polymers were mutually bound to each other.

As a result of deflection analysis of the obtained organic molecular layer, the layer thickness was 12 nm (refractive index 1.49).

Reference Example 3

Preparation of Polypeptide for Use in Organic Molecular Layer

The polypeptide used in the organic molecular layer of the structure of the present invention may be selected, as far as the organic molecular layer is not particularly required to have an electric charge, properly from the following depending on the purpose: polyglycine, polyphenylalanine, polyalanine, polyleucine, polyisoleucine, polyvaline, polyproline, polyserine, polythreonine, and polytyrosine. In the case of polyphenylalanine, for example, poly-T is synthesized by using a DNA synthesizing system, double strands may be prepared by using a commercially available DNA polymerase, and a plurality of double strand DNAs obtained by using a commercially available ligase can be linked, and a double strand DNA corresponding to the required polypeptide molecular weight can be synthesized. A proper linker is bound to this, and it is digested by using a proper restriction enzyme commercially available, and integrated into a commercially available expression vector, and a recombinant vector can be prepared. The obtained recombinant vector may be introduced into E. coli, and a proper E. coli having a DNA chain corresponding to polyphenylalanine of a desired size can be selected, and it can be cultivated to express the DNA chain, and the produced polyphenylalanine can be isolated and purified.

Reference Example 4
Formation of Organic Molecular Layer Having Patterned Charge Distribution on the Surface of Slider or Stator Several methods are known, as presented above, for forming an organic molecular layer having a fine patterned charge distribution on the surface of a slider or stator of the motor of the present invention. For example, a method by electron beam is explained below.

In advance, an organic molecular layer is formed on the entire surface of the slider or stator, and it is put into an electron beam drawing machine, and electron beam is emitted to the unnecessary area of molecular layer. The organic molecular layer of the unnecessary area can be removed. As a result, a fine pattern can be drawn by this method.

The electric charge on the organic molecular layer is prepared in the following procedure. A trichlorosilane derivative having an amino group at the end is bound to the entire surface of a slider or stator of a motor, and the aminosilane is removed from the unnecessary area (the portion to be provided with a negative charge) by electron beam according to the pattern to the positive charge portion, polylysine can be bound by using 1-ethyl-3-(3-dimethylaminopropyl)carbodiimide (EDC). In the surface portion of the substrate removed in the first place, aminosilane is bound again to the surface portion of the substrate from which the aminosilane is previously removed and then the amino group of aminosilane and end amino group of polyglutamic acid are linked by using glutaraldehyde. Thus, the positive charge and negative charge can be distributed on the surface of the slider or stator of the motor according to the pattern.

Referring now to the drawing, examples of the present invention are described below. The examples are divided into two parts, one being associated with structures having a gap of less than 1 $\mu$m, and the other structures having a gap of less than 100 $\mu$m.

Structures Having a Gap of Less Than 1 $\mu$m

Example 1

Figures 1, 9:
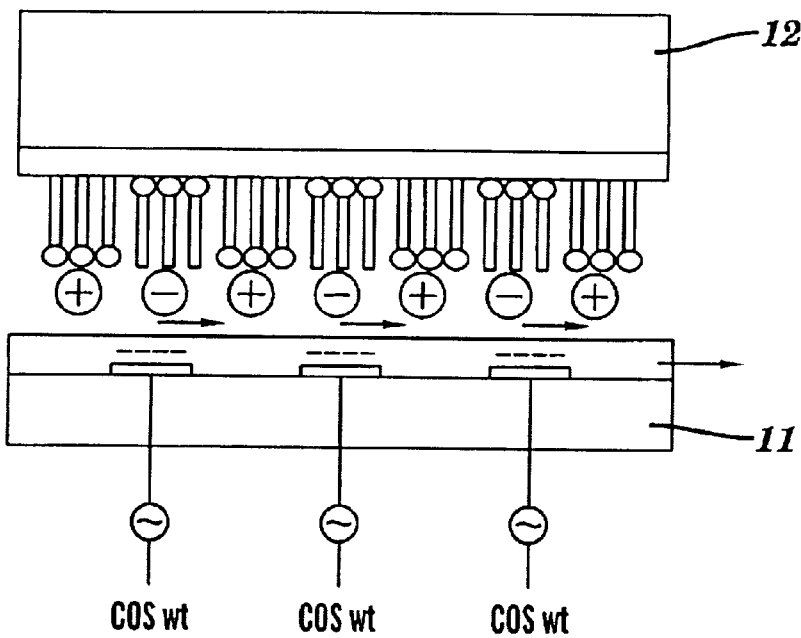

FIG. 1 shows an example of the structure of the present invention.

The structure of the present invention is a structure in which an organic molecular layer 4 is formed on at least one surface (for example, surface of substrate 1) of two closely mutually facing substrates 1 and 2 wherein the gap 3 between the surface of the organic molecular layer 4, and the surface of the other substrate (for example, substrate 2) or the surface of an organic molecular layer 5 on the substrate 2 is less than 1 $\mu$m.

The organic molecular layers 4 and 5 that are important components of the structure of the invention are formed on the surface of the substrates by any one of the methods described in Reference 1 to Reference 4.

In this structure, by steric repulsive forces acting between the surface of the organic molecular layer on one substrate and the facing other substrate surface or the surface of the organic molecular layer on the other substrate, the tiny gap between the two surfaces can be maintained. The lubricity of the surfaces of the two substrates of the structure of the present invention is assured by the elasticity of the organic molecular layers.

The shape of the structure of the present invention is not particularly limited, and the structure may have any shape as far as satisfying the conditions that the surfaces of the two substrates are close to each other, that an organic molecular layer is formed at least on one surface by covalent bond, and that the gap between this organic molecular layer and the surface of the other substrate or the organic molecular layer covalently bound to the surface of the other substrate is less than 1 $\mu$m. For example, one of the substrates or both the substrates may be flat plate(s), one of the substrates or both the substrates may be cylinder(s), or one of the substrates or both the substrates may have other shapes. The surfaces of the both substrates of the structure may closely face with each other either entirely or partly.

In a second embodiment of the structure of the present invention (FIG. 1-$a$), an electrode 6 is disposed at one substrate, and an electric field is applied, so that an electrostatic repulsive force is generated between the electrode and the surface of the other substrate.

In a third embodiment of the structure of the present invention, a dielectric layer 7 (FIG. 1-$b$) or a wear-resistant layer 8 (FIG. 1-$c$), or both dielectric layer 7 and wear-resistant layer 8 (FIG. 1-$d$) are further provided on the surface portion of the substrate, and an organic molecular layer is formed thereon. The wear-resistant layer is composed of, for example, diamond-like carbon film, ion implantation film, or nitride film, and the dielectric layer is barium titanate ($BaTiO_3$) or barium strontium tantalate (BST).

The periphery of the organic molecular layer may be filled with, for example, water, aqueous solution, lower alcohol with 1 to 6 carbon atoms, fluorine polymer compound such as hydroperfluoropolyethylene or perfluoropolyethylene, lubricating oil or other oil-based material, and surface active agent.

Example 2

Figures 2, 9:
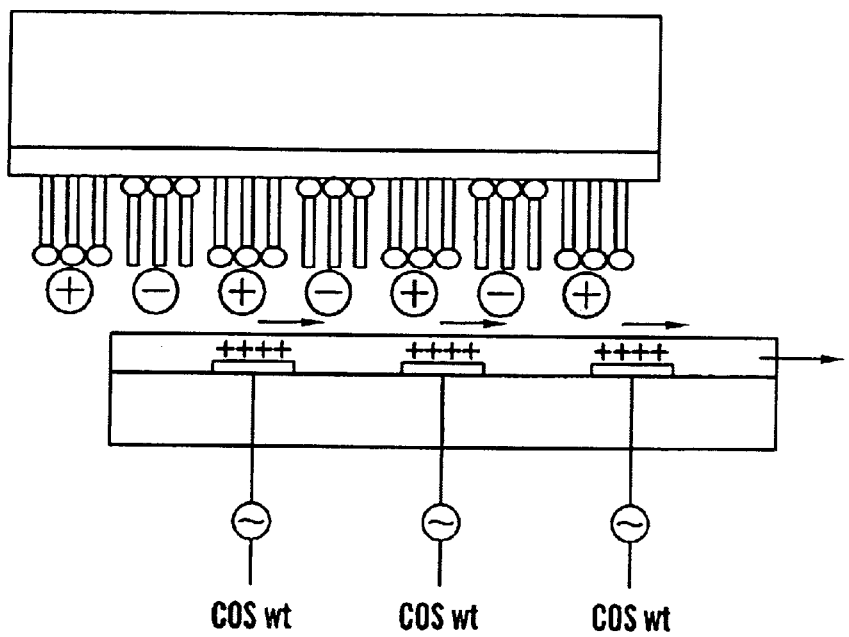

FIG. 2 is a sectional view showing the structure of slider and stator of an ultra small motor of the present invention. In the Figure, reference numeral 11 is a slider, 12 is a stator, 13 is a gap, 14 is an organic molecular layer formed on the slider surface, 15 is an organic molecular layer formed on the stator surface, and 16 is an electrode. In FIG. 2, alternatively, reference numeral 11 may be a stator and 12 may be a slider.

The organic molecular layer 14 is formed on the slider 11 and the organic molecular layer 15 on the stator 12. Between the surfaces of these organic molecular layers, there is a gap 13, of which distance is about 0.2 $\mu$m. The inside diameter of the stator 12 is about 2mm.

The slider 11 is ground and polished by alumina ceramics, and the processing precision is 10 nm or less. The electrode 16 is buried in the slider 11. The electrode 16 to be buried in the slider 11 is composed of, for example, an n-type silicone semiconductor on the surface of the slider, and, inside, a silicone semiconductor diffusing p-type differing in the conductive mechanism. When a positive voltage is applied to the inside p-type semiconductor, electrons may be concentrated at the pn junction, and a depletion layer spreads on the surface of the n-type silicone semiconductor, which appears to behave like an insulator, so that it may be used as an insulated electrode.

Figure 3C:
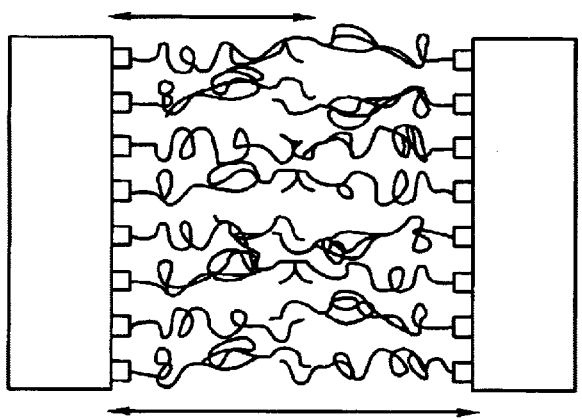
Figure 3B:
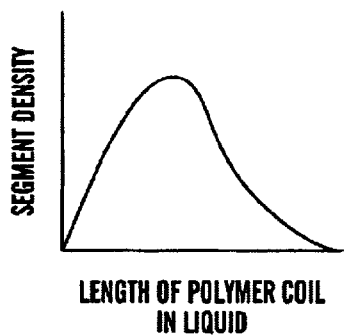
Figure 3D:
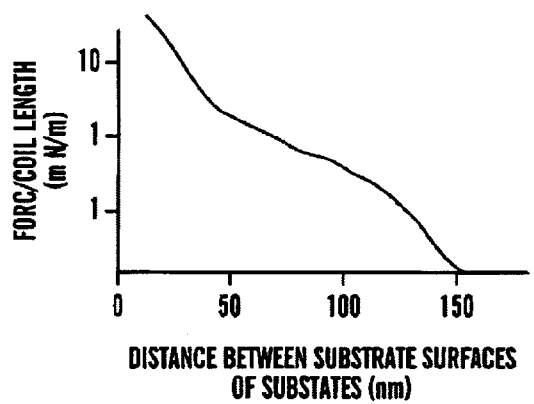

The organic molecular layer is, so to speak, a group of polymers covalently bound to the surface of the substrate, but when the polymer alone is bound to the substrate surface, as shown in FIG. 3a and FIG. 3b, the length of the polymer coil is about 50 nm, and the volume occupancy is about 1%, but when a great number of polymer molecules are densely bound covalently, they repulse each other by the intermolecular forces acting between molecules, and the organic molecular layer is extended, and the volume occupancy increases and the thickness of the organic molecular layer reaches about 70 nm. In the case of grafting polystyrene with molecular weight of 14000 on the mica substrate surface in toluene, and disposing grafted polymers face to face at a close distance of 150 nm or less, the steric repulsive force acting between the substrates is as shown in FIG. 3c (see J. N. Israelachivilli, "Intermolecular force and surface force" 2nd edition, translated by Kondo and Oshima p. 285). The steric repulsive force between grafted polymers begins to increase from around 150 nm or less when the polymers come close to each other, and increases sharply at less than 100 nm.

The potential W of the intermolecular steric repulsive force is calculated in the following equation.

$$W=BkTEXP(-p-D/L)$$

where B is constant, k is Boltzmann constant, T is temperature, D is distance between substrates, and L is thickness of organic molecular layer.

By the steric repulsive force, the slider and stator repulse each other, adhesion between the slider and stator is lost, and the rotation of the slider becomes smooth.

The repulsive force between the slider and stator is increased by the following structure and method. That is, on the surface of the stator 12 in FIG. 2, an organic molecular layer 15 with a functional group having an electric charge or capable of having an electric charge by dissociation, for example, carboxylic acid group, sulfonic acid group, amino group, or quaternary ammonium group introduced thereto, is formed. These functional groups have positive or negative charge in a proper solvent. The surface charge amount, sigma ($\sigma$) is measured to be 5 mC/m$^2$ per unit area, and the electric field strength E at this time is about $$E=\sigma/2\epsilon o \approx 2\times 10^8 \text{ (V/m)}$$

where $\epsilon$ o (permittivity in vacuum)=8.85×10$^{-12}$ (F/m).

The force (F) and pressure (P) which the area confronting the slider and stator receives are approximately as follows, supposing r=3 mm, l=10 m, hence S=prl:

$$F=qE\approx 100N,$$

$$P=F/S\approx 10^6 \text{ Pa}.$$

It is also possible to make use of the force by the electric field generated by the organic molecular layer 15 formed on the surface of the stator 12 in FIG. 2 and the electrode 16 buried in the slider 11. When a voltage of 10 V is applied to the internal electrode 16 of the slider 11 in the gap d of 0.1 μm, the electric field strength E is $$E=V/d=1\times 10^8 \text{ (V/m)}.$$

The surface charge amount a was measured to be 1 mC/m$^2$ per unit area. The force (F) and pressure (P) received on the area confronting the slider and stator are, supposing r=3 mm, l=10 mm, as follows:

$$q=5\times 10^7 C$$

$$F=qE=50N$$

$$P=F/S\approx 5\times 10^5 \text{ Pa}$$

Thus, the motor is presented, in which the gap is kept between the slider and stator by making use of the steric repulsive forces and electrostatic force generated between the slider and stator, the friction of the two is decreased, and the slider and stator do not contact with each other directly when stopped, or do not contact or slide when starting rotation or during rotation.

Figure 4B:
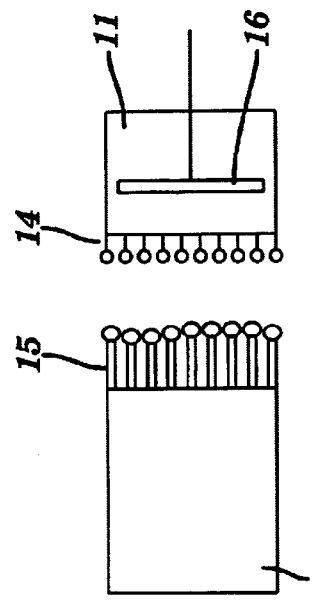
FIGS. 4A–4E are schematic sectional views of slider and stator with organic molecular layers formed on the surfaces thereof.

In FIG. 4B, the functions of the organic molecular layer 14 on the surface of the slider 11 and the organic molecular layer 15 on the surface of the stator 12 include (1) generation of strong pressure between the organic molecular layer 4 and organic molecular layer 5 when the slider surface and stator surface approach each other to a close distance, (2) generation of steric repulsive forces when the distance between the slider 11 and stator 12 is further smaller and the organic molecular layer 14 and organic molecular layer 15 are about to contact with each other, and generation of a large repulsive force between the slider and stator, and (3) prevention of wear of slider and stator due to wear of organic molecular layer 14 and organic molecular layer 15 when the distance between the two is much more closer and the slider and stator contact with each other.

That is, the organic molecular layer 14 and organic molecular layer 15 mutually generate repulsive forces, and when the both have a same electric charge, an electrostatic repulsive force is further generated, and they also function as wear-resistant layers when the slider 11 and stator 12 contact and slide.

Figure 4C:
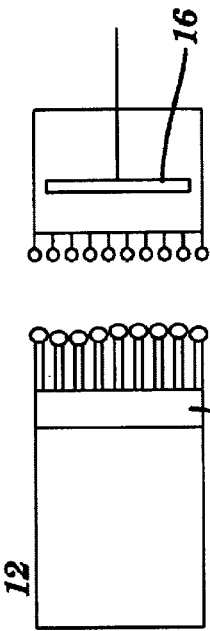

The surface of the stator 12 is composed of an organic molecular layer 15 and a dielectric layer 17 (FIG. 4C). In this case, the dielectric layer 17 complements the electric charge of the organic molecular layer 15, and acts to increase the repulsive forces between the organic molecular layer 14 and organic molecular layer 15. The dielectric layer is usually provided in the base layer of the organic molecular layer. As the dielectric material, barium titanate (BaTiO3) or barium strontium tantalate (BST) can be used.

Figure 4D:
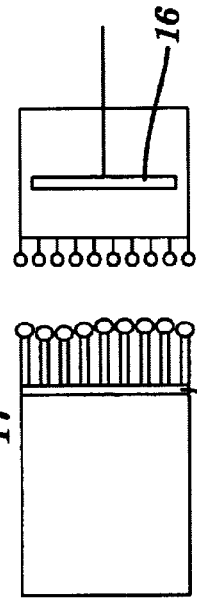
Figure 4E:
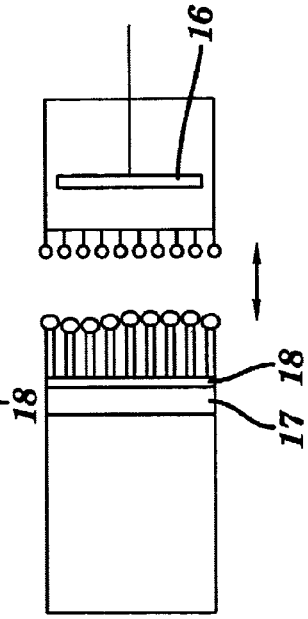
Figure 4A:
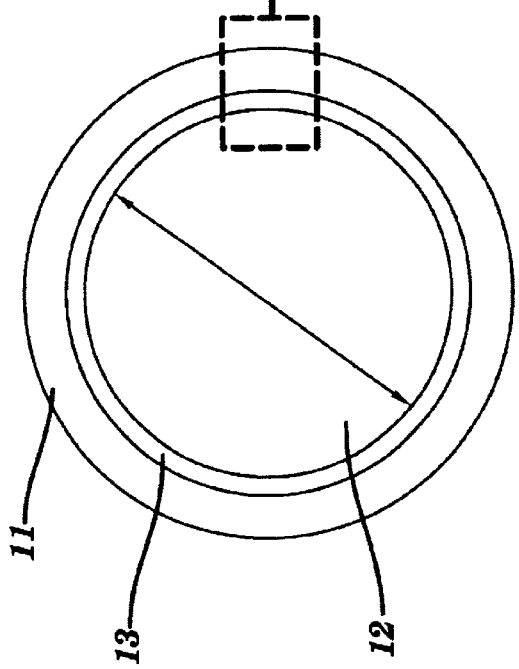

The surface of the stator 12 is also composed of an organic molecular layer 15 and a wear resisting layer 18 (FIG. 4D). In this case, the wear resistance is increased when the slider and stator contact and slide. The material for the wear-resistant layer includes, for example, diamond-like carbon film, ion implantation film or nitride film. Further, in the base layer of the organic molecular layer, the dielectric layer 17 and wear-resistant layer 18 is provided (FIG. 4E). In this case, when the slider and stator contact and slide, the repulsive force and wear resistance is enhanced.

Figure 5B:
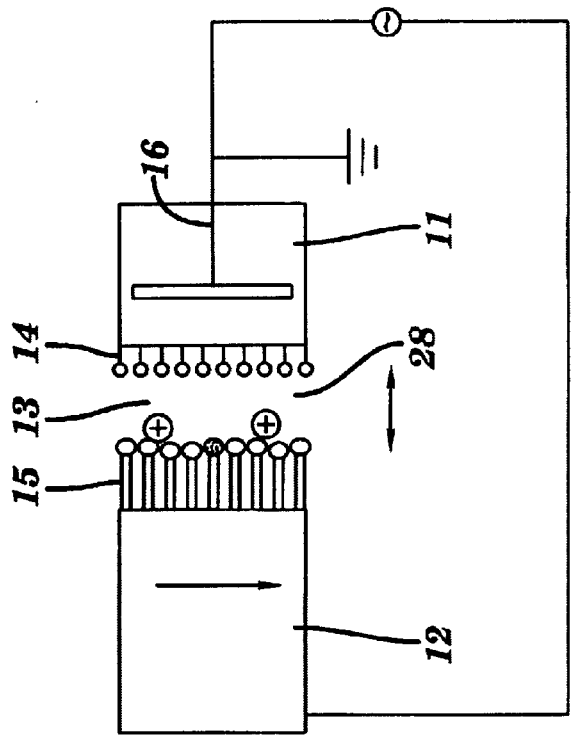
FIG. 5 is a sectional view of slider and stator when an AC voltage is applied on the stator.
Figure 5A:
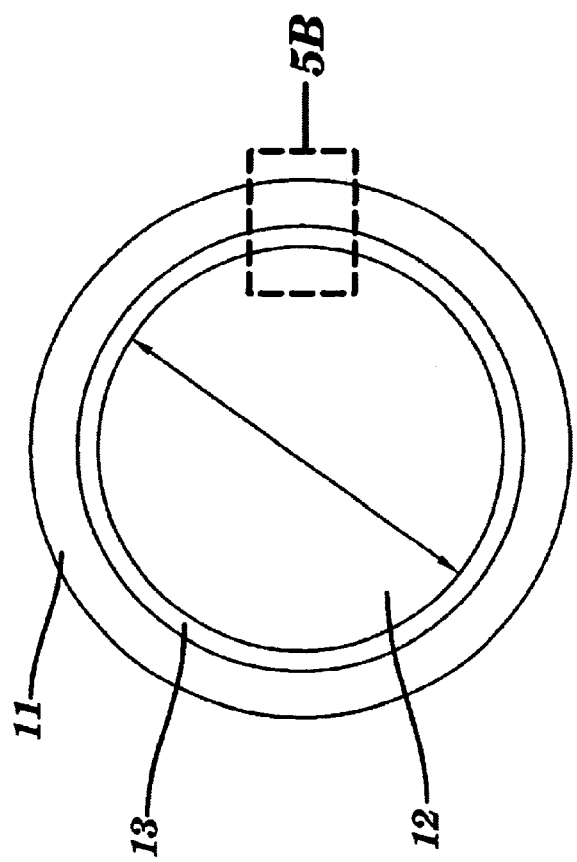
Figure 6:
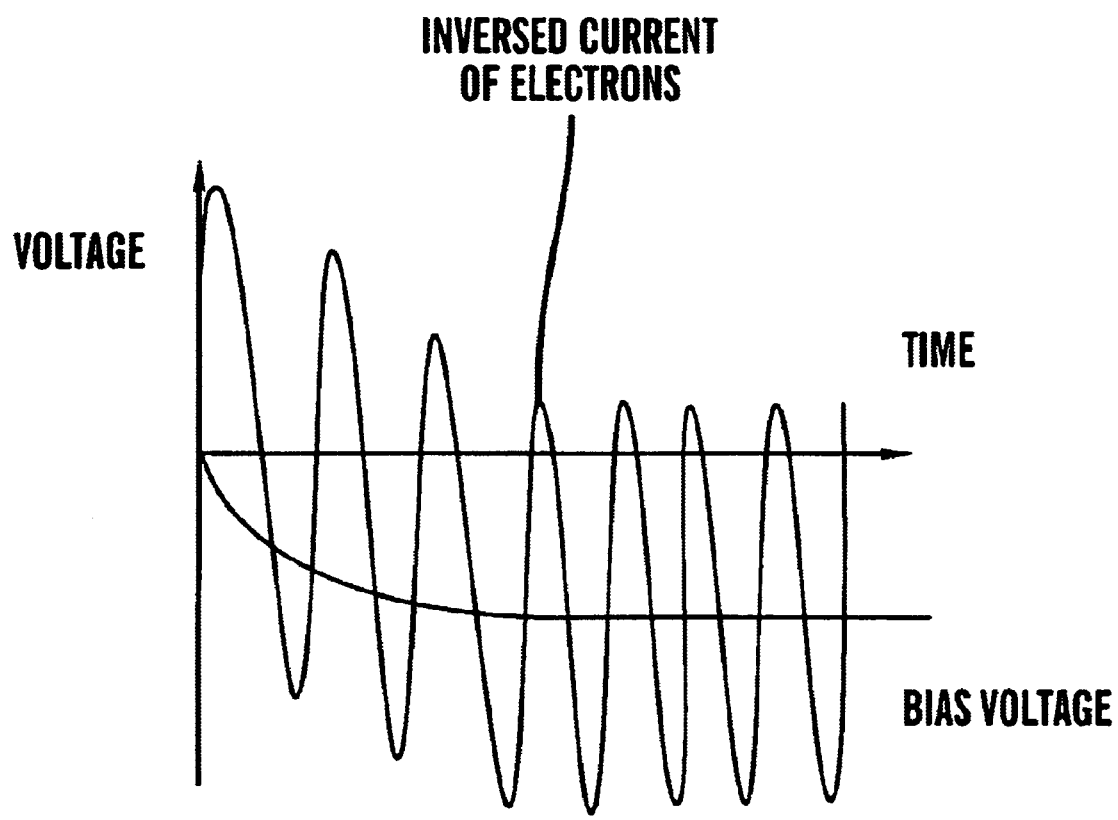
FIG. 6 is a diagram showing a time course of change of self-bias voltage generated on the surface of stator when an AC voltage is applied.

Moreover, as shown in FIG. 5, when an AC electric field is applied to the electrode 16 buried in slider 11 and he organic molecular layer 15, a voltage occurs between the insulating medium filling the gap between the slider and stator and the highly insulating organic molecular layer 15 When an alternating current is applied to an insulating material, the insulating material comes to have an electric charge, as shown in FIG. 6, due to difference in mobility between hole and electron. First, the AC voltage is applied evenly in both polarities, but as the time passes, the charge is accumulated in the negative polarity, and the voltage gradually changes to the negative direction, and a self-bias voltage excluding the reverse-current portion lessened by electrons is applied. From the electrode, an electric field in the positive direction is applied on the negatively charged slider, and a repulsive force is generated between the electric field and the electric charge of the organic molecular layer tightly adhered to the stator surface.

When the medium is a conductive substance, an insulating film can be formed on the surfaces of the organic molecular layer 14 and organic molecular layer 15, and the entire medium appears to behave like an insulator, and the electric field can be applied.

In this way, the structure further adding the electrostatic repulsive force to the structure of the present invention is also included in the structure of the present invention.

As a means for driving the motor of the present invention, the driving means of the coil coupled to the drive shaft used in an ordinary DC motor, induction motor, synchronous motor, or AC commutator motor can be used.

When the motor diameter becomes much smaller, the torque of the driving device using an ordinary coil becomes smaller, and it is hardly practicable. In the case of such micro-motor, a powerful torque can be generated by making use of an electrostatic interaction.

Example 3

Electrostatic Drive Motor Comprising the Structure of the Invention

Figure 7:
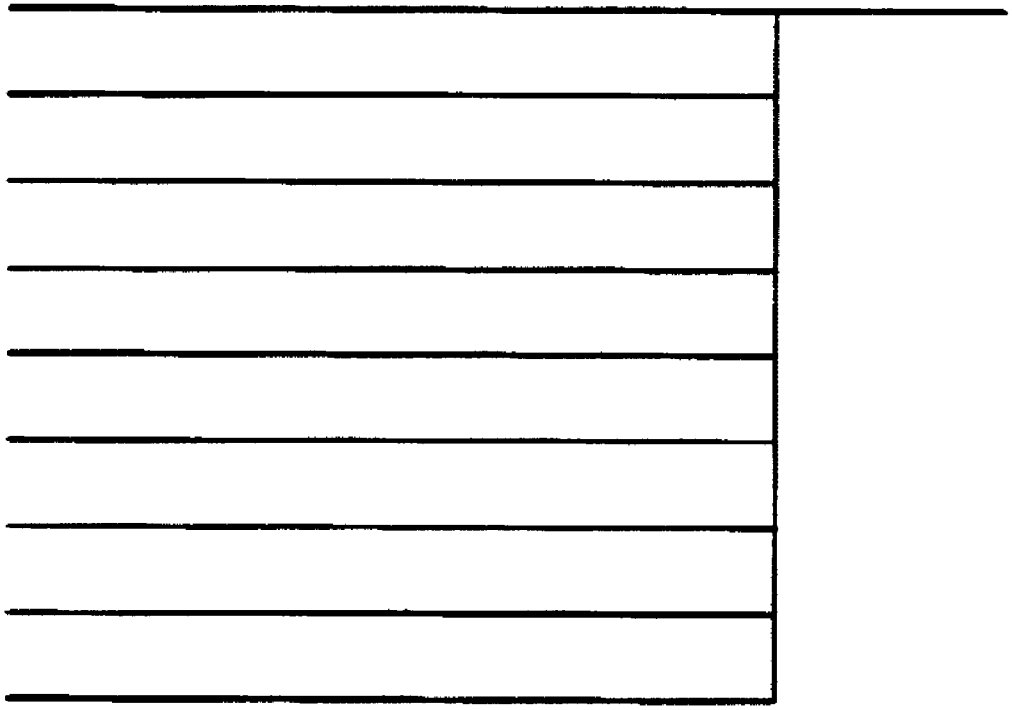
FIG. 7 is a diagram showing a configuration of electrode of an electrostatic drive motor.

FIG. 7 is a plan view of an example of an electrode of a motor comprising the structure of the present invention. The electrode shown herein is shaped like a comb, and a pattern is formed along a cylindrical slider. An alternating-current power source (COSwt) is applied to the electrode 1.

Figure 8:
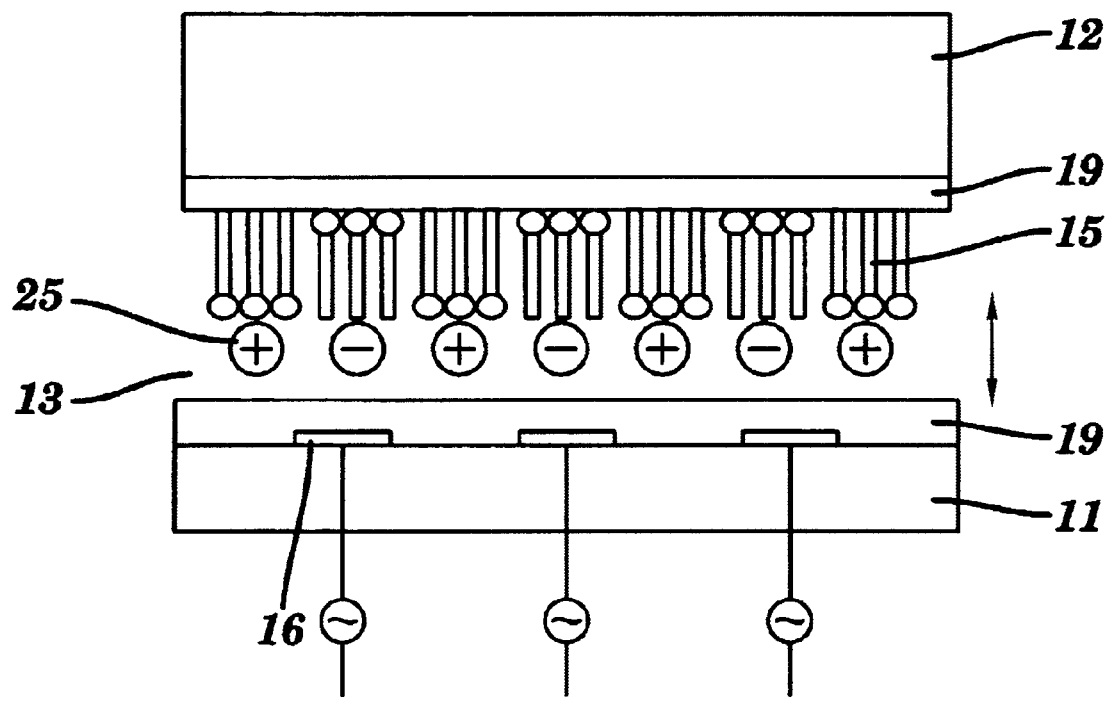
FIG. 8 is a sectional view of a gap containing the electrodes of an electrostatic drive motor .

FIG. 8 is a sectional view of a cap containing the electrode structure. The gap 13 is filled with a conductive medium. The medium may not be always required. An insulating layer 19 of about 10 nm in thickness is formed on the surface of a stator 12, and an organic molecular layer 15 of about 100 nm in thickness is formed thereon. The pattern of charge distribution 25 of the organic molecular layer 15 is formed so that the polarity is inverted in every about 1 μm. A DC bias voltage is applied between the slider 11 and stator 12, and a rebound-force acts between the slider and stator.

On the surface of the slider 11, an electrode 16 is formed in a thickness of about 25 nm by using ITO or similar material. An insulating layer 19 of about 50 nm in thickness is formed on the electrode, and the surface is polished, and the surface smoothness is finished to about 10 nm. The electrode 16 is formed at an interval (about 2 μm) of one pitch portion of polarity pattern of the organic molecular layer 15 in a line width of about 1 μm. When the phase of the voltage applied to the electrode 16 is changed, the attractive force or repulsive force between it and the organic molecular layer 15 varies depending on the change, and a rotating force in the tangential direction is applied to the slider 11.

The operation of the electrostatic motor in FIG. 8 is shown in FIG. 9. At a certain moment shown in FIG. 9-1, suppose that the charge in the region of the organic molecular layer 15 at the stator side confronting the electrode 16 installed in the slider 11 is negative, and that the voltage applied to the electrode 16 is negative. At this time, a repulsive force is generated between the organic molecular layer region of negative charge and the electrode 16, and the slider moves in the direction of arrow, and next moment, the electrode 16 confronts the positive charge region of the organic molecular layer at the stator side. At this time, as shown in FIG. 9-2, when a positive voltage is applied to the electrode 16, again, a repulsive force is generated as driving force between the organic molecular layer of positive charge and the electrode 16, and the slider moves in the direction of arrow. In this way, a driving force in a same direction is continuously generated between the slider and the stator, and the slider rotates.

Figure 10:
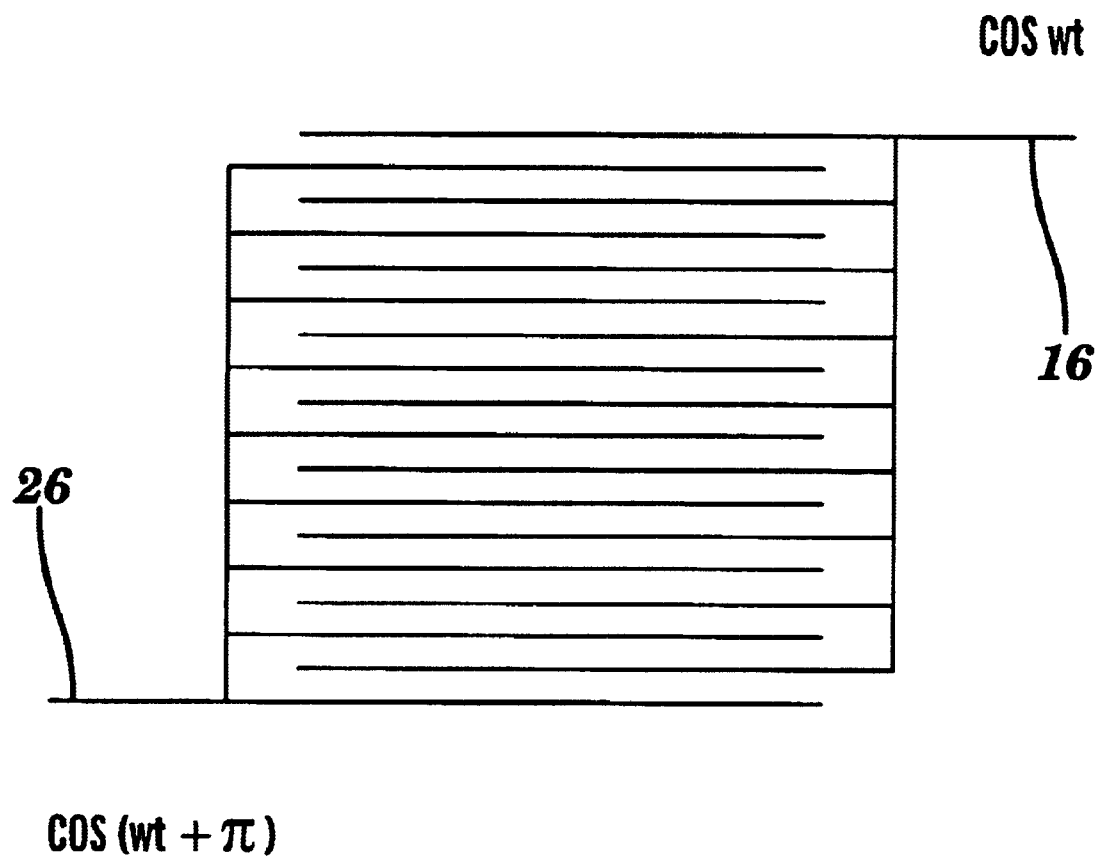
FIG. 10 is a diagram showing the two-electrode configuration with AC voltages applied thereto in different phase by 180°.

FIG. 10 is a plan view of a second electrode structure. As shown in FIG. 10, an alternating-current power source (COSwt) is connected to one electrode 16, and an alternating-current power source delayed in phase by 180° (COS(wt+p)) is connected to other electrode 26. The electrode 16 and electrode 26 are formed in and out alternately like a comb.

Figure 11:
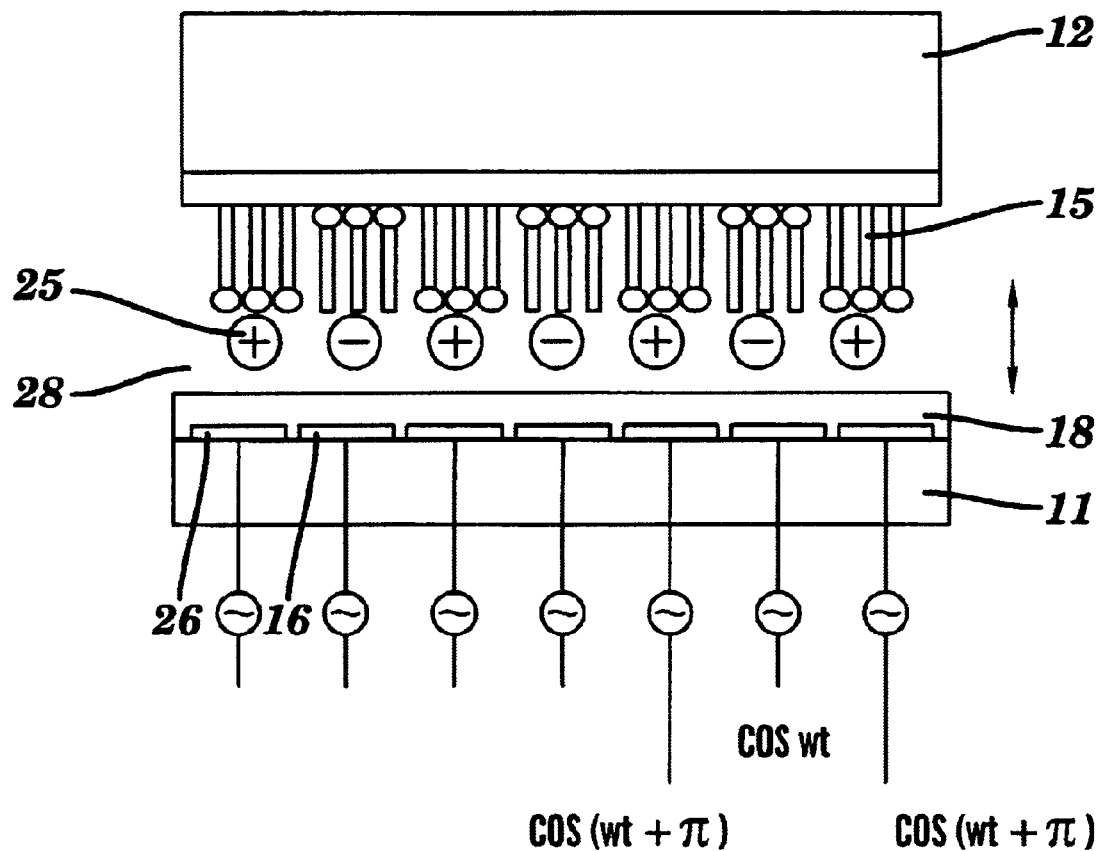
FIG. 11 is a diagram showing a sectional view of a gap containing the electrode configuration having two electrodes.

FIG. 11 is a sectional view of a gap containing the second electrode structure. The gap is filled with an insulating medium 28. An organic molecular layer 15 of about 100 nm in thickness is covalently bound directly to the stator. The pattern of the organic molecular layer 15 is formed so that the polarity may be inverted at every about 1 μm in the rotating direction of the slider. Between the slider and stator, an AC bias voltage is applied, and a repulsive force is generated between the slider and stator. The AC bias is a sufficiently high frequency more than 5 times of the frequency of the driving voltage, so as to have no effect on driving.

On the surface of the slider, the electrode 1 is formed in a thickness of about 25 nm by using ITO or other material. A wear-resistant layer 18 is formed on the electrode in a thickness of about 50 nm. The surface is polished, and the surface smoothness is finished to about 10 nm. The electrode 16 is formed at an interval (about 2 μm) of one pitch portion of polarity pattern of the organic molecular layer 15, in a line width of about 0.7 μm, and is connected to the power source having a phase of COSwt. The electrode 26 is also formed at an interval (about 2 μm ) of one pitch portion of polarity pattern of the organic molecular layer 15, in a line width of about 0.7 μm, and is connected to the power source having a phase of COS(wt+p).

When the phase of the voltage applied to the electrode is changed, the attractive force or repulsive force applied to the organic molecular layer 15 varies depending on the change, and a rotating force in the tangential direction is applied to the organic molecular layer 15, and the slider rotates about the stator.

Figures 1, 12:
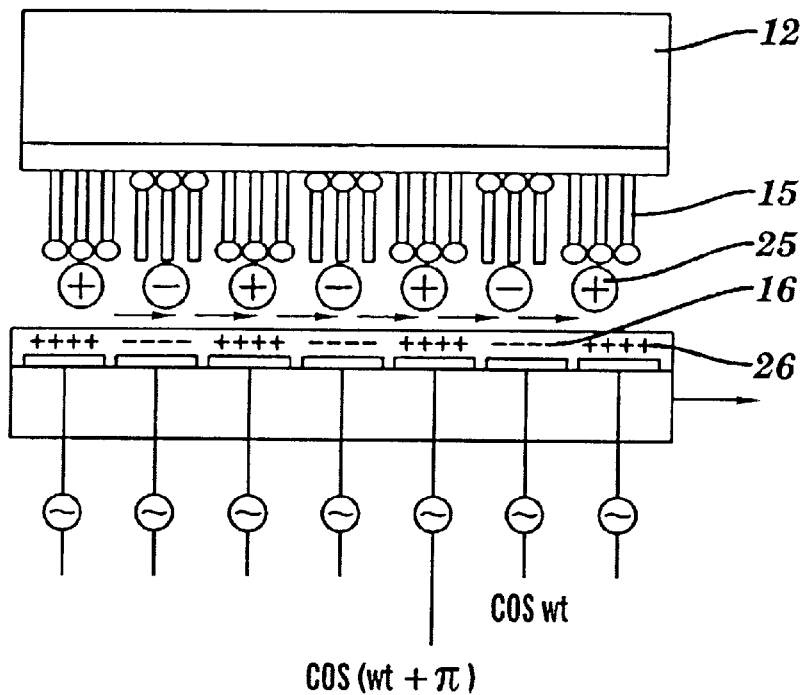
Figures 2, 12:
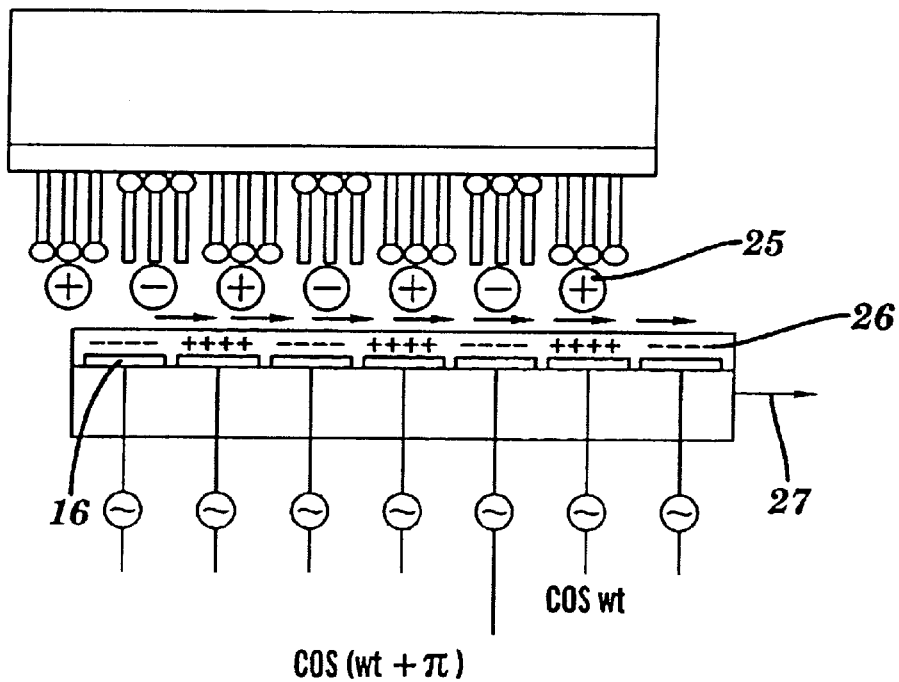

The operation of the electrostatic motor in FIG. 11 is shown in FIG. 12. At a certain moment shown in FIG. 12-1, suppose that the charge in the portion confronting the electrode 16, of the organic molecular layer 15 of the stator 12 is negative, that the charge in the portion confronting the electrode 26 is positive, and that the voltage applied to the electrode 16 is negative. At this time, a repulsive force is generated between the organic molecular layer 15 and the electrodes 16 and 26, and the slider moves in the direction of arrow. At a next moment, as shown in FIG. 12-2, a positive voltage is applied to the electrode 16, and a negative voltage to the electrode 26. The slider rotates, and when the electric charge of the organic molecular layer 15 at the stator side confronting the electrode 16 of the slider is positive, and the charge of the organic molecular layer 15 at the stator side confronting the electrode 26 is negative, a repulsive force is generated again between the organic molecular layer 15 and both electrodes, and the slider moves in the direction of arrow. In this way, a driving force in a same direction is continuously generated between the slider and the stator, and the slider rotates. As compared with the case in FIG. 9, a double driving force can be obtained.

Example 4
Discoidal Electrostatic Motor Comprising the Structure of the Present Invention FIG. 13 shows a sectional view of a hard disk comprising the structure of the present invention, a sectional view along the circumference of the disk, a plan view of the disk, and a plan view of motor and stator. One of the two substrates disposed closely to each other is a disk, which is the slider of the motor and is also a base plate of media. The substrate material is, for example, a glass material, and the surface of the disk is polished to a flatness of 10 nm. In a sectional view along the circumference of the disk, a magnetic medium is formed on at least one surface of the media. A magnetic head is disposed near the surface of the magnetic medium through a gap. Recording and reproducing can be executed between the recording medium and the magnetic head. Organic molecular layers having an electric charge are formed repeatedly in a radial pattern on the surface of this disk in a specified line width.

Figure 14:
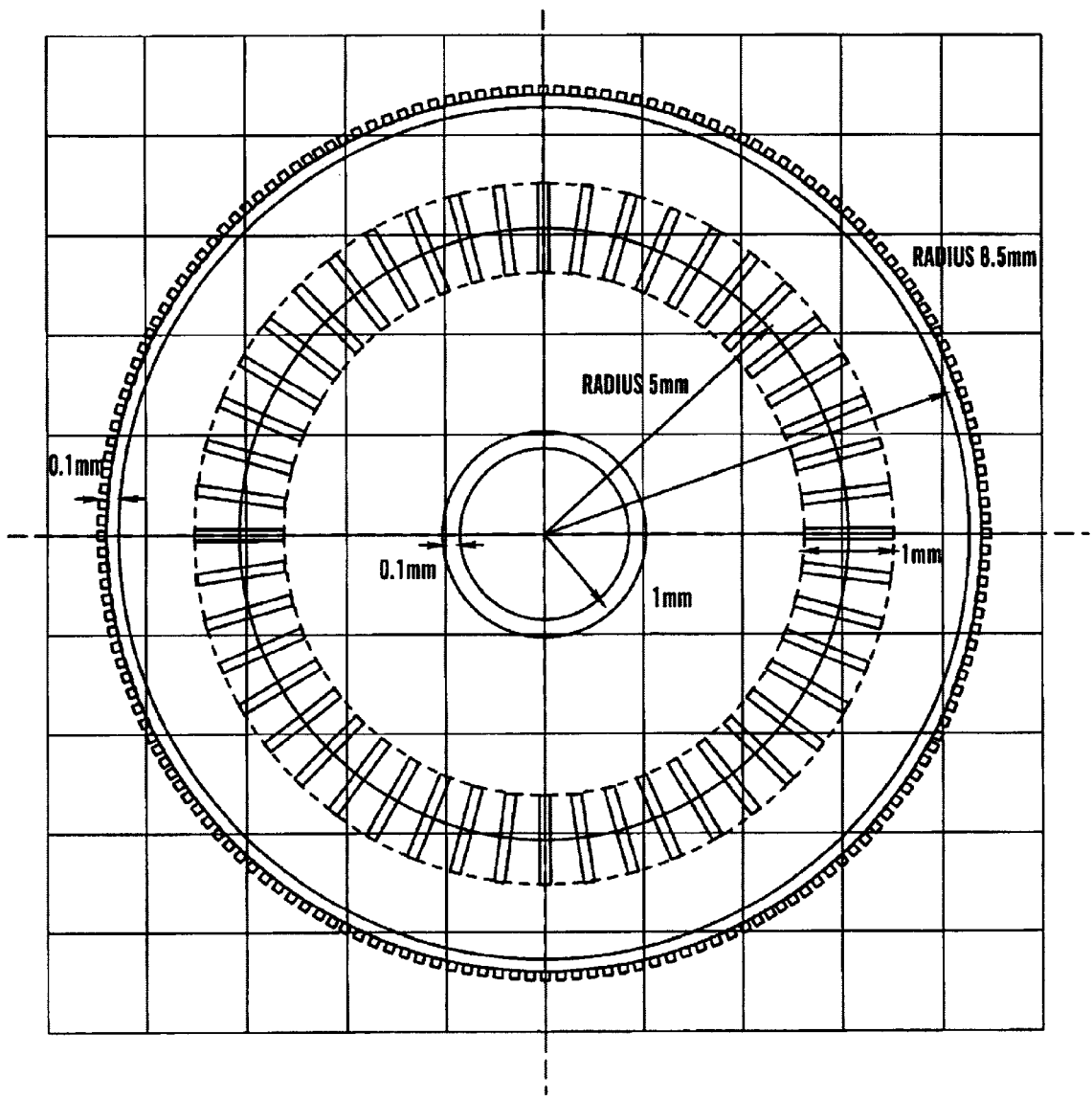
FIG. 14 shows a mask pattern, which is used to transcribe an electric charge pattern of a discoidal electrostatic motor of the present invention onto a glass substrate.

FIG. 14 shows a mask pattern for transferring the charge pattern onto a glass substrate. The charge pattern is formed by transcription of the mask pattern by photolithography. The Figure shows an example, in which the diameter of the substrate for forming the media is 17 mm, the charge center radius is 5 mm, the charge length is 1 mm, the charge width is 20 $\mu$m, the charge interval is 20 $\mu$m, and such pattern is formed on the resist as inversion pattern. The colorless portion is the exposure area, and the resist applied on the substrate is developed, and the substrate surface is exposed. When an organic molecular layer having an electric charge is formed on the surface of the substrate having such pattern formed thereon, the organic molecular layer having an electric charge is formed only on the exposed area of the substrate surface. Since organic solvent can remove the resist, a radial pattern of organic molecular layer having an electric charge is formed.

For example, when the media diameter is 17 mm, the charge center radius is 5 mm, the charge length is 1 mm, the charge width is 20 $\mu$m, and the charge interval is 20 $\mu$m, an organic molecular layer having a surface charge density of $\sigma$=40 mC/m$^2$ was formed.

Figure 15A:
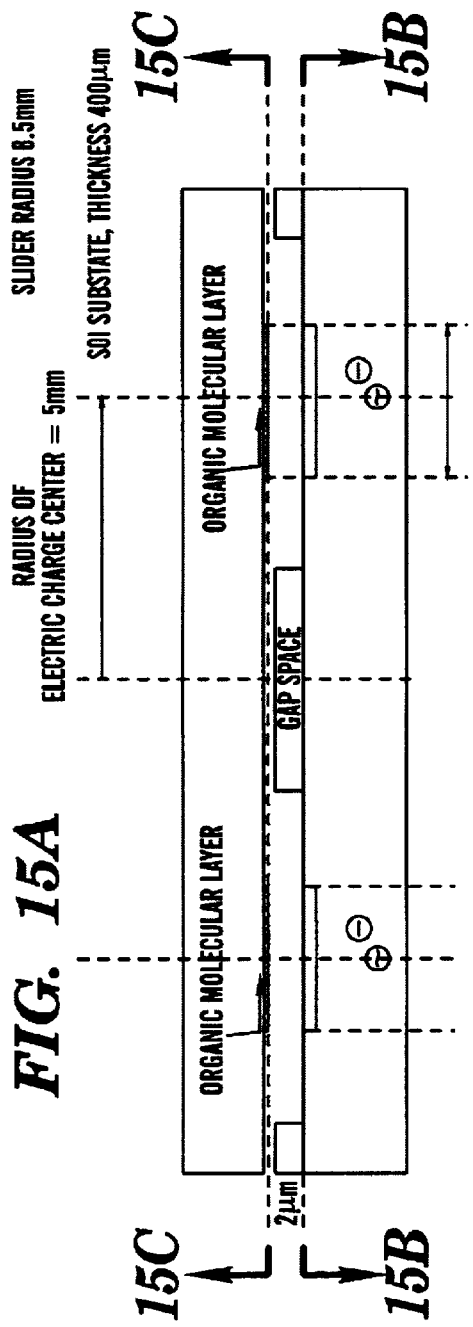
FIG. 15 shows a plan view and a sectional view of an electrode of the discoidal electrostatic motor of the present invention.
Figure 15B:
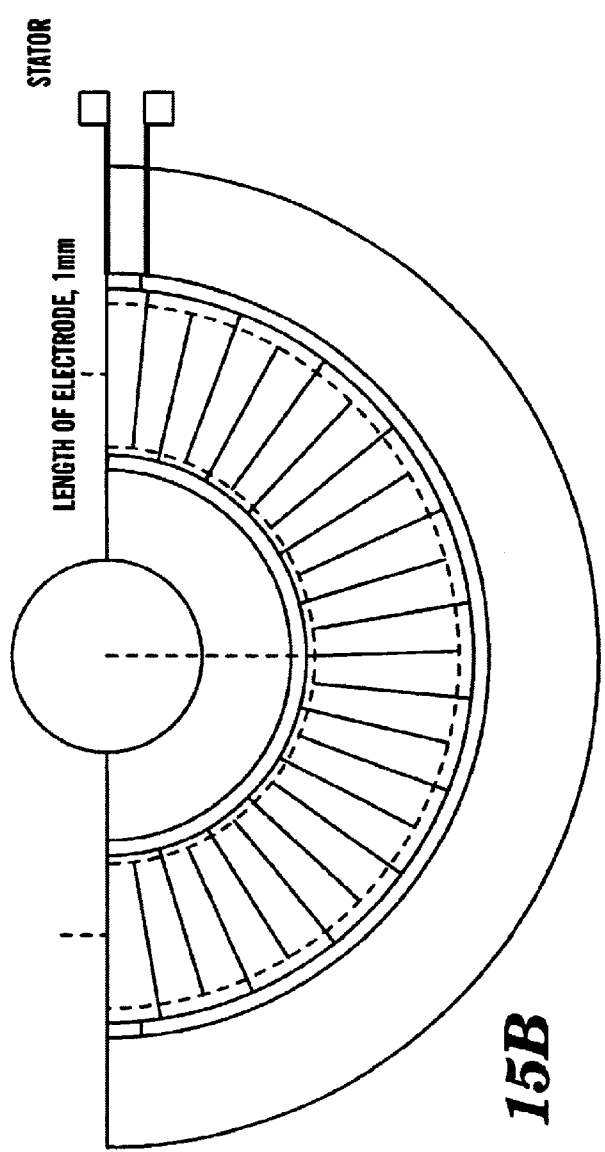
Figure 15C:
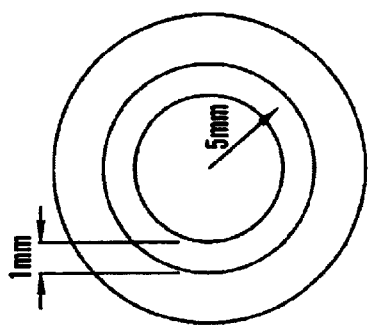

FIG. 15 shows a plan view and a sectional view of the electrode. An electrode is formed on the surface of stator repeatedly in a radial pattern in a specified line width. As shown in the sectional view, at a position corresponding to the organic molecular layer, an electrode is formed with electrode center radius of 5 mm, electrode length of 1 mm, electrode with of 5 $\mu$m, and electrode interval of 35 $\mu$m.

FIG. 16 shows an electrode forming process. On the surface of the substrate, a thin metal film is formed in a thickness of 0.2 $\mu$m, an electrode pattern is transcribed to the resist pattern by using photo mask, and the pattern is transcribed to the metal film on the substrate surface. An insulating film is formed in a thickness of 0.2 $\mu$m on the surface of metal film. The spacing between the stator and media is filled with electrolyte, and electric insulation is achieved so as to apply voltage between electrodes formed on the stator surface. As required, moreover, a gap spacer is formed between the stator and media, so that the electrode on the stator surface and the charge pattern on the media surface may not directly contact with each other. The thickness of the gap spacer was 0.5 $\mu$m.

A voltage is applied between electrode A and electrode B of the repeated pattern. When a voltage of ±10 V was applied between the electrodes, an electric field of E=0.5 MV/m was generated, and propulsive force of F=qE=3 N and torque of T=rF=15 mNm were obtained.

Example 5
Electrostatic Motor Having Centripetal Force to the Disk Center

The discoidal electrostatic motor having the structure of the present invention includes one having a centripetal force to the disk center. As shown in FIG. 13, at a position of radius 1 mm, an organic molecular layer having a circular charge pattern was formed in a line width of 0.1 mm. On the stator, positive and negative charge patterns were formed so as to sandwich the charge pattern. A DC voltage of 10 V was applied between the electrodes. The charge pattern of the media generates a centripetal force to the center:of the disk, which is the media, by the effect of the DC electric field.

Example 6
Spherical Electrostatic Motor Comprising the Structure of the Present Invention A different embodiment of the present invention is a electrostatic motor comprising the structure of the present invention wherein two substrates having spherical surfaces are disposed closely to each other with a gap of less than 1 $\mu$m wherein an organic molecular layer having an electric charge is formed along the spherical surface repeatedly in a specified line width on the inside spherical surface wherein an electrode is formed repeatedly in the specified line width on the outside spherical surface wherein an AC voltage is applied to the electrode of the repeated pattern, thereby a propulsive force is generated in the inner sphere.

In the invention mentioned above, the electrode formed on the other spherical surface is preferably formed repeatedly in the latitudinal direction.

Specifically, FIG. 17 shows a sectional view of the electrostatic motor comprising a charge pattern on the spherical surface, a sectional view showing relative configuration of the charge pattern and electrode pattern, and a perspective view of the electrode pattern. Two substrates disposed closely with their gap of less than 1 $\mu$m are spheres, and the motor slider is an inner spherical substrate. The substrate material is, for example, a glass material, and is ground in a spherical form. On the spherical surface, an organic molecular layer having an electric charge along the equator is formed repeatedly in a specified line width. The charge pattern is provided for rotating the motor along the equator. On the spherical surface, alternatively, an organic molecular layer having an electric charge in a charge pattern long the latitude is formed repeatedly in a specified line width.

The charge pattern was formed by transcription of the mask pattern by photolithography. At the spherical substrate diameter of 2 mm, charge length of 0.2 mm, charge width of 20 m, and charge interval of 20 $\mu$m, a pattern was formed on the resist as inverting pattern. The resist applied on the substrate was exposed and developed, and a charge pattern was formed on the exposed substrate surface. When an organic molecular layer having an electric charge was formed on the surface of the substrate having the pattern formed thereon, an organic molecular layer having an electric charge only in the exposed portion of the surface of the substrate was formed. After organic solvent removed the resist, a spherical pattern of the organic molecular layer having an electric charge was formed. When the diameter of the sphere was 2 mm, the charge length was 0.2 mm, the charge width was 20 $\mu$m, and the charge interval was 20 $\mu$m, the surface charge density $\sigma$ of the organic molecular layer was 40 mC/m$^2$.

An electrode pattern was formed on the stator surface. The electrode pattern was formed alternately as positive and negative electrodes on the equator, corresponding to the charge pattern. At a position corresponding to the organic molecular layer, an electrode was formed at the electrode diameter of 2 mm, electrode length of 0.2 mm, electrode with of 5 µm, and electrode interval of 35 µm. In the electrode forming process, same as in the disk, a metal thin film was formed on the substrate surface in a thickness of 0.2 µm, and the electrode pattern was transcribed to the resist pattern by using a photo mask, then the pattern was transcribed to the metal film. An insulating film was formed on the surface of the metal film in a thickness of 0.2 µm. Since the space between the stator and slider was filled with an electrolyte, electric insulation was assured so as to apply a voltage between electrodes formed on the stator surface. A gap spacer was formed between the stator and slider, thereby avoid direct contact between the electrode of the stator surface and the charge pattern of the slider surface. The thickness of the gap spacer was 0.5 µm. When a voltage was applied between the electrodes of the repeated pattern, in the case of the voltage between the electrodes of ±10 V, an electric field of $E=0.5$ MV/m was generated, and the propulsive force of $F=qE=3N$ and torque of $rF=15$ mNm were obtained.

The spherical electrostatic motor of the present invention also includes an electrostatic motor in which organic molecular layers having an electric charge in the latitudinal direction in a specified line width are formed repeatedly on the inside spherical surface of the structure of the invention consisting of two substrates having a spherical surface with a gap of less than 1 µm wherein electrodes are also formed repeatedly on the other spherical surface in the latitudinal direction in a specified line width, which are further divided in the longitudinal direction.

In the case of this motor, the organic molecular layers having an electric charge are formed repeatedly on one spherical surface in the latitudinal direction, and the electrodes are formed repeatedly on the other spherical surface in the latitudinal direction in a specified line width, and the electrodes are further divided in the longitudinal direction at every 90 degrees, and therefore when the polarity of the electric field is inverted depending on the divided latitudinal charge pattern, it can be rotated in the latitudinal direction by the electrode pattern in the latitudinal direction at the same time.

The spherical electrostatic motor of the present invention also includes an electrostatic motor comprising organic molecular layers having an electric charge formed repeatedly on the inside spherical surface in the longitudinal direction in a specified width and electrodes formed repeatedly on the other spherical surface in the longitudinal direction in a specified line width.

When the pattern rotating in the equatorial direction is formed only on the equator, the rotating force in the equatorial direction becomes weak when rotating force in the latitudinal direction is added, and therefore, in this motor, the organic molecular layers having an electric charge are auxiliary formed repeatedly in the longitudinal direction, and the electrodes are formed repeatedly in the longitude direction in a specified line width on the other spherical surface, thereby enabling to rotate by inclining in the latitude direction without damping the rotating force in the equatorial direction.

The spherical electrostatic motor of the present invention also includes an electrostatic motor comprising organic molecular layers having an electric charge formed repeatedly in the longitudinal direction on the equator of the inside spherical surface in a specified line width, electrodes formed repeatedly on the equator of the other spherical surface in the longitudinal direction in a specified line width, organic molecular layers having an electric charge formed repeatedly on the inside spherical surface in the latitudinal direction, and electrodes formed repeatedly on the other spherical surface in the latitudinal direction in a specified line width, which are divided in the longitudinal direction. In the case of this motor, by applying an AC voltage to the electrodes of repeated pattern, a propulsive force in the triaxial direction may be generated on the spherical surface.

Example 7

Bearing Without Axis Comprising the Structure of the Present Invention

As an embodiment of the invention, a bearing without mechanical axis is presented. The bearing without mechanical axis comprises a rotatable discoidal substrate (the first substrata) and a fixed substrate (the second substrate) which are disposed closely each other wherein a circular convex supporter having a specified radius in a specified line width is formed on the closely facing surface of the first substrate wherein an organic molecular layer having an electric charge is formed on the supporter surface wherein a convex supporter is formed at a specified radius position in a specified line width on the facing surface of the second substrate, wherein an organic molecular layer having the same charge as the electric charge of the organic molecular layer on the first substrate is formed on the supporter surface on the second substrate wherein a liquid electrolyte is applied on the surface of the first substrate wherein the convex supporter on the second substrate is immersed in this liquid electrolyte, thereby maintaining a tiny gap of less than 1 µm between the two surfaces by the electric double layer repulsive force acting between the organic molecular layer surfaces and the meniscus force on the liquid surface formed between the two surfaces wherein an organic molecular layer having a circular charge pattern is further formed on the surface of the first substrate in a line width of 0.1 mm at a position of radius of 1 mm wherein an electrode sandwiching the charge pattern on the first substrate is formed on the surface of the second substrate so as to apply a same charge at the outside and a different charge at the inside wherein a DC voltage is applied between the two electrodes so as to generate a centripetal force to the center of the disk.

This bearing was composed as follows. First, on the surface of the rotatable discoidal substrate (the first substrate), a circular convex supporter having a specified radius in a specified line width was disposed, and an organic molecular layer having an electric charge was formed on the supporter surface.

On the fixed substrate (the second substrate), a convex supporter was disposed at a specified radius position in a specified line width, and an organic molecular layer having the same charge was formed on the supporter surface. The two substrates were disposed closely to each other. A liquid electrolyte was applied on the surface of the discoidal substrate (the first substrate), the convex supporter of the fixed substrate (the second substrate) was immersed in the liquid electrolyte, thereby maintaining a tiny gap of less than 1 µm between the two surfaces by the electric double layer repulsive force acting between the organic molecular layer surfaces and the meniscus force formed by the liquid electrolyte.

Figure 18A:
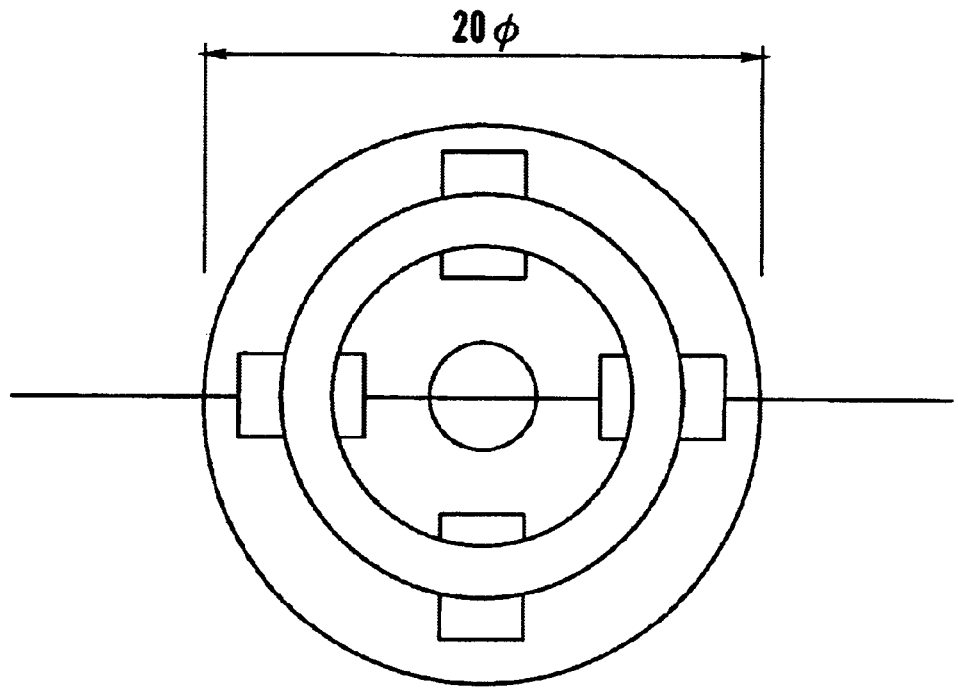
FIG. 18 is a diagram showing a plan view and a sectional view of a bearing without mechanical axis of the present invention.
Figure 18B:
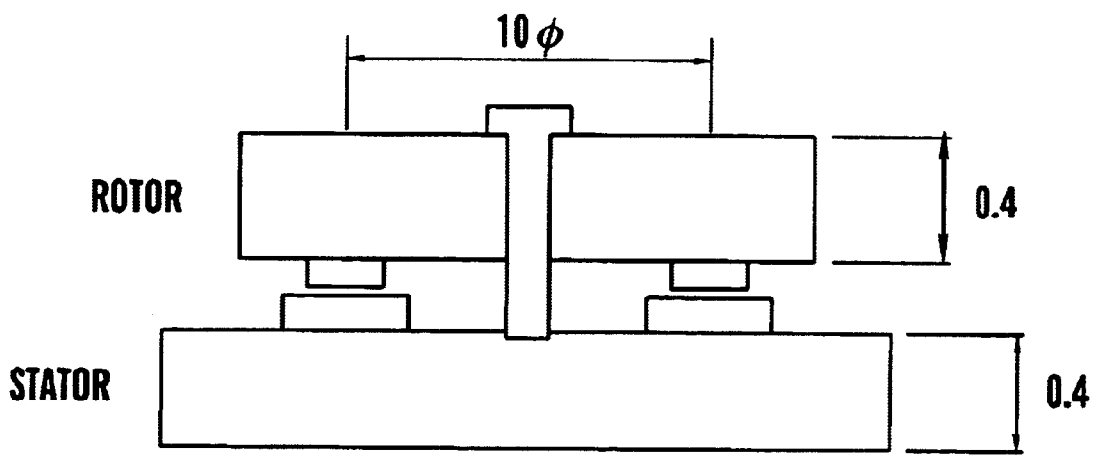

As shown in FIG. 18, an organic molecular layer having a circular charge pattern was formed at a position of radius of 1 mm in a line width of 0.1 mm. To sandwich the charge pattern, on the second substrate, a positive and negative electrode pattern was formed. A DC voltage of 10 V was applied between the electrodes. The charge pattern on the first substrate generates a centripetal force to the center of the disk due to the effect of DC electric field, and the shaft rotates at high precision. Thus, it can be used as the bearing without mechanical axis.

The bearing of the present invention also includes a bearing, in which a magnetic recording medium is formed on the surface of the first substrate, that is, a rotating discoidal substrate wherein an organic molecular layer is formed on its surface wherein a recording and reproducing element is provided on the surface of the second substrate, that is, a fixed substrate wherein a convex supporter of nearly same height as the element surface is provided wherein an organic molecular layer is formed on the supporter surface.

The bearing of the present invention further includes a bearing, in which a magnetic recording medium is formed on the surface of the first substrate, that is, a rotating discoidal substrate wherein an organic molecular layer is formed on the surface of the first substrate wherein a magnetic recording and reproducing element is provided on the surface of the second substrate, that is, a fixed substrate wherein a convex supporter of nearly same height as the element surface is provided wherein an organic molecular layer is formed on the supporter surface wherein a liquid electrolyte is applied on the surface of the first substrate wherein the convex supporter of the second substrate is immersed in the liquid electrolyte.

Example 8
Guide Comprising the Structure of the Present Invention

A guide is presented as other embodiment comprising the structure of the present invention. The guide comprises two substrates (first substrate and second substrate) which are disposed at a closes gap of less than 1 $\mu$m wherein a linear convex supporter having a specified line width is formed on the surface of the first substrate wherein an organic molecular layer having an electric charge is formed on the surface of the supporter, wherein electrodes having a specified line width and interval are formed linearly on the surface of the second substrate wherein a liquid electrolyte was applied on the surface of the first substrate. In this structure, the tiny gap between the two surfaces is maintained by the electric double layer repulsive force acting between the organic molecular layer surface and the electrodes by applying an AC voltage and the first substrate can move along the line by external forces.

Another embodiment of a guide of the present invention is a guide comprises two substrates (the first substrate and the second substrate) which are disposed closely each other to give a tiny gap wherein two linear convex supporters (the first and the second supporters) having a specified line width are provided on the surface of the first substrate wherein organic molecular layers having an electric charge are formed on the surfaces of the first and the second supporters wherein two linear convex supporters (the third and the fourth supporters) having a specified line width are provided on the surface of the second substrate wherein an organic molecular layer having an electric charge is formed on the surface of the third supporter wherein a liquid electrolyte is applied on the surface of the first substrate wherein the tiny gap between the surfaces of the organic molecular layers is maintained by the electric double layer repulsive force acting between the two surfaces wherein a linear electrode having a specified line width and interval is formed on the fourth convex supporter wherein an DC voltage is applied to the electrodes so as to make it movable along said line by external forces.

Example 9
Cylindrical Actuator Comprising the Structure of the Present Invention A circular column of 10 mm in diameter and 60 mm in length was formed by using polyethylene terephthalate resin. On this circular column, an aluminum electrode of 10 mm in diameter and 0.2 mm in thickness was disposed parallel to the bottom of the column at an interval of 5 mm. A penetration hole of 2 mm in diameter is opened in the column, and a glass narrow tube having a such diameter as to form a gap of less than 1 $\mu$m is placed therein. Purified water with resistivity of 16 M $\Omega$ is charged between the fine pores and the narrow tube. One side of the column is in contact with the purified water, and if the narrow tube extends and projects from the column, the water gets into the fine pores by surface tension from the column contacting side, so that the liquid in the fine pores is not lost. In the narrow tube, organic molecular layers m a d e of COOH $(CH_2)_8Si$—O— and $NH_2(CH_2)_8Si$—O— are sequentially formed in a band of 5 mm in width by photolithography.

Example 10
Flat Actuator Comprising the Structure of the Present Invention

After one side of polyimide film of 0.5 mm in thickness and 100 mm×30 mm in size was treated either by UV irradiation, or treated hydrophilically by RF plasma in oxygen partial pressure of 0.1 Torr, organic molecular layers of $COOH(CH_2)_8Si$—O— having negative charge and $NH_2(CH_2)_8Si$—O— having positive charge in liquid were sequentially formed by photolithography on each 5 mm×25 mm regions of the film, longitudinal direction of which was parallel to the 30 mm side of the film.

The width of these adjacent regions was 1 mm. On one side of the other film, platinum was deposited in vacuum by using a metal mask, and one pair of platinum comb electrodes were formed face to face, and the interval of the adjacent comb electrodes is 5.5 mm. One hundred sheets of the films were laminated so that the electrode surface and the surface on which the organic molecular layer was formed may confront each other. The spacing of films was filled with purified water. Spacer is not always necessary between films, and the films do not adhere mutually due to repulsion caused by intermolecular forces when the interval is less than 1 $\mu$m. When the film having electrode or the film having organic molecular layer is fixed, by applying an AC voltage deviated in phase by 180° between the one pair of comb electrodes, the film having organic molecular layer or the film having electrode moves.

Example 11
Micro-pump Comprising the Structure of the Present Invention

Figure 19:
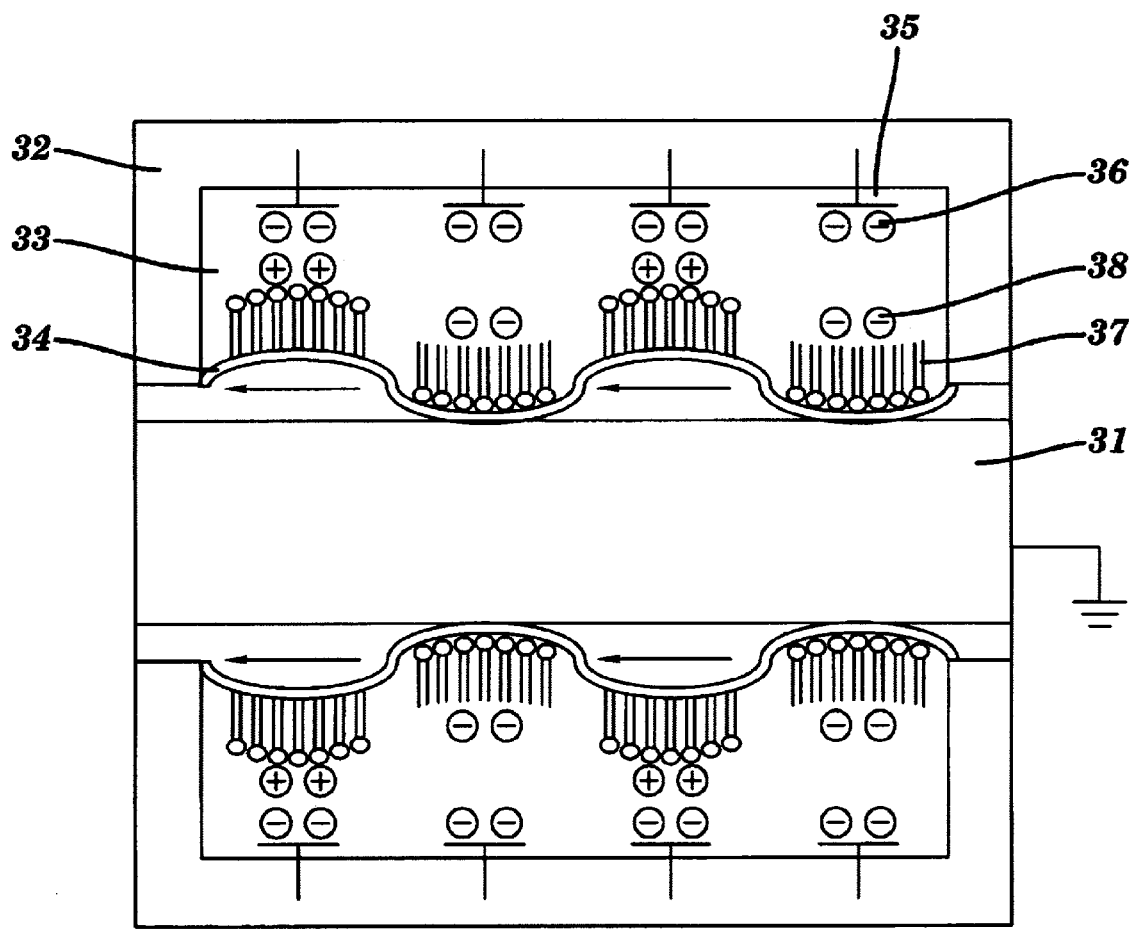
FIG. 19 is a diagram showing a sectional view of a micropump of the present invention.

The micro-pump of the present invention is a pump comprising a diaphragm of silicone film, and an organic molecular layer and an electrode that are formed on the diaphragm (FIG. 19).

As shown in FIG. 19, the micro-pump of the present invention is cylindrical, and an inside cylinder 31 is surrounded by an outside cylinder 32, with the interval filled with liquid. A chamber 33 including a pump operating space is provided in part of the outside cylinder. A diaphragm 34 of silicone film is disposed between this chamber and the liquid to be conveyed of about 0.2 mm in thickness. An electrode 35 of about 25 nm in thickness is disposed oppositely to the diaphragm of silicone film, and a voltage 36 is applied between the silicone film and the electrode. The width of electrode 35 is about 200 $\mu$m. The chamber is formed by anisotropic etching using KOH. The silicone diaphragm is formed by, for example, etching the p-type semiconductor as the substrate, and leaving the n-type portion of 1 $\mu$m in thickness. An organic molecular layer 37 of about 100 nm in thickness is formed on the surface of the diaphragm 34, and the surface of the organic molecular layer 37 has an electric charge 38. Corresponding to the electrode on the circumference of about 2 mm in diameter, organic molecular layers having positive or negative charge alternately are disposed. The diaphragm and the anisotropically etched chamber are filled with medium, such as water, alcohol, HPE or other liquid.

In FIG. 19, when a negative voltage is applied to the electrode 35, the organic molecular layer having a positive charge receives an attractive force, and moves the silicone diaphragm to the outer circumferential direction, while the organic molecular layer having a negative charge receives a repulsive force, moves the diaphragm to the inner circumferential direction and bring it into contact with the inside cylinder, resulting in an expanding space and a contracting space formed in the space between the diaphragm and inside cylinder. Thus, the space composed by the diaphragm and the inside cylinder forms a pump region. When a water reservoir is provided at the right side in the drawing, the liquid initially existing in the diaphragm portion of negative charge is moved to the diaphragm portion of positive charge at the left side. Next moment, when the voltage is changed over to be positive, the positive charge is pushed to the inside cylinder, and the liquid is further moved to the left side. By such action of the electrode 35, a pump region is formed between the diaphragm and inner circumference, and fresh liquid from the right side liquid supply source is sequentially introduced into the pump and transferred leftward. When the driving frequency of the voltage is 1 kHz, the liquid can be supplied at a very slight flow rate of about 0.02 ml/min.

Figure 20A:
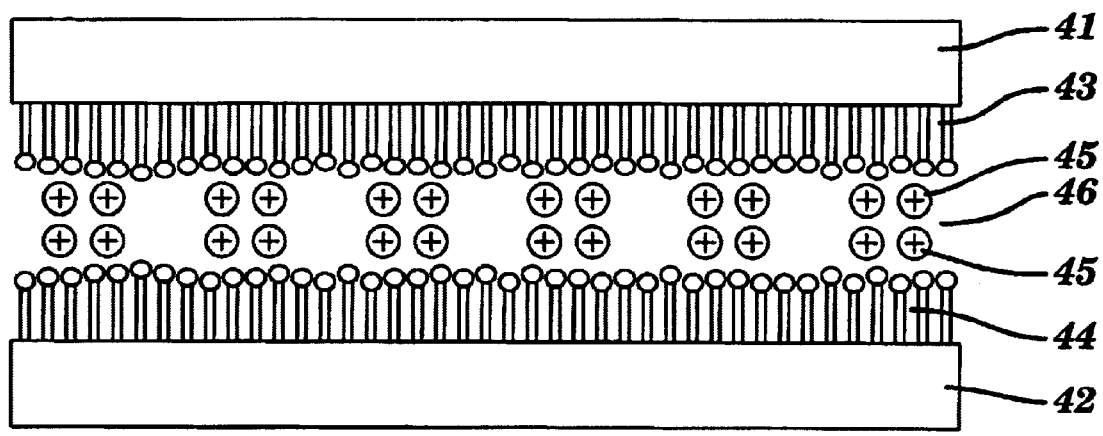
FIG. 20 is a diagram showing a sectional view of a vibration-absorbing table of the present invention.
Figure 20B:
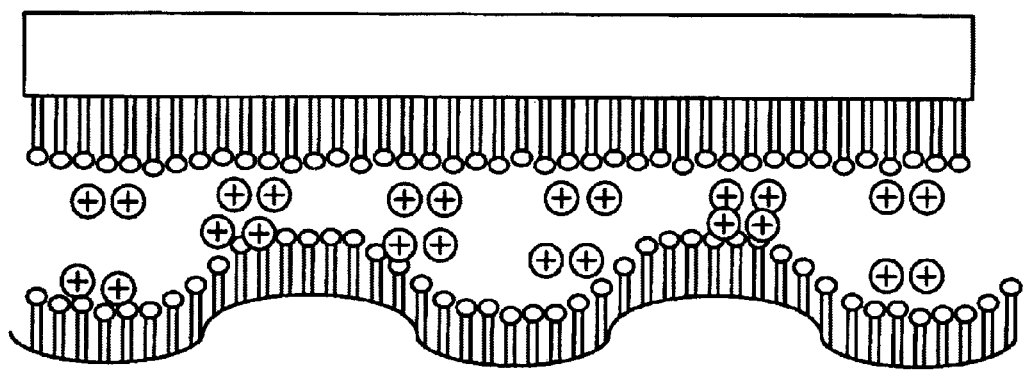

Example 12
Vibration-absorbing Table Comprising the Structure of the Present Invention The vibration-absorbing table comprising the structure of the invention is composed of two flat plates, and an organic molecular layer formed thereon (FIG. 20).

FIG. 20 shows a sectional view of the vibration-absorbing table of the present invention. Sectional view 1 is a schematic view of the vibration-absorbing table in the absence of vibration. In the drawing, organic molecular layers 43 and 44 are formed on the surface of a flat plate 41 and a flat plate 42. The organic molecular layer comprises an anchor portion binding to the flat plate, a middle portion working as a dynamic elastic element, and a surface portion having an electric charge. The electric charges 45 of the organic molecular layer on the flat plate 41 and that of the organic molecular layer on the flat plate 42 are of the same polarity, and the space between them is filled with medium 46. These two flat plates face each other, and an electrostatic repulsive force acts. The distance of the two flat plates is about 0.35 $\mu$m, and the thickness of the organic molecular layer formed on each flat plate is about 0.15 $\mu$m. The flat plate 41 is floating by the electrostatic repulsive force and intermolecular repulsive forces between the organic molecular layer 43 and organic molecular layer 44 in the medium.

Sectional view 2 shows the vibration-absorbing table in the presence of vibration of surface wave. When a vibration is applied to the flat plate 42, the surface of the flat plate 42 appears to be wavy microscopically, and by the wavy action, the electric charge of the organic molecular layer 44 approaches the electric charge of the organic molecular layer 43 in one part and departs from the electric charge in other part. In the approaching part, the elastic element portion of the organic molecular layer 44 contracts to accumulate the energy in order to support the weight of the flat plate 41. In the departing part, to the contrary, the elastic element portion of the organic molecular layer 44 expands and reduces the energy. In average, the sum of the energy accumulated in the elastic element is zero. Since the vibration of the flat plate 42 propagates, the energy of the propagating wave is converted into the energy of vibration of the organic molecular layers formed on the flat plate 41 and flat plate 42 depending on the propagation. Thus, the vibration transmitted to the flat plate 42 is absorbed by the structure shown in sectional view 14, and the vibration of the flat plate 41 is damped.

Example 13
Micro-nozzle Comprising the Structure of the Present Invention

Figure 21B:
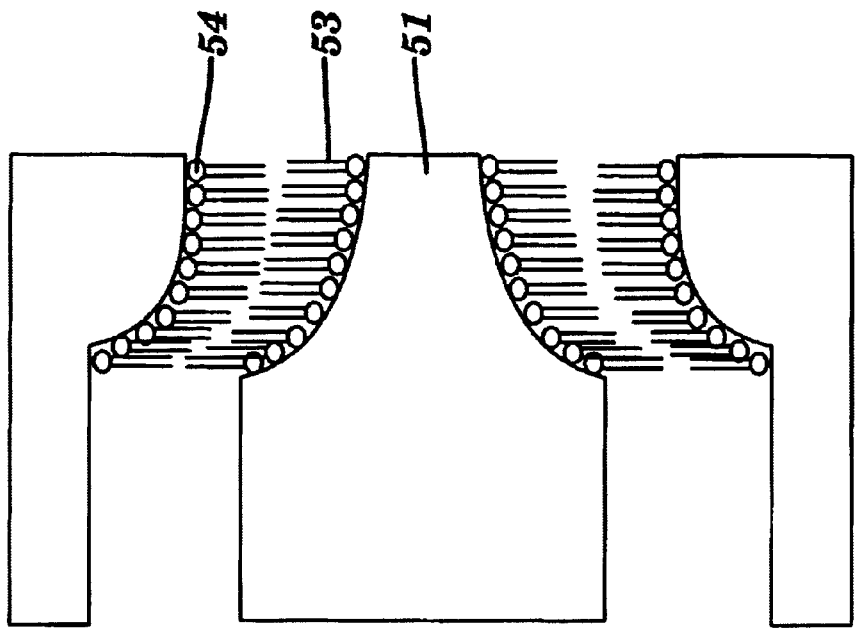
FIG. 21 is a diagram showing a sectional view of a nozzle of the present invention.
Figure 21A:
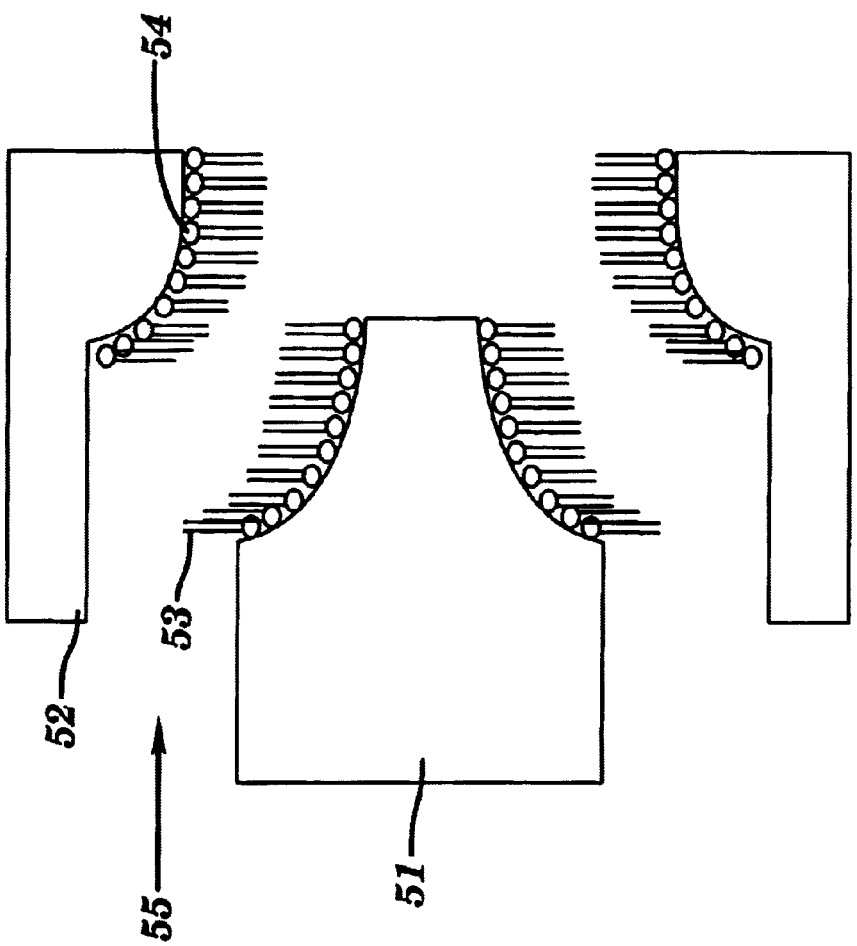

The micro-nozzle comprising the structure of the present invention consists of two conical surfaces and an organic molecular layer formed thereon (FIG. 21).

Nozzle sectional view 1 in FIG. 21 shows a sectional view of a nozzle core and a nozzle outlet when liquid is injected. An organic molecular layer 53 is formed on the surface of a nozzle core 51, and a similar organic molecular layer 54 is formed at the surface of a nozzle outlet 52. The both organic molecular layers 53, 54 consist of an anchor portion for binding covalently to the surface of the nozzle core 51 or nozzle outlet 52, a middle portion acting as a dynamic elastic element, and a surface portion having an electric charge. Opposite to the conical surface of the nozzle core, a conical surface of the nozzle outlet is formed, and the spacing between the two conical surfaces is filled with injection fluid 55. The injection fluid includes water, alcohol, organic solvent, argon gas, nitrogen gas, air, oxygen gas, and carbon dioxide gas.

Nozzle sectional view 2 in FIG. 21 shows the nozzle core advancing into the nozzle outlet, in which the nozzle reduces the flow rate of the injection fluid due to mutual intermolecular repulsive force, thereby arresting injection. By the organic molecular layers 53 and 54 formed on the surface of the nozzle core 51 and nozzle outlet 52, when two conical surfaces confront each other, an electrostatic repulsive force acts. The two conical surfaces approach each other until the organic molecular layers 53 and 54 are about to contact with each other, and stops injection liquid. If the organic molecular layers 53, 54 are not formed on the contact surface, the leading end portion of the nozzle will be worn out shortly and the nozzle life will be short. According to the invention, it is effective to decrease the damage due to contact of the wear-resistant layer.

Structures Having a Gap of Less Than 100 $\mu$m

Example 14

FIG. 1 shows an example of the structure of the present invention. The structure of the present invention is a structure in which an organic molecular layer 4 is formed on at least one surface (for example, surface of substrate 1) of two closely mutually facing substrates 1 and 2 wherein the gap 3 between the surface of the organic molecular layer 4, and the surface of the other substrate (for example, substrate 2) or the surface of an organic molecular layer 5 on the substrate 2 is less than 100 $\mu$m.

The shape of the structure of the present invention is not particularly limited, and the structure may have any shape as far as satisfying the conditions that the surfaces of the two substrates are close to each other, that an organic molecular layer is formed at least on one surface by covalent bond, and that the gap between this organic molecular layer and the surface of the other substrate or the organic molecular layer covalently bound to the surface of the other substrate is less than 100 µm. For example, one of the substrates or both the substrates-may be flat plate(s), one of the substrates or both the substrates may be cylinder(s), or one of the substrates or both the substrates may have other shapes. The surfaces of the both substrates of the structure may closely face with each other either entirely or partly.

In a second embodiment of the structure of the present invention (FIG. 1-a), an electrode 6 is disposed at one substrate, and an electric field is applied, so that an electrostatic repulsive force is generated between the electrode and the surface of the other substrate.

The organic molecular layer is surrounded by, for example, a polymer solid electrolyte in about 1 µm thickness wherein electric charges from the organic molecular layer diffuses into the surrounding polymer solid electrolyte, thereby electric charges on the surface of the polymer solid electrolyte being induced. To the induced electric charges an electric field is applied by electrode 6, resulting in an electrostatic repulsive force on the surface of the substrate having the organic molecular layer formed thereon.

One can make use of an organic molecular layer 15 formed on the surface of stator 12 in FIG. 2, the surface of the polymer solid electrolyte further formed on the surface of stator 12, and an electric field generated by electrode 16 buried in slider 11. The electric field strength E when a voltage of 100V is applied to electrode 16 in slider 11 at a gap of 10 µm (d) is:

$$E=V/d=1\times 10\ (V/m).$$

The surface charge amount σ was determined to be 10 mC/m² per unit area. When r=3 mm and l=10 mm, the force (F) the facing areas of slider and stator received is $$q=5\times 10^{-6}$$

$$F=qE=50N.$$

Example 15
Electrostatic Drive Motor Comprising the Structure of the Invention

FIG. 7 is a plan view of an example of an electrode of a motor comprising the structure of the present invention. The electrode shown herein is shaped like a comb, and a pattern is formed along a cylindrical slider. An alternating-current power source (COSwt) is applied to the electrode 1.

FIG. 8 is a sectional view of a cap containing the electrode structure.

The gap 13 is filled with a conductive medium. The medium may not be always required. An insulating layer 19 of about 10 nm in thickness is formed on the surface of a stator 12 and an organic molecular layer 15 of about 100 nm in thickness is formed thereon. The pattern of charge distribution 25 of the organic molecular layer 15 is formed so that the polarity is inverted in every about 100 µm. A DC bias voltage is applied between the slider 11 and stator 12, and a repulsive force acts between the slider and stator.

On the surface of the slider 11, an electrode 16 is made of ITO or similar material in a thickness of about 25 nm.

An insulating layer 19 of about 1 µm in thickness is formed on the electrode, and the surface is polished, and the surface smoothness is finished to about 100 nm. The electrode 16 is formed at an interval (about 200 µm) of one pitch portion of polarity pattern of the organic molecular layer 15 in a line width of about 100 µm. When the phase of the voltage applied to the electrode 16 is changed, the attractive force or repulsive force between it and the organic molecular layer 15 varies depending on the change, and a rotating force in the tangential direction is applied to the slider 11.

FIG. 10 is a plan view of a second electrode structure. As shown in FIG. 10, an alternating-current power source (COSwt) is connected to one electrode 16, and an alternating-current power source delayed in phase by 180° (COS(wt+p)) is connected to other electrode 26. The electrode 16 and electrode 26 are formed in and out alternately like a comb.

FIG. 11 is a sectional view of a gap containing the second electrode structure. The gap is filled with an insulating medium 28. An organic molecular layer 15 of about 100 nm in thickness is covalently bound directly to the stator. The pattern of the organic molecular layer 15 is formed so that the polarity may be inverted at every about 100 µm in the rotating direction of the slider. Between the slider and stator, an AC bias voltage is applied, and a repulsive force is generated between the slider and stator. The AC bias is a sufficiently high frequency more than 5 times of the frequency of the driving voltage, so as to have no effect on driving.

On the surface of the slider, the electrode 1 is made of ITO or similar material in a thickness of about 25 nm. A wear-resistant layer 18 is formed on the electrode in a thickness of about 50 nm. The surface is polished, and the surface smoothness is finished to about 10 nm. The electrode 16 is formed at an interval (about 200 µm) of one pitch portion of polarity pattern of the organic molecular layer 15, in a line width of about 100 µm, and is connected to the power source having a phase of COSwt. The electrode 26 is also formed at an interval (about 200 µm) of one pitch portion of polarity pattern of the organic molecular layer 15, in a line width of about 100 µm, and is connected to the power source having a phase of COS(wt+p).

When the phase of the voltage applied to the electrode is changed, the attractive force or repulsive force applied to the organic molecular layer 15 varies depending on the change, and a rotating force in the tangential direction is applied to the organic molecular layer 15, and the slider rotates about the stator.

Example 16
Discoidal Electrostatic Motor Comprising the Structure of the Present Invention FIG. 13 shows a sectional view of a hard disk comprising the structure of the present invention, a sectional view along the circumference of the disk, a plan view of the disk, and a plan view of motor and stator. One of the two substrates disposed closely to each other is a disk, which is the slider of the motor and is also a base plate of media. The substrate material is, for example, a glass material, and the surface of the disk is polished to a flatness of 10 nm. In a sectional view along the circumference of the disk, a magnetic medium is formed on at least one surface of the media. A magnetic head is disposed near the surface of the magnetic medium through a gap. Recording and reproducing can be executed between the recording medium and the magnetic head. Organic molecular layers having an electric charge are formed repeatedly in a radial pattern on the surface of this disk in a specified line width.

FIG. 14 shows a mask pattern for transferring the charge pattern onto a glass substrate. The charge pattern is formed by transcription of the mask pattern by photolithography. The Figure shows an example, in which the diameter of the substrate for forming the media is 17 mm, the charge center radius is 5 mm, the charge length is 1 mm, the charge width is 20 µm, the charge interval is 20 µm, and such pattern is formed on the resist as inversion pattern. The colorless portion is the exposure area, and the resist applied on the substrate is developed, and the substrate surface is exposed. When an organic molecular layer having an electric charge is formed on the surface of the substrate having such pattern formed thereon, the organic molecular layer having an electric charge is formed only on the exposed area of the substrate surface. Since organic solvent can remove the resist, a radial pattern of organic molecular layer having an electric charge is formed.

For example, when the media diameter is 17 mm, the charge center radius is 5 mm, the charge length is 1 mm, the charge width is 20 μm, and the charge interval is 20 μm, an organic molecular layer having a surface charge density of σ=200 mC/m$^2$ was formed.

FIG. 15 shows a plan view and a sectional view of the electrode. An electrode is formed on the surface of stator repeatedly in a radial pattern in a specified line width. As shown in the sectional view, at a position corresponding to the organic molecular layer, an electrode is formed with electrode center radius of 5 mm, electrode length of 1 mm, electrode with of 5 μm, and electrode interval of 35 μm.

FIG. 16 shows an electrode forming process. On the surface of the substrate, a thin metal film is formed in a thickness of 0.2 μm, an electrode pattern is transcribed to the resist pattern by using photo mask, and the pattern is transcribed to the metal film on the substrate surface. An insulating film is formed in a thickness of 0.2 μm on the surface of metal film. The spacing between the stator and media is filled with electrolyte, and electric insulation is achieved so as to apply voltage between electrodes formed on the stator surface. Moreover, a gap spacer of 5 μm is formed between the stator and media, so that the electrode on the stator surface and the charge pattern on the media surface may not directly contact with each other. The thickness of the gap spacer was 5 μm.

A voltage is applied between electrode A and electrode B of the repeated pattern. When a voltage of ±10 V was applied between the electrodes, an electric field of E=0.5 MV/m was generated, and propulsive force of F=qE=15 N and torque of T=rF=75 mNm were obtained.

Example 17
Guide Comprising the Structure of the Present Invention

A guide is presented as other embodiment comprising the structure of the present invention. The guide comprises two substrates (first substrate and second substrate) which are disposed at a close gap of less than 100 μm wherein a linear convex supporter having a specified line width is formed on the surface of the first substrate wherein an organic molecular layer having an electric charge is formed on the surface of the supporter, wherein electrodes having a specified line width and interval are formed linearly on the surface of the second substrate wherein a liquid electrolyte was applied on the surface of the first substrate. In this structure, the tiny gap between the two surfaces is maintained by the electric double layer repulsive force acting between the organic molecular layer surface and when an AC voltage is applied to the electrodes, a vertical force acts on the linear convex supporter and the first substrate can move along the line by an external force along the line.

Example 18
Cylindrical Actuator Comprising the Structure of the Present Invention A circular column of 10 mm in diameter and 60 mm in length was made of polyethylene terephthalate resin. On this circular column, an aluminum electrode of 10 mm in diameter and 0.2 mm in thickness was disposed parallel to the bottom of the column at an interval of 5 mm. A penetration hole of 2 mm in diameter is opened in the column, and a glass narrow tube having a such diameter as to form a gap of less than 100 μm is placed therein. Purified water with resistivity of 16 MΩ is charged between the fine pores and the narrow tube. One side of the column is in contact with the purified water, and if the narrow tube extends and projects from the column, the water gets into the fine pores by surface tension from the column contacting side, so that the liquid in the fine pores is not lost. In the narrow tube, organic molecular layers made of COOH(CH$_2$)$_8$Si—O— and NH$_2$(CH$_2$)$_8$Si—O— are sequentially formed in a band of 5 mm in width by photolithography.

Example 19
Flat Actuator Comprising the Structure of the Present Invention

After one side of polyimide film of 0.5 mm in thickness and 100 mm×30 mm in size was treated either by UV irradiation, or treated hydrophilically by RF plasma in oxygen partial pressure of 0.1 Torr, organic molecular layers of COOH(CH$_2$)$_8$Si—O— having negative charge and NH$_2$(CH$_2$)$_8$Si—O— having positive charge in liquid were sequentially formed by photolithography on each 5 mm×25 mm regions of the film, longitudinal direction of which was parallel to the 30 mm side of the film.

The width of these adjacent regions was 1 mm. On one side of the other film, platinum was deposited in vacuum by using a metal mask, and one pair of platinum comb electrodes were formed face to face, and the interval of the adjacent comb electrodes is 5.5 mm. One hundred sheets of the films were laminated so that the electrode surface and the surface on which the organic molecular layer was formed may confront each other. The spacing of films was filled with purified water.

Spacer is not always necessary between films, and the films do not adhere mutually due to repulsion caused by intermolecular forces when the interval is less than 100 μm. When the film having electrode or the film having organic molecular layer is fixed, by applying an AC voltage deviated in phase by 180° between the one pair of comb electrodes, the film having organic molecular layer or the film having electrode moves.

EFFECTS OF THE INVENTION

The invention provides for a novel structure consisting of two closely mutually facing substrates, in which an organic molecular layer is formed by covalent bond at least on one surface, and the gap between the organic molecular layer surface and the surface of the other substrate or the surface of other organic molecular layer formed by covalent bond on the other substrate is usually less than 100 μm, preferably less than 1 μm. This structure brings about the effects of decreasing the wear due to sliding of the two surfaces as the gap between the two surfaces is lubricated by the intermolecular repulsive forces due to elastic force by the organic molecular layer and steri repulsive forces c between the two surfaces. The invention further provides for a motor, actuator, vibration absorbing table and others comprising the structure of the invention.

What is claimed is:
1. A structure comprising two substrates having mutually facing surfaces defining a gap filled with an aqueous liquid of about neutral pH, each mutually facing surface having formed entirely or partly thereon, by covalent bonds, an organic molecular layer comprising at least one group selected from groups having a positive charge and groups having a negative charge wherein surface portions or the organic molecular layer are electrically charged at about neutral pH in the aqueous liquid.

2. The structure according to claim 1 wherein the gap between the two surfaces is maintained by one or more repulsive forces selected from electrostatic repulsive forces, electric double layer repulsive forces and steric repulsive forces acting between both surfaces of the organic molecular layers.

3. The structure according to claim 1 in which the substrates are in a cylindrical, discoidal or spherical form.

4. The structure according to claim 1 wherein a wear resisting layer is provided on at least one mutually facing surface of the substrate and the organic molecular layer is formed on a surface of the wear resisting layer.

5. The structure according to claim 1 wherein a wear resisting layer and a dielectric layer are provided on at least one mutually facing surface of the substrate and an organic molecular layer is formed on a surface of an upper layer of the wear resisting layer and the dielectric layer.

6. The structure according to claim 5 wherein the wear resisting layer is a diamond-like carbon layer, ion implantation layer, or nitride layer and the dielectric layer is barium titanate ($BaTiO_3$) or barium strontium tantalate (BST).

7. The structure according to claim 1 wherein the aqueous solution comprises at least one electrolyte.

8. The structure according to claim 7 wherein the aqueous solution additionally comprises an organic solvent.

9. The structure according to claim 7 wherein the aqueous solution additionally comprises a lower alcohol having 1 to 6 carbon atoms.

10. The structure according to claim 1 wherein an electrode is supplied to one substrate, and an electric field is applied thereto; whereby an electrostatic repulsive force is generated between the organic molecular layer and the electrode.

11. The structure according to claim 10 wherein a direct current voltage or an alternating current voltage is applied to the electrode.

12. The structure according to claim 11, in which an alternating current is applied to the electrode and the electric field has a frequency more than about 5 times the frequency of the alternating current.

13. The structure according to claim 1, wherein surface portions of the organic molecular layer are composed of at least one polypeptide selected from polylysine, polyglutamine, polyasparagine, polyarginine having a positive electric charge, polyglutamic acid having a negative electric charge and polyaspartic acid having a negative electric charge.

14. The structure according to claim 1, wherein surface portions of the organic molecular layer are composed of a polymer containing at least one group selected from the group consisting of quaternary ammonium group, diazonium salt having a positive electric charge, sulfonic acid group, sulfinic acid group, sulfenic acid group, carboxylic acid group, phosphoric acid group, and phosphorous acid group having a negative electric charge.

15. The structure according to claim 1, wherein surface portions of the organic molecular layer are composed of at least one polymer selected from the group consisting of polystyrene, polyacetylene, polyvinyl ester, poly(vinyl alcohol), polyvinyl ether, poly(ethylene terephthalate), polyethylene glycol, poly-p-phenylene ether, polyacetal, polycarbonate, polyethylene imine, polyamide, polyurethane, polyurea, polyimide, polyimidazole, polyoxazole, polypyrrole, polyaniline, polysulfide, polysulfone, polyphosphoric acid, polyester phosphate, polyphosphazene, polysiloxane, and polysilane.

16. The structure according to 1, wherein surface portions of the organic molecular layer are composed of at least one polymer selected from the group consisting of vinyl chloride-vinyl acetate copolymer, vinyl chloride-vinylidene chloride copolymer, ethylene-propylene copolymer, ethylene-vinyl acetate copolymer, acrylonitrile-styrene copolymer, styrene-butadiene copolymer, tetrafluoroethylene-hexafluoroethylene copolymer, acrylonitrile-butadiene-styrene copolymer, styrene-maleic anhydride copolymer, and ethylene-vinyl alcohol copolymer.

17. The structure according to claim 1, wherein surface portions of the organic molecular layer are composed of at least one polypeptide selected from the group consisting of polyglycine, polyphenylalanine, polyalanine, polyleucine, polyisoleucine, polyvaline, polyproline, polyserine, polythreonine, and polytyrosine.

18. A motor comprising a slider and a stator, each having a surface closely facing each other and defining a gap filled with an aqueous liquid of about neutral pH, each surface having formed entirely or partly thereon, by covalent bonds, an organic molecular layer comprising at least one group selected from groups having a positive charge and groups having a negative charge; wherein surface portions of the organic molecular layer are electrically charged at about neutral pH in the aqueous liquid.

19. The motor according to claim 18 wherein the organic molecular layer is formed in a pattern of alternately repeating positively charged domains and negatively charged domains on a surface of one of the slider and stator of the motor and an electrode is formed by repeated pattern on the other of the slider and the stator; whereby application of an AC voltage to the electrode generates a propulsive force between the slider and stator.

20. The motor according to claim 18 wherein an AC voltage of different phases is applied to the electrode of the repeated pattern to generate a propulsive force between the slider and stator.

21. The motor according to claim 18 in which the surfaces of the two closely facing substrates are spherical wherein an organic molecular layer having an electric charge is formed in the latitude direction repeatedly along the spherical surface in a specified line width on the inside spherical surface wherein an electrode is formed in the latitude direction on the other spherical surface repeatedly along the spherical surface in the specified line width wherein an AC voltage is applied to the electrode of the repeated pattern to generate a propulsive force on the disk.

22. The motor according to claim 18 in which the surface of the two closely facing substrates are spherical wherein an organic molecular layer having an electric charge is formed in the latitude direction repeatedly along the spherical surface in a specified line width on the inside spherical surface wherein an electrode is formed in the latitude direction on the other spherical surface repeatedly along the spherical surface in the specified line width, being divided in the longitude direction wherein an AC voltage is applied to the electrode of the repeated pattern to generate a propulsive force on the disk.

23. The motor according to claim 18 in which the surfaces of the two closely facing substrates are spherical wherein an organic molecular layer having an electric charge is formed in the longitude direction repeatedly along the spherical surface in a specified line width on the inside spherical surface wherein an electrode is formed in the longitude direction on the other spherical surface repeatedly along the spherical surface in the specified line width wherein AC voltage is applied to the electrode of the repeated pattern to generate a propulsive force on the disk.

24. The motor according to claim 18 in which the surface of the two close base plates is spherical wherein an organic molecular layer having an electric charge is formed in the longitude direction on the equator repeatedly along the spherical surface in a specified line width on the inside spherical surface wherein an electrode is formed in the longitude direction on the equator on the other spherical surface repeatedly along the spherical surface in the specified line width, or an organic molecular layer having an electric charge is formed repeatedly in the latitude direction wherein an electrode is formed on the other spherical surface repeatedly in the latitude direction along the spherical surface in the specified line width, being divided in the longitude direction, and an AC voltage is applied to the electrode of the repeated pattern to generate a propulsive force in three axial directions on the spherical surface.

25. A micro-pump comprising a structure according to claim 1.

26. A vibration absorbing table comprising a structure according to claim 1.

27. A micro-nozzle comprising a structure according to claim 1.

28. A micro-nozzle, comprising two conical surfaces for composing a nozzle core portion and a nozzle outlet portion wherein organic molecular layers are formed on the surfaces facing each other wherein the organic molecular layer has an anchor portion covalently bonded to each conical surface, a middle portion working as a dynamic elastic element, and a surface portion having an electric charge wherein the nozzle outlet conical surface is disposed oppositely to the nozzle core conical surface wherein the gap between them is filled with an injection fluid as medium.

29. A Structure comprising two substrates having mutually facing surfaces defining a gap filled with an aqueous liquid at about neutral pH, wherein an organic molecular layer comprising at least one group selected from groups having a positive charge and groups having a negative charge is formed on the mutually facing surface of one substrate by covalent bonds and a charge generating means is provided in the other substrate.

30. A structure comprising two substrates having mutually facing surfaces defining a gap filled with an aqueous liquid at about neutral pH wherein an organic molecular layer comprising at least one group selected from groups having a positive charge and groups having a negative charge is formed on the mutually facing surface of one substrate by coral and an electric field generating means is provided in the other substrate.

31. A structure according to claim 1 wherein each organic molecular layer is composed of an anchor portion, a middle portion and a surface portion.

* * * * *

UNITED STATES PATENT AND TRADEMARK OFFICE
CERTIFICATE OF CORRECTION

PATENT NO.     : 6,621,191 B1
DATED          : September 16, 2003
INVENTOR(S)    : Nomura et al.

It is certified that error appears in the above-identified patent and that said Letters Patent is hereby corrected as shown below:

<u>Title page,</u>
Item [57], ABSTRACT,
Line 7, delete "1000 um" and insert -- 100 um --

<u>Column 48,</u>
Line 65, delete the word "or" and insert -- of --

<u>Column 52,</u>
Line 6, delete the word "Structure" and insert -- structure --
Lines 20 and 21, delete the words "by coral" and insert -- by covalent bonds --

Signed and Sealed this

Thirtieth Day of November, 2004

JON W. DUDAS
*Director of the United States Patent and Trademark Office*